(12) United States Patent
Zhang et al.

(10) Patent No.: US 11,451,259 B2
(45) Date of Patent: Sep. 20, 2022

(54) TECHNIQUES FOR SELF-INTERFERENCE REPORTING

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Somerset, NJ (US); Junyi Li, Franklin Park, NJ (US); Tao Luo, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 17/149,190

(22) Filed: Jan. 14, 2021

(65) Prior Publication Data

US 2022/0271791 A1 Aug. 25, 2022

(51) Int. Cl.
| | |
|---|---|
| *H04W 72/12* | (2009.01) |
| *H04B 1/525* | (2015.01) |
| *H04W 24/10* | (2009.01) |
| *H04L 5/00* | (2006.01) |
| *H04B 17/336* | (2015.01) |
| *H04L 5/14* | (2006.01) |
| *H04B 7/06* | (2006.01) |
| *H04W 72/08* | (2009.01) |

(52) U.S. Cl.
CPC ........... *H04B 1/525* (2013.01); *H04B 7/0626* (2013.01); *H04B 17/336* (2015.01); *H04L 5/0048* (2013.01); *H04L 5/14* (2013.01); *H04W 24/10* (2013.01); *H04W 72/082* (2013.01)

(58) Field of Classification Search
CPC ................................ H04W 72/12; H04L 5/00
See application file for complete search history.

(56) References Cited

U.S. PATENT DOCUMENTS

| | | | | |
|---|---|---|---|---|
| 2013/0044621 A1* | 2/2013 | Jung | ..................... | H04L 5/0007 370/336 |
| 2020/0252950 A1* | 8/2020 | Yang | ..................... | H04L 5/0053 |

* cited by examiner

*Primary Examiner* — Zhiren Qin
(74) *Attorney, Agent, or Firm* — Holland & Hart LLP

(57) ABSTRACT

Methods, systems, and devices for wireless communications are described. A first wireless device may transmit reference signals via a first antenna array of the first wireless device. The first wireless device may perform, according to a reporting configuration for self-interference at the first wireless device, a set of measurements on the reference signals received at a second antenna array of the first wireless device. The first wireless device may determine a priority associated with transmission of measurement reports associated with self-interference at the first wireless device. The first wireless device may then transmit, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

30 Claims, 19 Drawing Sheets

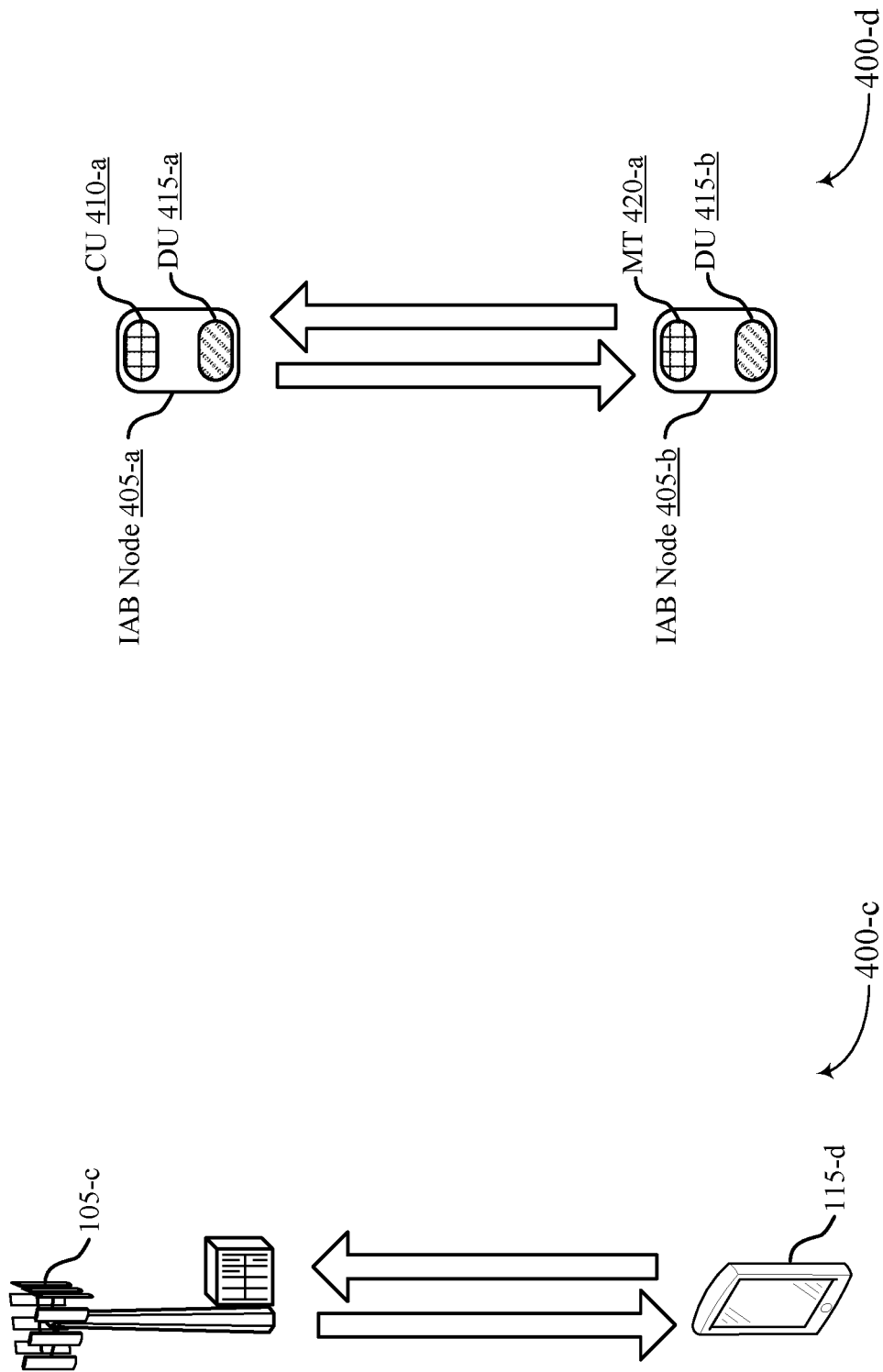

TECHNIQUES FOR SELF-INTERFERENCE REPORTING

FIELD OF TECHNOLOGY

The following relates to wireless communications, including techniques for self-interference reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, some wireless devices (e.g., UEs, or mobile terminal nodes of an integrated access and backhaul (IAB) network) may be configured to perform full-duplex communications. When carrying out full-duplex communications, a wireless device may be configured to transmit uplink signals and receive downlink signals concurrently (e.g., within the same slot) and/or using common frequency bands. Full-duplex communications may reduce latency in wireless communications, and may lead to more efficient resource utilization. However, in some cases, a wireless device may be susceptible to self-interference when carrying out full-duplex communications, which may reduce the efficiency and reliability of communications at the wireless device, including full-duplex communications.

SUMMARY

The described techniques relate to improved methods, systems, devices, and apparatuses that support techniques for self-interference reporting. Generally, the described techniques provide for reporting self-interference experienced at a wireless device. In particular, techniques described herein are directed to a wireless device performing self-interference measurements and reporting self-interference according to a reporting configuration. For example, while carrying out full-duplex communications, a wireless device may transmit reference signals (e.g., sounding reference signals (SRSs), channel state information reference signals (CSI-RS), synchronization signal blocks (SSBs)) via a first antenna array. In this example, the wireless device may receive the reference signals at a second antenna array of the wireless device, and may perform measurements on the received reference signals according to a reporting configuration in order to determine self-interference at the wireless device. The wireless device may subsequently transmit a measurement report indicating the measured self-interference to a network node/second wireless device (e.g., base station, or control node of an integrated access and backhaul (IAB) network). In some aspects, the network node may configure the wireless device with a configuration for full-duplex communications in response to the measurement report. For instance, if the measurement report indicates low levels of self-interference, the network node may configure the wireless device to perform full-duplex communications. Conversely, if the measurement report indicates high levels of self-interference, the network node may refrain from configuring the wireless device for full-duplex communications.

A method for wireless communication at a first wireless device is described. The method may include transmitting reference signals via a first antenna array of the first wireless device, performing, according to a reporting configuration for self-interference at the first wireless device, a set of measurements on the reference signals received at a second antenna array of the first wireless device, determining a priority associated with transmission of measurement reports associated with self-interference at the first wireless device, and transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

An apparatus for wireless communication at a first wireless device is described. The apparatus may include a processor, memory in electronic communication with the processor, and instructions stored in the memory. The instructions may be executable by the processor to cause the apparatus to transmit reference signals via a first antenna array of the first wireless device, perform, according to a reporting configuration for self-interference at the first wireless device, a set of measurements on the reference signals received at a second antenna array of the first wireless device, determine a priority associated with transmission of measurement reports associated with self-interference at the first wireless device, and transmit, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

Another apparatus for wireless communication at a first wireless device is described. The apparatus may include means for transmitting reference signals via a first antenna array of the first wireless device, means for performing, according to a reporting configuration for self-interference at the first wireless device, a set of measurements on the reference signals received at a second antenna array of the first wireless device, means for determining a priority associated with transmission of measurement reports associated with self-interference at the first wireless device, and means for transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

A non-transitory computer-readable medium storing code for wireless communication at a first wireless device is described. The code may include instructions executable by a processor to transmit reference signals via a first antenna array of the first wireless device, perform, according to a reporting configuration for self-interference at the first wireless device, a set of measurements on the reference signals received at a second antenna array of the first wireless device, determine a priority associated with transmission of measurement reports associated with self-interference at the first wireless device, and transmit, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

Some examples of the method, apparatuses, and non-transitory computer-readable medium described herein may further include operations, features, means, or instructions for receiving, from the second wireless device, an indication of the reporting configuration, where performing the set of measurements, transmitting the measurement report, or both, may be based on receiving the indication of the reporting configuration.

Some examples of the method, apparatuses, and non-transitory computer-readable medium described herein may further include operations, features, means, or instructions for receiving, from the second wireless device, an indication to transmit measurement reports associated with self-interference at the first wireless device periodically, aperiodically, semi-persistently, or a combination thereof, where transmitting the measurement report may be based on the indication to transmit the measurement reports.

Some examples of the method, apparatuses, and non-transitory computer-readable medium described herein may further include operations, features, means, or instructions for receiving, from the second wireless device, a request for the measurement report, where transmitting the measurement report may be based on receiving the request.

In some examples of the method, apparatuses, and non-transitory computer-readable medium described herein, the request includes a medium access control (MAC) control element (MAC-CE), a downlink control information (DCI) message, a radio resource control (RRC) message, or any combination thereof.

Some examples of the method, apparatuses, and non-transitory computer-readable medium described herein may further include operations, features, means, or instructions for receiving, from the second wireless device, an indication of one or more measurement thresholds and identifying that one or more measurements of the set of measurements satisfy at least one measurement threshold of the one or more measurement thresholds, where transmitting the measurement report may be based on the identifying.

Some examples of the method, apparatuses, and non-transitory computer-readable medium described herein may further include operations, features, means, or instructions for transmitting, via the measurement report, an indication of a received signal strength indicator (RSSI) for the reference signals, a reference signal received power (RSRP) for the reference signals, a signal-to-interference-plus-noise ratio (SINR) for the reference signals, or any combination thereof.

Some examples of the method, apparatuses, and non-transitory computer-readable medium described herein may further include operations, features, means, or instructions for transmitting, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

Some examples of the method, apparatuses, and non-transitory computer-readable medium described herein may further include operations, features, means, or instructions for receiving, from the second wireless device, an indication of the time interval, where performing the set of measurements, transmitting the measurement report, or both, may be based on the time interval, where the set of measurements may be performed within the time interval.

In some examples of the method, apparatuses, and non-transitory computer-readable medium described herein, the reference signals may be transmitted via the first antenna array on a transmit beam and the method, apparatuses, and non-transitory computer-readable medium may include further operations, features, means, or instructions for transmitting, via the measurement report, an identifier of a beam pair including the transmit beam and the receive beam.

In some examples of the method, apparatuses, and non-transitory computer-readable medium described herein, the reference signals may be transmitted via the first antenna array via a set of one or more transmit beams and the method, apparatuses, and non-transitory computer-readable medium may include further operations, features, means, or instructions for transmitting, via the measurement report, a set of beam pair identifiers associated with one or more beam pairs, where each beam pair includes a transmit beam from the set of one or more transmit beams and a receive beam from the set of one or more receive beams.

Some examples of the method, apparatuses, and non-transitory computer-readable medium described herein may further include operations, features, means, or instructions for receiving, from the second wireless device, a first indication of the set of one or more transmit beams, a second indication of the set of one or more receive beams, or both.

Some examples of the method, apparatuses, and non-transitory computer-readable medium described herein may further include operations, features, means, or instructions for receiving, from the second wireless device based on transmitting the measurement report, an indication of a subset of beam pair identifiers from the set of beam pair identifiers, transmitting additional reference signals via the first antenna array of the first wireless device via one or more transmit beams associated with the subset of beam pair identifiers, performing a second set of measurements on the additional reference signals received at the second antenna array via one or more receive beams associated with the subset of beam pair identifiers, and transmitting, to the second wireless device, a second measurement report including an indication of self-interference experienced at the first wireless device which may be attributable to the additional reference signals.

In some examples of the method, apparatuses, and non-transitory computer-readable medium described herein, the reference signals may be transmitted via the first antenna array via a single transmit beam, the reference signals may be received via the second antenna array via a set of multiple receive beams, and the method further includes transmitting, via the measurement report, an indication of measurements associated with at least a subset of receive beams of the set of multiple receive beams, the reference signals may be transmitted via the first antenna array via a set of multiple transmit beams, the reference signals may be received via the second antenna array via a single receive beam, and the method further includes transmitting via the measurement report, an indication of measurements associated with at least a subset of transmit beams of the set of multiple transmit beams, the reference signals may be transmitted via the first antenna array via a set of multiple transmit beams, the reference signals may be received via the second antenna array via a set of multiple receive beams, and the method further includes transmitting via the measurement report, an indication of measurements associated with at least a subset of transmit beams of the set of multiple transmit beams, at least a subset of receive beams of the set of multiple receive beams, or both, and any combination thereof.

In some examples of the method, apparatuses, and non-transitory computer-readable medium described herein, the measurements indicated via the measurement include a set of multiple sets of measurements corresponding to a set of multiple measurement intervals and the method, apparatuses, and non-transitory computer-readable medium may include further operations, features, means, or instructions for transmitting, via the measurement report, an indication of the set of multiple sets of measurements over the set of multiple measurement windows, where each set of measurements of the set of multiple sets of measurements, for each time of the set of multiple times, includes one or more of a maximum measurement of the set of measurements over a time interval, a minimum measurement of the set of measurements over the time interval, an average measurement of the set of measurements over the time interval, a percentage of measurements of the set of measurements that satisfy a measurement threshold over the time interval, or any combination thereof.

Some examples of the method, apparatuses, and non-transitory computer-readable medium described herein may further include operations, features, means, or instructions for transmitting, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

Some examples of the method, apparatuses, and non-transitory computer-readable medium described herein may further include operations, features, means, or instructions for transmitting, via the measurement report, a set of beam pair identifiers associated with one or more transmit beams, one or more receive beams, or both, that may be associated with measurements of the set of measurements that satisfy one or more measurement thresholds, where the set of beam pair identifiers may be associated with a subset of the set of multiple transmit beams, a subset of the set of multiple receive beams, or both.

In some examples of the method, apparatuses, and non-transitory computer-readable medium described herein, the reference signals may be transmitted via the first antenna array to a first transmission-reception point (TRP) of the second wireless device and the method, apparatuses, and non-transitory computer-readable medium may include further operations, features, means, or instructions for transmitting, via the measurement report, an indication of the second wireless device, the first TRP associated with channel measurement resources (CMRs), the second TRP associated with interference measurement resources (IMRs), or any combination thereof.

In some examples of the method, apparatuses, and non-transitory computer-readable medium described herein, the reference signals may be transmitted via the first antenna array to one of the second wireless device or a third wireless device and the method, apparatuses, and non-transitory computer-readable medium may include further operations, features, means, or instructions for transmitting, via the measurement report, an indication of the second wireless device associated with CMRs, the third wireless device associated with IMRs, or both.

Some examples of the method, apparatuses, and non-transitory computer-readable medium described herein may further include operations, features, means, or instructions for receiving, from the second wireless device, an indication of one or more parameters associated with the priority, where determining the priority may be based on receiving the indication of the one or more parameters.

Some examples of the method, apparatuses, and non-transitory computer-readable medium described herein may further include operations, features, means, or instructions for determining an additional priority associated with transmission of an additional measurement report and transmitting the additional measurement report according to the additional priority and based on a comparison between the priority and the additional priority.

In some examples of the method, apparatuses, and non-transitory computer-readable medium described herein, the first wireless device includes a UE, the second wireless device includes a base station, and the reference signals include SRSs, or and the first wireless device includes a wireless node of an IAB network, the second wireless device includes a parent node or a central unit (CU) of an IAB network and the reference signals include CSI-RS, SSB signals, or both.

A method for wireless communication at a second wireless device is described. The method may include receiving reference signals via a first antenna array of a first wireless device, determining a priority associated with transmission of measurement reports associated with self-interference at the first wireless device, and receiving, from the first wireless device and according to the reporting configuration, a measurement report including an indication of self-interference for full-duplex communications at the first wireless device, where the measurement report is received in accordance with the determined priority.

An apparatus for wireless communication at a second wireless device is described. The apparatus may include a processor, memory in electronic communication with the processor, and instructions stored in the memory. The instructions may be executable by the processor to cause the apparatus to receive reference signals via a first antenna array of a first wireless device, determine a priority associated with transmission of measurement reports associated with self-interference at the first wireless device, and receive, from the first wireless device and according to the reporting configuration, a measurement report including an indication of self-interference for full-duplex communications at the first wireless device, where the measurement report is received in accordance with the determined priority.

Another apparatus for wireless communication at a second wireless device is described. The apparatus may include means for receiving reference signals via a first antenna array of a first wireless device, means for determining a priority associated with transmission of measurement reports associated with self-interference at the first wireless device, and means for receiving, from the first wireless device and according to the reporting configuration, a measurement report including an indication of self-interference for full-duplex communications at the first wireless device, where the measurement report is received in accordance with the determined priority.

A non-transitory computer-readable medium storing code for wireless communication at a second wireless device is described. The code may include instructions executable by a processor to receive reference signals via a first antenna array of a first wireless device, determine a priority associated with transmission of measurement reports associated with self-interference at the first wireless device, and receive, from the first wireless device and according to the reporting configuration, a measurement report including an indication of self-interference for full-duplex communications at the first wireless device, where the measurement report is received in accordance with the determined priority.

Some examples of the method, apparatuses, and non-transitory computer-readable medium described herein may further include operations, features, means, or instructions for transmitting, to the first wireless device, an indication of the reporting configuration, where receiving the measurement report may be based on transmitting the indication of the reporting configuration.

Some examples of the method, apparatuses, and non-transitory computer-readable medium described herein may further include operations, features, means, or instructions for transmitting, to the first wireless device, an indication to transmit measurement reports associated with self-interference at the first wireless device periodically, aperiodically, semi-persistently, or a combination thereof, where receiving the measurement report may be based on the indication to transmit the measurement reports.

Some examples of the method, apparatuses, and non-transitory computer-readable medium described herein may further include operations, features, means, or instructions for transmitting, to the first wireless device, a request for the measurement report, where receiving the measurement report may be based on transmitting the request.

In some examples of the method, apparatuses, and non-transitory computer-readable medium described herein, the request includes a MAC-CE, a DCI message, a RRC message, or any combination thereof.

Some examples of the method, apparatuses, and non-transitory computer-readable medium described herein may further include operations, features, means, or instructions for transmitting, to the first wireless device, an indication of one or more measurement thresholds associated with self-interference measurements at the first wireless device, where the measurement report may be based on the one or more measurement thresholds.

Some examples of the method, apparatuses, and non-transitory computer-readable medium described herein may further include operations, features, means, or instructions for receiving, via the measurement report, an indication of a RSSI for the reference signals, a RSRP for the reference signals, a SINR for the reference signals, or any combination thereof.

Some examples of the method, apparatuses, and non-transitory computer-readable medium described herein may further include operations, features, means, or instructions for receiving, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

Some examples of the method, apparatuses, and non-transitory computer-readable medium described herein may further include operations, features, means, or instructions for transmitting, to the first wireless device, an indication of the time interval, where receiving the measurement report may be based on the time interval, where the set of measurements may be performed within the time interval.

Some examples of the method, apparatuses, and non-transitory computer-readable medium described herein may further include operations, features, means, or instructions for receiving, via the measurement report, an identifier of a beam pair associated with the measurement report.

Some examples of the method, apparatuses, and non-transitory computer-readable medium described herein may further include operations, features, means, or instructions for receiving, via the measurement report, a set of beam pair identifiers associated with one or more beam pairs, where each beam pair includes a transmit beam from a set of one or more transmit beams and a receive beam from a set of one or more receive beams.

Some examples of the method, apparatuses, and non-transitory computer-readable medium described herein may further include operations, features, means, or instructions for transmitting, to the first wireless device, a first indication of the set of one or more transmit beams, a second indication of the set of one or more receive beams, or both.

Some examples of the method, apparatuses, and non-transitory computer-readable medium described herein may further include operations, features, means, or instructions for transmitting, to the first wireless device based on determining the priority, an indication of one or more parameters associated with the priority.

Some examples of the method, apparatuses, and non-transitory computer-readable medium described herein may further include operations, features, means, or instructions for determining an additional priority associated with transmission of an additional measurement report and receiving the additional measurement report according to the additional priority and based on a comparison between the priority and the additional priority.

In some examples of the method, apparatuses, and non-transitory computer-readable medium described herein, the first wireless device includes a UE, the second wireless device includes a base station and the reference signals include SRSs, or and the first wireless device includes a wireless node of an IAB network, the second wireless device includes a parent node or a CU and the reference signals include CSI-RS, SSB signals, or both.

BRIEF DESCRIPTION OF THE DRAWINGS

FIGS. 4A-4F illustrate examples of wireless communications systems that support techniques for self-interference reporting in accordance with aspects of the present disclosure.

DETAILED DESCRIPTION

Figure 1:
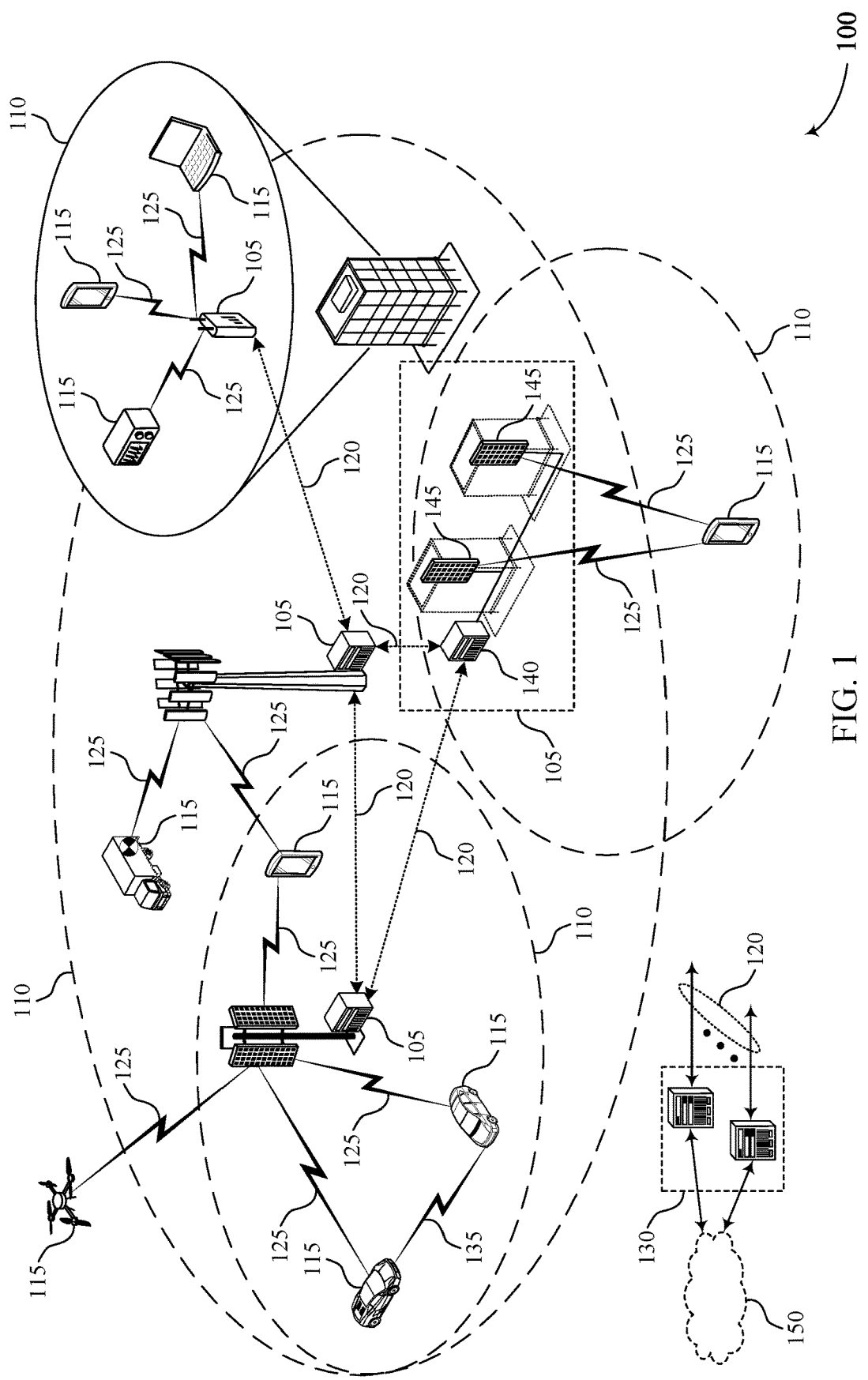
FIG. 1 illustrates an example of a wireless communications system that supports techniques for self-interference reporting in accordance with aspects of the present disclosure.

In some wireless communications systems, some wireless devices (e.g., user equipments (UEs), or mobile terminal nodes of an integrated access and backhaul (IAB) network) may be configured to perform full-duplex communications. When carrying out full-duplex communications, a wireless device may be configured to transmit uplink signals and receive downlink signals concurrently (e.g., within the same slot), using common frequency bands, partially overlapping frequency bands, separate frequency bands, or any combination thereof. Full-duplex communications may reduce latency in wireless communications, and may lead to more efficient resource utilization. However, in some cases, a wireless device may be susceptible to self-interference when carrying out full-duplex communications, which may reduce the efficiency and reliability of communications at the wireless device. For example, during a full-duplex mode of operation, a UE may be configured to transmit uplink signals via a first antenna array and receive downlink signals via a second antenna array during the same time interval (e.g., same slot, concurrently or simultaneously). In this example, uplink signals transmitted via the first antenna array may be received via the second antenna array, and result in interference (e.g., self-interference) with respect to received downlink signals. In such cases, self-interference experienced at the UE may inhibit the effectiveness of full-duplex communications.

Current wireless communications systems do not support signaling or other mechanisms for wireless devices to report self-interference. Therefore, in some conventional systems, a network node (e.g., via a base station, or control node of the IAB network) may configure a wireless device with full-duplex communications without regard for self-interference experienced at the wireless device. Thus, in some cases, a wireless device may be configured by the network to perform full-duplex communications despite significant self-interference experienced at the wireless device which may significantly hamper the ability of the wireless device to perform the full-duplex communications efficiently.

Accordingly, techniques for reporting self-interference experienced at a wireless device are disclosed. In particular, techniques described herein are directed to a wireless device performing self-interference measurements and reporting self-interference according to a reporting configuration. For example, while carrying out full-duplex communications, a wireless device may transmit reference signals (e.g., sounding reference signals (SRSs)) via a first antenna array. In this example, the wireless device may receive the reference signals at a second antenna array of the wireless device, and may perform measurements (e.g., received signal strength indicator (RSSI), reference signal received power (RSRP), reference signal received quality (RSRQ), signal-to-interference-plus-noise ratio (SINR)) on the received reference signals according to a reporting configuration in order to determine self-interference at the wireless device. The wireless device may subsequently transmit a measurement report indicating the measured self-interference to a network node/second wireless device (e.g., base station, or control node of an IAB network). In some aspects, the network node may configure the wireless device with a configuration for full-duplex communications in response to the measurement report. For instance, if the measurement report indicates low levels of self-interference, the network node may configure the wireless device to perform full-duplex communications. Conversely, if the measurement report indicates high levels of self-interference, the network node may refrain from configuring the wireless device for full-duplex communications.

In some aspects, a network node may also provide a configuration for the wireless device to report self-interference. The reporting configuration may include various parameters for measuring self-interference and/or transmitting measurement reports, including indications associated with when measurement reports should be transmitted (e.g., periodically, aperiodically, semi-persistently, event-triggered), thresholds for event-triggered reporting (e.g., transmit measurement report if self-interference exceeds a threshold), time intervals during which the wireless device is to measure self-interference, types of measurements to be performed, and the like. The wireless device may be configured to report self-interference for individual candidate transmit/receive (Tx/Rx) beam pairs, or sets of candidate Tx/Rx beam pairs. As it is used herein, the terms "candidate beam pair" (e.g., a transmit beam of a wireless device and a receive beam of the same wireless device), "candidate transmit beam," "candidate receive beam," and like terms, may refer to beams and/or beam pairs of a wireless device (e.g., UE, base station, IAB node) which may be used by the wireless device for full-duplex communication which are to be measured for self-interference. In some aspects, measurement reports for self-interference may have a different priority relative to other measurement reports (e.g., non-self-interference reports) such that the wireless device may transmit the measurement reports according to the relative priority. For example, self-interference measurement reports may have a higher priority relative to non-self-interference measurement reports, indicating that a UE is to prioritize the transmission of self-interference measurement reports over non-self-interference measurement reports (e.g., to increase the performance of self-interference measurement reporting). By enabling wireless devices to report self-interference for full-duplex communications, the network may configure (or not) the wireless device with configurations for full-duplex communications that improve a reliability and efficiency of wireless communications.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for self-interference reporting.

FIG. 1 illustrates an example of a wireless communications system 100 that supports techniques for self-interference reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit that may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 of the wireless communications system 100 may support techniques for reporting self-interference experienced at a wireless device (e.g., UE 115). In this regard, UEs 115 and other wireless devices of the wireless communications system 100 may be configured to perform self-interference measurements and report determined self-interference according to a reporting configuration. For example, while carrying out full-duplex communications, a UE 115 (e.g., wireless device) of the wireless communications system 100 may transmit SRSs via a first antenna array. In this example, the UE 115 may receive the SRSs at a second antenna array of the UE 115, and may perform measurements (e.g., RSSI, RSRP, SINR) on the received SRSs according to a reporting configuration in order to determine self-interference at the UE 115. The UE 115 may subsequently transmit a measurement report indicating the measured self-interference to a base station 105 of the wireless communications system 100. In some aspects, the base station 105 may configure the UE 115 with a configuration for full-duplex communications in response to the measurement report. For instance, if the measurement report indicates low levels of self-interference, the base station 105 may configure the UE 115 to perform full-duplex communications. Conversely, if the measurement report indicates high levels of self-interference, the base station 105 may refrain from configuring the UE 115 for full-duplex communications.

In some aspects, base stations 105 of the wireless communications system 100 may also indicate configurations for the UEs 115 to report self-interference. A reporting configuration may include various parameters for measuring self-interference and/or transmitting measurement reports, including an indication as to whether measurement reports are to be transmitted periodically, aperiodically, semi-persistently (e.g., in response to MAC-CE, downlink control information (DCI), or other signaling), based on an occurrence of defined events (e.g., measured self-interference satisfying a self-interference threshold), or any combination thereof. Additional parameters associated with a reporting configuration may include thresholds for event-triggered reporting (e.g., transmit measurement report if self-interference exceeds a threshold), time intervals during which the wireless device is to measure self-interference, types of measurements to be performed, and the like.

In some aspects, UEs 115 and other wireless devices of the wireless communications system 100 may be configured to report self-interference for individual Tx/Rx beam pairs, or groups of candidate Tx/Rx beam pairs. In some aspects, measurement reports for self-interference may have a different priority relative to other measurement reports (e.g., non-self-interference reports) such that a UE 115 may transmit the measurement reports according to the relative priority. A relative priority of measurement reports may indicate an order in which measurement reports are to be performed and/or transmitted by the UE 115. For example, self-interference measurement reports may have a higher priority relative to non-self-interference measurement reports, indicating that a UE 115 is to perform and/or transmit of self-interference measurement reports prior to non-self-interference measurement reports.

Techniques described herein may enable wireless devices (e.g., UEs 115, IAB nodes) to perform self-interference measurements and transmit self-interference measurement reports to the network. In particular, the techniques described herein may enable wireless devices to measure and report self-interference which is attributable to full-duplex communications carried out by the respective wireless devices. By enabling wireless devices to report self-interference for full-duplex communications, the network (e.g., base station 105, IAB node) of the wireless communications system 100 may be configured to configure (or refrain from configuring) the wireless devices with configurations for full-duplex communications which improve a reliability and efficiency of wireless communications. In this regard, techniques described herein may enable wireless devices to be configured for full-duplex communications in circumstances where the respective wireless devices may experience relatively little self-interference as a result of the full-duplex communications.

Figure 2:
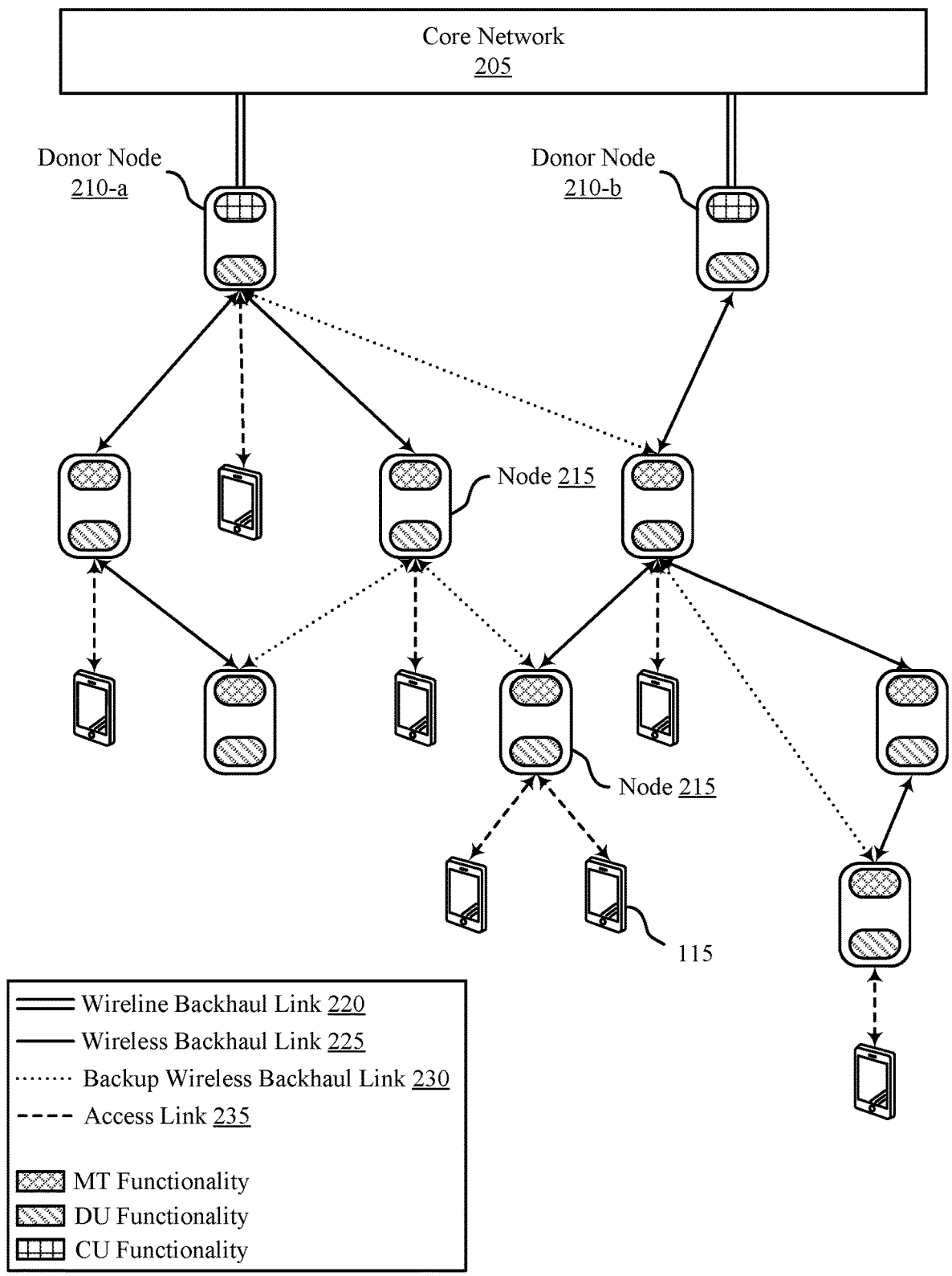
FIG. 2 illustrates an example of a wireless communications system that supports techniques for self-interference reporting in accordance with aspects of the present disclosure.

FIG. 2 illustrates an example of a wireless communications system 200 that supports techniques for self-interference reporting in accordance with aspects of the present disclosure. Wireless communications system 200 (e.g., a New Radio (NR) system, a millimeter wave (mmW) system) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and one or more base stations or supported devices split into one or more support entities (i.e., functionalities) for promoting wireless backhaul density in collaboration with communication access. Aspects of the supporting functionalities of the base stations may be referred to as IAB nodes, such as IAB donor nodes 210 and IAB nodes 215. Wireless communications system 200 may additionally support a number of UEs 115, which may communicate on the uplink with one or more IAB donor nodes 210, IAB nodes 215, or a combination of these devices. In some examples, wireless communications system 200 may implement aspects of wireless communications system 100.

Wireless communications system 200 may include one or more IAB donor nodes 210, which may interface between one or more components in a wireline network and one or more components in a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links 230, access links 235).

An IAB donor node 210 may be functionally split into associated base station central unit (CU) and distributed unit (DU) entities (or "functions"), where one or more DUs associated with an IAB donor node 210 may be partially controlled by an associated CU. CUs of IAB donor nodes 210 may host layer 3 (L3) (e.g., RRC, service data adaption protocol (SDAP), PDCP) functionality and signaling. Further, CUs of IAB donor nodes 210 may communicate with the core network 205 over a wireline backhaul link 220 (e.g., which may be referred to as an NG interface). DUs may host lower layer operations, such as layer 1 (L1) or layer 2 (L2) (e.g., RLC, MAC, physical layer) functionality and signaling. A DU entity of an IAB donor node 210 may support a serving cell within the network coverage area according to connections associated with wireless backhaul links 225 and access links 235 of the IAB network. DUs of the IAB donor nodes 210 may control both access and backhaul links within the corresponding network coverage and may provide controlling and scheduling for descendant (i.e., child, relay) IAB nodes 215 and or UEs 115. For example, a DU may support an RLC channel connection with a UE 115 (e.g., via an access link 235) or with an IAB node 215 (e.g., via a backhaul link, such as a primary wireless backhaul link 225 or a backup wireless backhaul link 230). A DU of a node 215 may be responsible for relaying (e.g., transporting, forwarding) messages from another node (e.g., to a CU and/or the core network 205) so that the other node can register with the core network 205 and establish a secure radio resource control (RRC) connection with the CU of a donor node 210.

IAB nodes 215 may, in some examples, be functionally split into associated mobile terminal (MT) and base station DU entities, where MT functionality of the IAB nodes 215 may be controlled or scheduled by antecedent (i.e., parent) IAB nodes via wireless backhaul links. A parent node to an IAB node 215 may be another (antecedent) IAB node 215 or a donor node 210. The MT functionality may be similar to functionality performed by UEs 115 in the system. An IAB node 215 may not be directly connected to a wireline backhaul link 220. Instead, the IAB node 215 may connect to the core network 205 via other IAB nodes (e.g., any number of additional IAB nodes 215 and an IAB donor node 210) using wireless backhaul links. The IAB node 215 may transmit upstream (e.g., towards the core network 205) in the IAB system using MT functionality. In some cases, DUs of the IAB nodes 215 may be partially controlled by signaling messages from CU entities of an associated IAB donor node 210 (e.g., transmitted via an F1-application protocol (F1-AP)). The DUs of the IAB nodes 215 may support serving cells of the network coverage area. For example, a DU of an IAB node 215 may perform the same or similar functions as a DU of an IAB donor node 210, supporting one or more access links 235 for UEs 115, one or more wireless backhaul links for downstream IAB nodes 215, or both. In some examples, an IAB node 215 is a device, such as a base station or UE (e.g., a UE 115 may be an IAB node).

Wireless communications system 200 may employ relay chains for communications within the IAB network architecture. For example, a UE 115 may communicate with an IAB node, and the IAB node may relay the data to a base station CU or the core network 205 either directly or via one or more IAB nodes 215. Each IAB node 215 may include a primary wireless backhaul link 225 for relaying data upstream or receiving information from a base station CU or the core network 205. In some cases, an IAB node 215 may additionally include one or more backup wireless backhaul links 230 (e.g., for redundant connectivity or improved robustness). If the primary wireless backhaul link 225 fails (e.g., due to interference, malfunction at a connected IAB node, movement of IAB nodes, maintenance at IAB nodes), an IAB node 215 may use a backup wireless backhaul link 230 for backhaul communication within the IAB network. The first (e.g., primary) wireless backhaul link 225 may be associated with a coverage area and MT functionality may be controlled or scheduled by a first parent node. The one or more secondary backhaul links (e.g., backup wireless backhaul links 230) may be associated with a non-collocated coverage area and controlled or scheduled by one or more parent nodes.

Each of the primary backhaul connections and the one or more secondary connections may support spectral capabilities to provide network communication over one or more radio access technologies. The one or more IAB nodes may further support base station DU entities and may support multiple backhaul and access links within the relay chain. The DU entities may control or schedule descendant IAB nodes 215 and UEs 115 within the IAB network (e.g., downstream in the IAB network) via the configured backhaul and access links. That is, an IAB node 215 may act as a relay between an IAB donor node 210 and one or more descendant devices (e.g., other IAB nodes 215, UEs 115) in both communication directions based on established backhaul and access connections.

In some examples, an IAB node 215 may be a mobile IAB node (or other type of IAB node) that is capable of moving, for example, from one location to another. When an IAB node 215 changes locations, or for other reasons, it may be beneficial for the IAB node 215 to be handed over from a source IAB donor node (e.g., IAB donor node 210-a) to a target IAB node (e.g., IAB donor node 210-b) that is better suited to provide connectivity and access to the IAB node 215. As part of the handover process, context information for UEs served by the IAB node 215 may be communicated from the CU of the source IAB donor node 210-a to the CU of the target IAB donor node 210-b. But communicating context information between the CUs of different IAB donor nodes 210 may increase overhead signaling (e.g., handover signaling to all UEs connected to the IAB node 215), which may negatively impact system performance.

According to the techniques described herein, two nodes in a network, such as the source IAB donor node 210-a and the target IAB donor node 210-b, may share a unit, such as a CU, so that the transfer of context information between the two nodes, such as the two IAB donor nodes, is avoided when another node, such as an IAB node 215, is handed over from one of the two nodes to the other, such as the source IAB donor node 210-a to the target IAB donor node 210-b. Such a configuration may logically appear as a single IAB donor node where the CU is common and multiple DUs (one or more belonging to the source, one or more belonging to the target) are connected to the CU.

The shared unit may be dedicated to serving a first type of nodes, such as IAB nodes (e.g., mobile IAB nodes) and may be located separate (e.g., at a distributed server) from other units, such as the DUs of the IAB donor nodes 210. In addition to the shared unit, each IAB donor node 210 may also have a local unit, such as a local CU, that is configured to (e.g., dedicated to) serving a second type of node, such as an IAB node (e.g., immobile IAB nodes). To ensure that a node, such as an IAB node 215, connects to the appropriate unit, such as the appropriate CU, another node, such as an IAB donor node 210, may reference the service type associated with the node, such as the IAB node 215, which may be provided by the node, such as the IAB node 215, or the core network 205.

In some aspects, the techniques described herein in the context of UEs 115 and base stations 105 of wireless communications system 100 illustrated in FIG. 1 may additionally or alternatively be performed by wireless devices of the wireless communications system 200 illustrated in FIG. 2. In this regard, UEs 115 and/or nodes 215 of the wireless communications system 200 may be configured to transmit reference signals according to a full-duplex mode of operation, perform self-interference measurements associated with the full-duplex communications, and may determine a priority associated with transmission of measurement reports associated with self-interference. The UEs 115 and/or nodes 215 may then transmit measurement reports indicative of self-interference according to the reporting configuration to other UEs 115 and/or nodes 215 of the wireless communications system 200.

Figure 3:
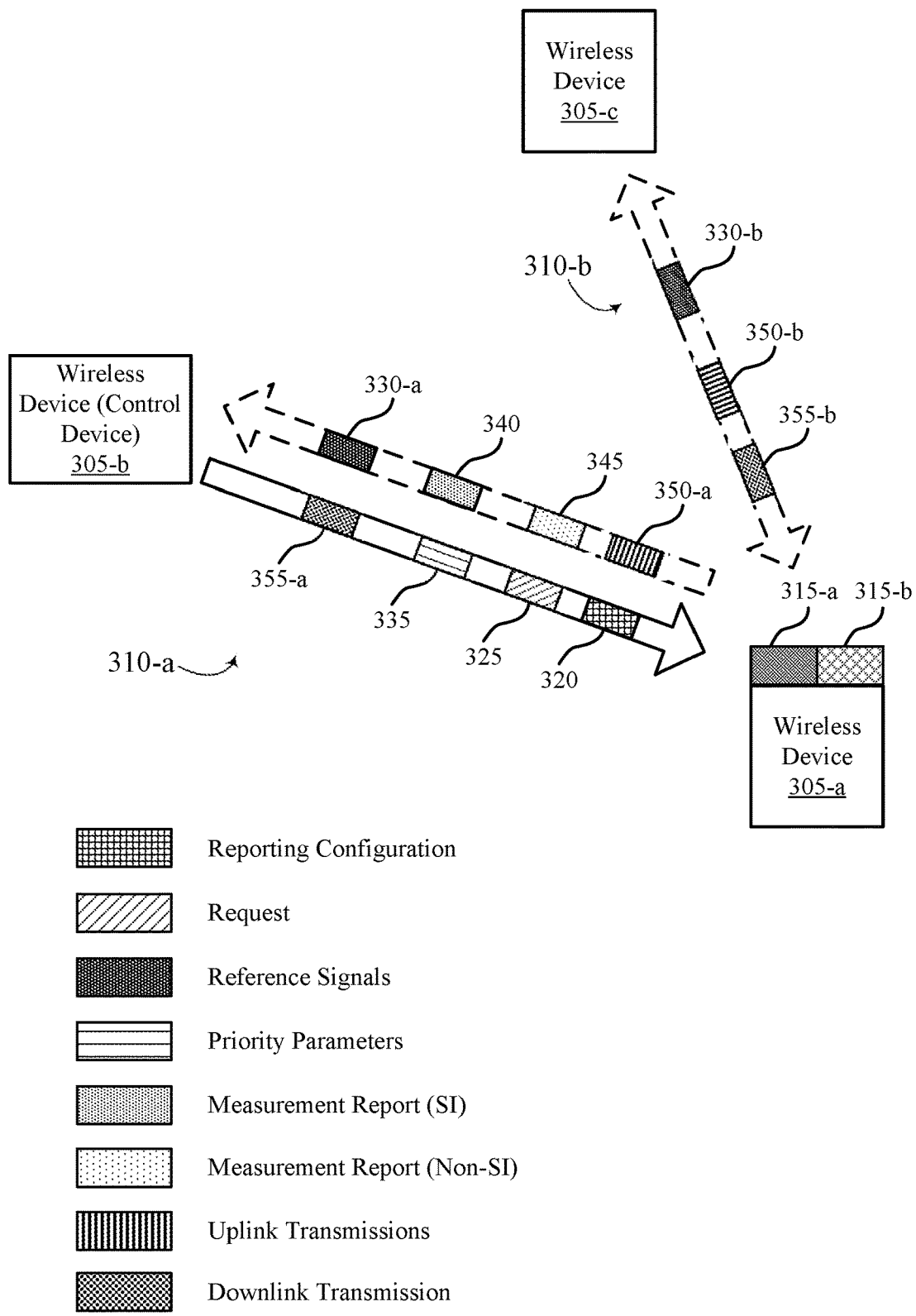
FIG. 3 illustrates an example of a wireless communications system that supports techniques for self-interference reporting in accordance with aspects of the present disclosure.

FIG. 3 illustrates an example of a wireless communications system 300 that supports techniques for self-interference reporting in accordance with aspects of the present disclosure. In some examples, aspects of wireless communications system 200 may implement, or be implemented by, aspects of wireless communications system 100, wireless communications system 200, or both.

The wireless communications system 300 may include a first wireless device 305-a, a second wireless device 305-b, and a third wireless device 305-c, which may be examples of UEs 115, base stations 105, and nodes 215 (e.g., IAB nodes) described with reference to FIGS. 1 and 2. For example, in some cases, the first wireless device 305-a may include a UE 115, and the second wireless device 305-b and the third wireless device 305-c may include base stations 105. By way of another example, in additional or alternative cases, the first wireless device 305-a, the second wireless device 305-b, the third wireless device 305-c, or any combination thereof, may include wireless nodes (e.g., node 215) of an IAB network.

The wireless devices 305 of the wireless communications system 300 may communicate with one another via communication links 310. For example, the first wireless device 305-a may communicate with the second wireless device 305-b via a communication link 310-a. Similarly, the first wireless device 305-a may communicate with the third wireless device 305-c via a communication link 310-b. The communication links 310-a, 310-b may include examples of an access link (e.g., Uu link), a link between nodes of an IAB network (e.g., wireless communications system 200), an F1 application protocol (F1-AP) communication link, a link between two UEs 115 (e.g., a sidelink communication link, or PC5 link), or any combination thereof. In this regard, the communication links 310-a, 310-b may include bi-directional links between the respective wireless devices 305.

The wireless communications system 300 may support techniques for reporting self-interference experienced at a wireless device 305. In this regard, wireless devices 305 of the wireless communications system 300 may be configured to perform self-interference measurements and report determined self-interference according to a reporting configuration. By enabling the wireless devices 305 to report self-interference for full-duplex communications, the network (e.g., wireless device 305-b, or a control device) of the wireless communications system 300 may be configured to configure (or refrain from configuring) the wireless devices with configurations for full-duplex communications that improve a reliability and efficiency of wireless communications within the wireless communications system 300.

For example, as shown in FIG. 3, the first wireless device 305-a may include a first antenna array 315-a and a second antenna array 315-b different from the first antenna array 315-b. Each of the antenna arrays 315 may include an antenna panel including one or more antenna elements. In some aspects, the first wireless device 305-a may be configured to transmit and/or receive signals via each of the first antenna array 315-a and the second antenna array 315-b. Moreover, the first wireless device 305-b may be configured to perform communications via each of the respective antenna arrays 315 independently from one another. In this regard, the first wireless device 305-a may be configured to perform half-duplex communications, full-duplex communications, or both, via the respective antenna arrays 315.

In some aspects, the first wireless device 305-a may receive an indication of a reporting configuration 320 associated with self-interference at the first wireless device 305-a. In some aspects, the reporting configuration 320 may be indicated to the first wireless device 305-a via control signaling (e.g., RRC signaling, synchronization signal block (SSB) signaling, DCI messages). In additional or alternative cases, the first wireless device 305-a may be pre-configured with a reporting configuration 320 for self-interference at the first wireless device 305-a.

In some aspects, the reporting configuration 320 may include a set of parameters for measuring self-interference at the first wireless device 305-a, transmitting measurement reports 340 associated with self-interference at the first wireless device 305-a, or both. Parameters associated with a reporting configuration 320 may include, but are not limited to, indications associated with when the first wireless device 305-a is to transmit measurement reports 340 (e.g., periodically, aperiodically, semi-persistently, event-triggered), measurement thresholds for self-interference, types of self-interference measurements that are to be performed (e.g., RSSI, RSRP, RSRQ, SINR, channel quality indicator (CQI)), time intervals in which self-interference measurements are to be performed, frequency ranges for performing self-interference measurements, beam pair identifiers (e.g., Tx/Rx beam IDs) for performing self-interference measurements, parameters for determining a priority for transmission of self-interference measurement reports 340, resources (e.g., time resources, frequency resources, spatial resources) for transmitting measurement reports 340, or any combination thereof.

For example, the first wireless device 305-a may receive (e.g., from the second wireless device 305-b) an indication that measurement reports 340 associated with self-interference at the first wireless device 305-a are to be reported (e.g., transmitted) periodically, aperiodically, semi-persistently, or any combination thereof. In the case of semi-persistent self-interference reporting, the first wireless device 305-a may be configured to transmit measurement reports 340 for self-interference in response to MAC-CE messages, DCI messages, or other messages received from the second wireless device 305-b. By way of another example, the second wireless device 305-b may indicate other parameters associated with the reporting configuration 320 to the first wireless device 305-a including, but not limited to, a time interval for performing self-interference measurements, measurement thresholds for the self-interference measurements, parameters associated with a priority for transmitting self-interference measurement reports 340, or any combination thereof.

In some aspects, the first wireless device 305-a may receive, from the second wireless device 305-b, a request 325 for a measurement report 340 associated with self-interference at the first wireless device 305-a. In some aspects, the request 325 for the self-interference measurement report 340 may be transmitted via a MAC-CE message, a DCI message, an RRC message, or any combination thereof. In some aspects, the first wireless device 305-a may receive the request 325 based on receiving the indication of the reporting configuration 320 and/or parameters of the reporting configuration 320.

In some aspects, the first wireless device 305-a may transmit reference signals 330 via the first antenna array 315-a of the first wireless device 305-a. The first wireless device 305-a may be configured to transmit the reference signals 330 to the second wireless device 305-b, the third wireless device 305-c, or both. For example, as shown in FIG. 3, the first wireless device 305-a may be configured to transmit reference signals 330-a to the second wireless device 305-b, reference signals 330-b to the third wireless device 305-c, or both. Moreover, the first wireless device 305-a may be configured to transmit the reference signals 330 using one or more transmit beams. In some cases, the first wireless device 305-a may transmit the reference signals 330 while operating in a full-duplex mode of operation. In other words, the first wireless device 305-a my transmit the reference signals while performing full-duplex communications.

The first wireless device 305-a may transmit the reference signals 330 based on receiving the indication of the reporting configuration 320, receiving the request 325 for a self-interference measurement report 340, or both. For example, in some cases, the first wireless device 305-a may be configured to transmit the reference signals 330 using one or more candidate transmit beams indicated in the reporting configuration 320.

The reference signals 330 transmitted by the first wireless device 305-a may include, but are not limited to, SRSs, CSI-RSs, SSB signals, or any combination thereof. For example, in cases where the first wireless device 305-a includes a UE 115, the reference signals 330 may include SRSs. By way of another example, in cases where the first wireless device 305-a includes a wireless node (e.g., node 215) of an IAB network, the reference signals 330 may include CSI-RSs, SSB signals, or both.

In some aspects, the first wireless device 305-a may receive the reference signals 330 transmitted via the first antenna array 315-a with the second antenna array 315-b. In this regard, the first wireless device 305-a may receive the reference signals 330-a, 330-b based on transmitting the reference signals 330, receiving the reporting configuration 320, receiving the request 325 for the self-interference measurement report 340, or any combination thereof.

As noted previously herein, the first wireless device 305-a may be configured to transmit the reference signals 330 via the first antenna array 315-a to the second wireless device 305-b, the third wireless device 305-c, or both. Similarly, the first wireless device 305-a may be configured to receive the reference signals 330 via the second antenna array 315-b within sets of resources that are used for receiving transmissions (e.g., downlink transmissions) from the second wireless device 305-b, the third wireless device 305-c, or both. In this regard, the first wireless device 305-a may be configured to transmit and receive the reference signals 330 within sets of resources which are associated with full-duplex communications with the second wireless device 305-b, the third wireless device 305-c, or both.

For example, in some cases, the first wireless device 305-a may transmit the reference signals 330-a to a first TRP of the second wireless device 305-b, and may receive the reference signals 330-a within a set of resources for receiving signals from a second TRP of the second wireless device 305-b. By way of another example, in other cases, the first wireless device 305-a may transmit the reference signals 330-a to the second wireless device 305-b, and may receive the reference signals 330-a within a set of resources for receiving signals from the third wireless device 305-c. Conversely, in other cases, the first wireless device 305-a may transmit the reference signals 330-b to the third wireless device 305-c, and may receive the reference signals 330-b within a set of resources for receiving signals from the second wireless device 305-b.

In some aspects, the first wireless device 305-a may be configured to transmit the reference signals 330 via the first antenna array 315-a using one or more candidate transmit beams, and may be configured to receive the reference signals 330 via the second antenna array 315-b using one or more candidate receive beams. In some cases, the first wireless device 305-a may be configured to transmit and receive the reference signals 330 using candidate transmit beams and/or candidate receive beams indicated in the reporting configuration 320. Pairs of transmit/receive beams (Tx/Rx beam pairs) may be indicated with the reporting configuration 320 and/or measurement reports 340 via beam pair identifiers (e.g., beam pair IDs).

For example, in some cases, the first wireless device 305-a may be configured (e.g., via the reporting configuration 320) to measure self-interference between each transmit beam and each receive beam supported by the first wireless device (e.g., on a per-beam pair basis). For instance, the first wireless device 305-a may support communications via a first transmit beam, a second transmit beam, and a third transmit beam, as well as via a first receive beam, a second receive beam, and a third receive beam. Thus, the first wireless device 305-a may include nine candidate beam pairs for which self-interference may be measured (e.g., first transmit beam/first receive beam, first transmit beam/second receive beam, first transmit beam/third receive beam, second transmit beam/first receive beam, second transmit beam/second receive beam, second transmit beam/third receive beam, third transmit beam/first receive beam, third transmit beam/second receive beam, third transmit beam/third receive beam). In this example, the first wireless device 305-a may be configured to transmit and receive the reference signals 330 using each candidate beam pair (e.g., each candidate Tx/Rx beam pair). In this regard, the first wireless device 305-a may perform full-duplex communications by crossing multiple candidate transmit beams with multiple candidate receive beams.

In some cases, such as cases where the first wireless device 305-a includes large quantities of candidate beam pairs, the first wireless device 305-a may be configured to transmit and receive reference signals 330 using a subset of the candidate beam pairs (e.g., on a cross-beam pair basis). For example, in some cases, the first wireless device 305-a may transmit the reference signals 330 via the first antenna array 315-a using a single transmit beam, and may receive the reference signals 330 via the second antenna array 315-b using multiple receive beams. In this regard, the first wireless device 305-a may perform full-duplex communications by crossing multiple candidate receive beams with a single transmit beam. By way of another example, the first wireless device 305-a may transmit the reference signals 330 via the first antenna array 315-a using multiple transmit beams, and may receive the reference signals 330 via the second antenna array 315-b using a single receive beam. In this regard, the first wireless device 305-a may perform full-duplex communications by crossing multiple candidate transmit beams with a single receive beam. In some cases, transmitting and receiving the reference signals 330 using a subset of candidate beam pairs may reduce a signaling overhead associated with reporting self-interference measured for the received reference signals 330.

In some aspects, the first wireless device 305-*a* may perform a set of measurements (e.g., self-interference measurements) on the reference signals 330 received at the second antenna array 315-*b* of the first wireless device 305-*a*. In some aspects, the first wireless device 305-*a* may perform the set of measurements according to the reporting configuration 320 for self-interference at the first wireless device 305-*a*. In additional or alternative aspects, the first wireless device 305-*a* may perform the measurements (e.g., self-interference measurements) based on receiving the request 325 for a self-interference measurement report 340, transmitting the reference signals 330 via the first antenna array 315-*a*, receiving the reference signals 330 via the second antenna array 315-*b*, or any combination thereof.

The measurements (e.g., self-interference measurements) performed by the first wireless device 305-*a* may include any measurement that may be used to measure self-inference including, but not limited to, RSSI measurements (e.g., SI-RSSI measurements), RSRP measurements (e.g., SI-RSRP measurements), RSRQ measurements (e.g., SI-RSRQ measurements), SINR measurements (e.g., SINR measurements where interference in SINR includes self-interference), CQI measurements (e.g., CQI measurements where interference in CQI includes self-interference), or any combination thereof. In some aspects, the first wireless device 305-*a* may be configured to associate self-interference measurements with corresponding candidate beam pairs that were used for transmission/reception of the reference signals 330 on which the respective measurements were performed.

In some aspects, the first wireless device 305-*a* may compare the measurements (e.g., self-interference measurements) with one or more measurement thresholds. In some aspects, the first wireless device 305-*a* may compare the measurements to one or more measurement thresholds based on receiving the reporting configuration 320, receiving the request 325 for a self-interference measurement report 340, transmitting the reference signals 330 via the first antenna array 315-*a*, receiving the reference signals 330 via the second antenna array 315-*b*, performing the self-interference measurements on the received reference signals 330, or any combination thereof. For example, the first wireless device 305-*a* may compare the measurements to one or more measurement thresholds received from the second wireless device 305-*b* via the reporting configuration 320.

In some aspects, the first wireless device 305-*a* may compare the measurements to one or more measurement thresholds to determine whether one or more of the performed measurements satisfy the respective measurement thresholds. Some measurements may be determined to satisfy a respective measurement threshold if the measurement is greater than or equal to the respective measurement threshold. For example, the first wireless device 305-*a* may be configured to determine that RSSI measurements, RSRP measurements, or both, satisfy respective measurement thresholds if the RSSI measurements and/or RSRP measurements are greater than or equal to an RSSI threshold and an RSRP threshold, respectively (e.g., thresholds satisfied if RSSI≥Thresh$_{RSSI}$ and/or RSRP≥Thresh$_{RSRP}$). In this example, the first wireless device 305-*a* may be configured to identify that self-interference experienced at the first wireless device 305-*a* as a result of the reference signals 330 is greater than or equal to some self-interference threshold based on the RSSI measurements and/or RSRP measurements satisfying the respective thresholds.

In some aspects, the first wireless device 305-*a* may receive, from the second wireless device 305-*b*, an indication of one or more parameters 335 associated with a priority of transmission of measurement reports 340 for self-interference at the first wireless device 305-*a*. Parameters 335 associated with a priority of transmission of self-interference measurement reports 340 may be indicated via RRC signaling, DCI messages, MAC-CE messages, or any combination thereof. In some aspects, parameters 335 associated with a priority of transmission of self-interference measurement reports 340 may be used to determine a relative priority of self-interference measurement reports 340 as compared to other types of measurement reports 340 (e.g., non-self-interference measurement reports 340) that may be transmitted by the first wireless device 305-*a* (e.g., CSI reports). In other words, the parameters 335 associated with a priority of transmission of self-interference measurement reports 340 may be used to determine whether self-interference measurement reports 340 are to take priority over (e.g., be transmitted before) other non-self-interference measurement reports 340. Therefore, in the event the first wireless device 305-*a* determines that two measurement reports are scheduled to collide with one another (e.g., scheduled over the same time/frequency resources), the first wireless device 305-*a* may be configured to utilize the relative priorities (e.g., parameters 335) of the two measurement reports to determine the order in which the measurement reports are to be multiplexed (or dropped) based on a quantity of bits available for transmitting the respective measurement reports.

In some aspects, the one or more parameters 335 associated with a priority of self-interference measurement reports 340 may be transmitted via separate signaling as the reporting configuration 320. Additionally or alternatively, the parameters 335 associated with the priority of self-interference measurement reports 340 may be transmitted via the same signaling (e.g., RRC signaling, SSBs, DCI messages) as the reporting configuration 320.

The parameters 335 associated with the priority (e.g., priority metrics) associated with a priority of transmission of measurement reports 340 for self-interference at the first wireless device 305-*a* may include any parameters that may be used to signal and/or determine a relative priority of messages between wireless devices (e.g., y values, k values, c values, s values). For example, the second wireless device 305-*b* may indicate, to the first wireless device 305-*a*, a k value (e.g., k=0) associated with a priority of L1 transmission of a self-interference measurement report 340 including RSRP and/or SINR measurements performed on the reference signals 330 received via the second antenna array 315-*b*. In some examples, a k value for L1 transmissions of self-interference measurements (e.g., SI-RSRP, SINR for self-interference) may have a same k value or a different k value as measurement reports for measurements other than self-interference (e.g., non-self-interference measurement reports). For example, in some cases, a first measurement report for self-interference indicating SI-RSRP and a second, non-self-interference report for non-self-interference RSRP measurements may be associated with a same k value (e.g., k=0).

In some aspects, various measurement reports may exhibit varying priorities depending on the type of communications being performed (e.g., half-duplex communications, full-duplex communications). In this regard, measurement reports (e.g., self-interference measurement reports, non-self-interference measurement reports) may be associated with multiple priorities or k values (e.g., first k value for half-duplex communications, second k value for full-duplex communications). For example, while performing half-duplex communications, self-interference measurements may have a lesser priority as compared to non-self-interference measurement reports (e.g., self-interference measurement reports may be associated with a higher k value as compared to non-self-interference measurement reports). Conversely, while performing full-duplex communications, self-interference measurements may have a same or higher priority as compared to non-self-interference measurement reports (e.g., self-interference measurement reports may be associated with a same or lower k value as compared to non-self-interference measurement reports).

In some cases, a k value (e.g., k=1) may be associated with a priority for CSI reports not carrying L1-RSRP or L1-SINR measurements (e.g., L1 CSI reports other than self-interference measurement reports such as self-interference measurement report 340). In some examples, a first y value (e.g., y=0) is for aperiodic CSI reports to be carried on PUSCH; a second y value (e.g., y=1) is for semi-persistent CSI reports to be carried on PUSCH; a third y value (e.g., y=2) is for semi-persistent CSI reports to be carried on PUCCH; and a fourth y value (e.g., y=3) is for periodic CSI reports to be carried on PUCCH. In some examples, c is the serving cell index and s is the reporting configuration identifier (e.g., reportConfigID). In one example, the priority for CSI reports may be determined according to a function based on the y values, k values, c values, and/or s values. Such priority value for a CSI report (e.g., $Pri_{iCSI}$) may be determine in one example according to the equation $Pri_{iCSI}$ (y, k, c, s)=$2 \cdot N_{cells} \cdot M_{sf} \cdot y + N_{cells} \cdot M_s \cdot k + M_s \cdot c + s$. A first CSI report may be said to have priority over second CSI report if the associated $Pri_{iCSI}$ value is lower for the first report than for the second report. In some aspects, parameters for determining relative priorities of measurement reports (e.g., k values) may be indicated via RRC signaling, MAC-CE messages, DCI, or any combination thereof.

In some aspects, the first wireless device 305-a may determine a priority associated with transmission of measurement reports 340 associated with self-interference at the first wireless device 305-a (e.g., priority of self-interference measurement reports 340). Additionally or alternatively, the first wireless device 305-a may determine a priority associated with transmission of other measurement reports 345 that are not associated with self-interference at the first wireless device 305-a (e.g., priority of non-self-interference measurement reports 345). In some aspects, the first wireless device 305-a may determine the priorities of self-interference measurement reports 340 and non-self-interference measurement reports 345 based on receiving the reporting configuration 320, receiving the request 325 for the self-interference measurement report 340, transmitting the refence signals via the first antenna array 315-a, receiving the reference signals 330 via the second antenna array 315-b, performing the self-interference measurements, comparing the self-interference measurements to one or more measurement thresholds, receiving the parameters 335 associated with priority of measurement reports 340, 345, or any combination thereof.

For example, the first wireless device 305-a may receive (or be pre-configured with) parameters (e.g., y values, k values, c values, s values) for determining a priority of self-interference measurement reports 340 and non-self-interference measurement reports 345. In this example, the first wireless device 305-a may determine a priority (e.g., priority value) associated with self-interference measurement reports 340, and may determine a second priority (e.g., second priority value) associated with non-self-interference measurement reports 345. In some examples, the priorities may be the same. Additionally or alternatively, the UE may determine a priority associated with CSI reports not carrying SI measurements, In some cases, the first wireless device 305-a may compare the first priority and the second priority to determine whether self-interference measurement reports 340 have a higher or lower or same priority as compared to non-self-interference measurement reports 345. In some cases, lower priority values may be indicative of higher priority. Therefore, in cases where the first priority value is lower than the second priority value, the first wireless device 305-a may determine that self-interference measurement reports 340 take priority over non-self-interference measurement reports 345. In this regard, the first wireless device 305-a may be configured to determine that self-interference measurement reports 340 are to be transmitted/multiplexed prior to non-self-interference measurement reports 344 when transmission of the measurement reports 340 and 345 are determined to be in conflict.

In additional or alternative aspects, the first wireless device 305-a may be configured (e.g., pre-configured) with the priority for transmitting self-interference measurement reports 340. In such cases, the first wireless device 305-a may be configured to determine a priority for self-interference measurement reports 340 (and/or other measurement reports) without receiving any explicit signaling indicative of priority. For example, in some cases, the first wireless device 305-a may be configured with a priority for transmitting SI-RSRP measurement reports 340.

In some aspects, the first wireless device 305-a may transmit a measurement report 340 including an indication of self-interference for full-duplex communications at the first wireless device 305-a (e.g., self-interference measurement report 340). The measurement report 340 may be transmitted via L1 signaling, L3 signaling, or both. In some aspects, the first wireless device 305-a may transmit the measurement report 340 in accordance with the reporting configuration 320. Moreover, the first wireless device 305-a may transmit the measurement report 340 in accordance with the determined priority for self-interference measurement reports 340. In this regard, the first wireless device 305-a may transmit the measurement report 340 based on receiving the reporting configuration 320, receiving the request 325 for the self-interference measurement report 340, transmitting the reference signals via the first antenna array 315-a, receiving the reference signals 330 via the second antenna array 315-b, performing the self-interference measurements, comparing the self-interference measurements to one or more measurement thresholds, receiving the parameters 335 associated with priority of measurement reports 340, 345, identifying the priorities for measurement report 340, measurement report 345, or any combination thereof.

For example, in cases where the reporting configuration 320 indicates that the first wireless device 305-a is to transmit self-interference measurement reports 340 periodically, aperiodically, and/or semi-persistently (e.g., responsive to MAC-CE messages, DCI messages), the first wireless device 305-a may transmit the measurement report 340 in accordance with the reporting configuration 320. By way of another example, the first wireless device 305-a may transmit the measurement report 340 responsive to the request 325. By way of another example, the first wireless device 305-a may transmit the measurement report 340 based on identifying that one or more self-interference measurements satisfy one or more measurement thresholds (e.g., event-triggered self-interference reporting). For instance, the first wireless device 305-a may transmit the measurement report 340 based on identifying that determined RSSI measurements for the received reference signals 330 and/or RSRP measurements for the received reference signals 330 satisfy respective thresholds (e.g., based on identifying RSSI≥Thresh$_{RSSI}$ and/or RSRP≥Thresh$_{RSRP}$). In this example, the one or more thresholds used to perform event-triggered self-interference reporting may be pre-configured at the first wireless device 305-a, signaled to the first wireless device 305-a via the reporting configuration 320, or both.

The measurement report 340 may include an indication of the self-interference measurements for the reference signals 330 received via the second antenna array 315-b. For example, the measurement report 340 may include an indication of an RSSI for the reference signals 330, an indication of an RSRP for the reference signals 330, an indication of an SINR for the reference signals 330, or any combination thereof. In some aspects, the measurement report 340 may include individual measurements performed at instances in time, statistics of measurements performed over some time interval (e.g., time interval indicated by the second wireless device 305-b), or both. For example, in some cases, the measurement report 340 may include an indication of a maximum measurement (e.g., maximum RSSI measurement, maximum RSRP measurement, maximum SINR measurement) over a time interval, a minimum measurement (e.g., minimum RSSI measurement, minimum RSRP measurement, minimum SINR measurement) over the time interval, an average measurement (e.g., average RSSI measurement, average RSRP measurement, average SINR measurement) over the time interval, a percentage of measurements which satisfy a measurement threshold over the time interval, or any combination thereof.

For instance, in cases where the first wireless device 305-a performs RSSI measurements on received reference signals 330 every tenth of a second over a one second time interval (e.g., ten total RSSI measurements), the measurement report 340 may indicate a maximum RSSI measurement, a minimum RSSI measurement, an average RSSI measurement, a percentage of RSSI measurements which are greater than or equal to a threshold RSSI, or any combination thereof. In this example, the one second time interval may be pre-configured at the first wireless device 305-a, signaled to the first wireless device 305-a via the reporting configuration 320, or both. Moreover, in some cases, a time interval used for performing and/or reporting measurements may be shorter for L1 self-interference reporting as compared to L3 self-interference reporting.

In some aspects, the measurement report 340 may include indications of measurements performed for each candidate beam pair for which reference signals 330 were transmitted and received. In this regard, the measurement report 340 may include measurements on a per-beam pair basis. Moreover, the measurement report 340 may include indications of beam pairs associated with the measurements. For example, in cases where the first wireless device 305-a transmits and receives the reference signals 330 via a single beam pair (e.g., single transmit beam, single receive beam), the measurement report 340 may include a beam pair identifier associated with the beam pair. By way of another example, the first wireless device 305-a may transmit and receive the reference signals 330 via a set of beam pairs, where each beam pair includes a transmit beam and a receive beam. In this example, the measurement report 340 may include a set of beam pair identifiers associated with the set of beam pairs.

In cases where the first wireless device 305-a utilizes various combinations of transmit beams and receive beams to transmit and receive the reference signals 330, the measurement report 340 may indicate measurements as a statistical measure across the respective candidate transmit beams and/or candidate receive beams. In other words, the measurement report 340 may report measurements across a set of candidate transmit beams, a set of candidate receive beams, or both.

For example, in some cases, the first wireless device 305-a may transmit the reference signals 330 via the first antenna array 315-a via a single transmit beam, and may receive the reference signals 330 via the second antenna array 315-b via a set of receive beams (e.g., set of N number of candidate receive beams). In this example, the measurement report 340 may include an indication of measurements associated with at least a subset of receive beams of the set of receive beams. For example, the measurement report 340 may include a maximum measurement across the set of receive beams, a minimum measurement across the set of receive beams, an average measurement across the set of receive beams, a percentage of receive beams of the set of receive beams which are associated with measurements which satisfy respective measurement thresholds (e.g., percentage of qualified receive beams), or any combination thereof. Moreover, the various measurements may be reported for instances in time, across time intervals, or both. In some aspects, the measurement report 340 may include receive beam identifiers (or beam pair identifiers) for the receive beams associated with the reported measurements. For instance, if RSSI measurements are performed for five receive beams, the first wireless device 305-a may indicate that three of the five receive beams include RSSI measurements which satisfy an RSSI threshold, and may include a receive beam identifier (or beam pair identifier) associated with the three receive beams.

By way of another example, the first wireless device 305-a may transmit the reference signals 330 via a set of transmit beams (e.g., set of N number of candidate transmit beams), and may receive the reference signals 330 via a single receive beam. In this example, the measurement report 340 may include an indication of measurements associated with at least a subset of transmit beams of the set of transmit beams. For example, the measurement report 340 may include a maximum measurement across the set of transmit beams, a minimum measurement across the set of transmit beams, an average measurement across the set of transmit beams, a percentage of transmit beams of the set of transmit beams which are associated with measurements which satisfy respective measurement thresholds (e.g., percentage of qualified transmit beams), or any combination thereof. Moreover, the various measurements may be reported for instances in time, across time intervals, or both. In some aspects, the measurement report 340 may include receive beam identifiers (or beam pair identifiers) for the transmit beams associated with the reported measurements.

By way of another example, the first wireless device 305-a may transmit the reference signals 330 via a set of transmit beams (e.g., set of M number of candidate transmit beams), and may receive the reference signals 330 via a set of receive beams (e.g., set of N number of candidate receive beams). In this example, the measurement report 340 may include an indication of measurements associated with at least a subset of transmit beams of the set of transmit beams, at least a subset of receive beams of the set of receive beams, or both. In other words, the measurement report 340 may include measurements for at least a subset of candidate beam pairs of the set of candidate beam pairs used to transmit/receive the reference signals 330. For example, the measurement report 340 may include a maximum measurement across the set of candidate beam pairs, a minimum measurement across the set of candidate beam pairs, an average measurement across the set of candidate beam pairs, a percentage of candidate beam pairs of the set of candidate beam pairs which are associated with measurements which satisfy respective measurement thresholds (e.g., percentage of qualified candidate beam pairs), or any combination thereof.

For instance, the first wireless device 305-a may transmit the reference signals 330 via a single transmit beam, and may receive the reference signals 330 via a set of candidate receive beams (e.g., cross multiple candidate receive beams with a common transmit beam). In this example, the measurement report 340 may report measurement statistics for the set of candidate receive beams at points in time, across a time interval, or both. For example, the measurement report 340 may indicate a maximum measurement across the set of receive beams over a time interval, a minimum measurement across the set of receive beams over a time interval, an average measurement across the set of receive beams over a time interval, or any combination thereof. The measurement report may also indicate a measurements across the time interval (e.g., a time history across the time interval). In such cases, the measurement report may include beam identifiers for the respective receive beams associated with the reported measurements. The measurement report may additionally indicate a percentage of receive beams of the set of receive beams which exhibit self-interference measurements which satisfy one or more measurement thresholds (as well as receive beam identifiers for the respective receive beams). In some cases, the measurement report may include multiple sets of measurements for the set of candidate receive beams over time. For example, the measurement report may indicate a set of measurements performed over a set of measurement intervals, where each set of measurements indicates measurement statistics (e.g., maximum measurement, minimum measurement, average measurement, percentage of receive beams which satisfy a measurement threshold) at each measurement interval of the set of measurement intervals.

By way of another example, the first wireless device 305-a may transmit the reference signals 330 via a set of transmit beams, and may receive the reference signals 330 via a single receive beam (e.g., cross multiple candidate transmit beams with a common receive beam). In this example, the measurement report 340 may report measurement statistics for the set of candidate transmit beams at points in time, across a time interval, or both. For example, the measurement report 340 may indicate a maximum measurement across the set of transmit beams over a time interval, a minimum measurement across the set of transmit beams over a time interval, an average measurement across the set of transmit beams over a time interval, or any combination thereof. The measurement report may also indicate a measurements across the time interval (e.g., a time history across the time interval). In such cases, the measurement report may include beam identifiers for the respective transmit beams associated with the reported measurements. The measurement report may additionally indicate a percentage of transmit beams of the set of transmit beams which exhibit self-interference measurements which satisfy one or more measurement thresholds (as well as receive beam identifiers for the respective transmit beams). In some cases, the measurement report may include multiple sets of measurements for the set of candidate transmit beams over time. For example, the measurement report may indicate a set of measurements performed over a set of measurement intervals, where each set of measurements indicates measurement statistics (e.g., maximum measurement, minimum measurement, average measurement, percentage of receive beams which satisfy a measurement threshold) at each measurement interval of the set of measurement intervals.

By way of another example, the first wireless device 305-a may transmit the reference signals 330 via a set of transmit beams, and may receive the reference signals 330 via a set of receive beams (e.g., cross multiple candidate transmit beams with multiple receive beams). In this example, the measurement report 340 may report measurement statistics for the set of candidate transmit beams and the set of receive beams at points in time, across a time interval, or both. For example, the measurement report 340 may indicate a maximum measurement across the set of transmit beams and/or receive beams over a time interval, a minimum measurement across the set of transmit beams and/or receive beams over a time interval, an average measurement across the set of transmit beams and/or receive beams over a time interval, or any combination thereof. The measurement report may also indicate a measurements across the time interval (e.g., a time history across the time interval). In such cases, the measurement report may include beam identifiers for the respective transmit beams and/or receive beams associated with the reported measurements. The measurement report may additionally indicate a percentage of transmit beams of the set of transmit beams and/or a percentage of receive beams of the set of receive beams which exhibit self-interference measurements which satisfy one or more measurement thresholds (as well as beam identifiers and/or beam pair identifiers for the respective beams and/or beam pairs). In some cases, the measurement report may include multiple sets of measurements for the set of candidate transmit beams and/or the set of candidate receive beams over time. For example, the measurement report may indicate a set of measurements performed over a set of measurement intervals, where each set of measurements indicates measurement statistics (e.g., maximum measurement, minimum measurement, average measurement, percentage of receive beams which satisfy a measurement threshold) at each measurement interval of the set of measurement intervals.

In some aspects, measurement reports for cross-beam reporting of self-interference (e.g., reporting self-interference for multiple receive beams crossed with a single transmit beam, multiple transmit beams crossed with a single receive beam, multiple transmit beams crossed with multiple receive beams) may be performed at instances in time, as statistical measurements over a time interval (e.g., maximum measurement over a time interval, minimum measurement over a time interval, average measurement over a time interval). The measurement reports may be transmitted via L1 signaling, L3 signaling, or both. In some aspects, time intervals for statistical measurements may be shorter for L1 signaling as compared to L3 signaling. For example, when reporting statistical measurements for self-interference over time intervals, a first time interval may be used for L3 reporting, where a second, shorter time interval may be used for L3 reporting.

In some aspects, the measurement report 340 may additionally or alternatively include identifiers (e.g., wireless device identifiers, TRP identifiers, cell identifiers) associated with wireless devices with which the reference signals 330 were transmitted via the first antenna array 315-*a* and/or received via the second antenna array 315-*b*. In other words, the measurement report 340 may include an identifier associated with a wireless device to which the reference signals 330 were transmitted via the first antenna array 315-*a*, as well as an identifier associated with a wireless device associated with resources in which the reference signals 330 were received via the second antenna array 315-*b*.

For example, the first wireless device 305-*a* may transmit the reference signals 330 via the first antenna array 315-*a* to a first TRP of the second wireless device 305-*b*, and may receive the reference signals 330 via the second antenna array 315-*b* within a set of resources for receiving signals from a second TRP of the second wireless device 305-*b*. In this example, the measurement report 340 may include an indication of the second wireless device 305-*b*, the first TRP (e.g., TRP associated with channel measurement resources (CMRs)), the second TRP (e.g., TRP associated with interference measurement resources (IMRs)), or any combination thereof. By way of another example, the first wireless device 305-*a* may transmit the reference signals 330 to the second wireless device 305-*b*, and may receive the reference signals 330 within a set of resources for receiving signals from the third wireless device 305-*c*. In this example, the measurement report 340 may include an indication of the second wireless device 305-*b* (e.g., wireless device associated with CMRs), the third wireless device 305-*c* (e.g., wireless device associated with IMRs), or both.

In some cases, the second wireless device 305-*b* may be configured to adjust or refine candidate beam pairs which are measured for full-duplex communications based on the measurement report 340. In other words, the second wireless device 305-*b* may instruct the first wireless device 305-*b* to measure self-interference associated with additional or alternative candidate beam pairs (e.g., additional or alternative Tx/Rx beam pairs) than those candidate beam pairs which were measured and reported via the measurement report 340.

For example, as noted previously herein, the first wireless device 305-*a* may perform measurements for a set of candidate beam pairs, and may indicate a set of beam pair identifiers associated with the set of candidate beam pairs in the measurement report 340. In this example, the first wireless device 305-*a* may subsequently receive an indication of a subset of beam pair identifiers from the set of beam pair identifiers. The first wireless device 305-*a* may receive the indication of the subset of beam pair identifiers from the second wireless device 305-*b* based on (e.g., in response to) transmitting the measurement report 340. In some cases, the subset of beam pair identifiers may indicate a subset of candidate beam pairs which exhibit the lowest self-interference of the set of candidate beam pairs. In other words, the second wireless device 305-*b* may refine the set of candidate beam pairs by removing a one or more candidate beam pairs which are associated with the highest levels of self-interference.

Continuing with the same example, the first wireless device 305-*a* may transmit additional reference signals 330 via the first antenna array 315-*a* of the first wireless device 305-*a* via one or more transmit beams associated with the subset of beam pair identifiers. The first wireless device 305-*a* may then perform a second set of measurements on the additional reference signals 330 received at the second antenna array 315-*b* via one or more receive beams associated with the subset of beam pair identifiers. Subsequently, the first wireless device 305-*a* may transmit, to the second wireless device 305-*b*, a second measurement report 340 including an indication of self-interference experienced at the first wireless device 305-*a* which is attributable to the additional reference signals 330.

In some aspects, the first wireless device 305-*a* may transmit an additional measurement report 345 (e.g., non-self-interference measurement report 340). In some aspects, the first wireless device 305-*b* may transmit the additional measurement report 345 based on receiving the parameters 335 associated with priority of measurement reports 340, 345, identifying the priorities of measurement reports 340, 345, transmitting the measurement report 340 (e.g., self-interference measurement report 340), or any combination thereof. In particular, the first wireless device 305-*a* may transmit the self-interference measurement report 340 and the additional measurement report 345 (e.g., non-self-interference measurement report 345) based on a comparison of priorities of the respective measurement reports 340, 345. For example, in cases where the first wireless device 305-*a* determines that self-interference measurement reports 340 are associated with a higher priority than non-self-interference measurement reports 345, the first wireless device 305-*a* may transmit the self-interference measurement report 340 prior to transmitting the additional measurement report 345 (non-self-interference measurement report 345).

In some aspects, the first wireless device 305-*a* may receive a configuration for full-duplex communications from the second wireless device 305-*b*. In some aspects, the configuration for full-duplex communications may include an indication of a set of resources (e.g., time resources, frequency resources, spatial resources) which is usable for performing full-duplex communications by the first wireless device 305-*a*. In some cases, the first wireless device 305-*a* may receive the configuration for performance of full-duplex communications based on (e.g., in response to) transmitting the measurement report 340 indicative of self-interference for full-duplex communications at the first wireless device 305-*a*.

In some aspects, the second wireless device 305-*b* may configure (or refrain from configuring) the first wireless device for full-duplex communications based on a relative level of self-interference experienced at the first wireless device 305-*a* as a result of full-duplex communications. For example, in cases where the self-interference measurement report 340 indicates that the first wireless device is highly susceptible to self-interference when performing full-duplex communications (e.g., measurement report 340 indicates high levels of self-interference), the second wireless device 305-*b* may refrain from transmitting a configuration for full-duplex communications (e.g., refrain from configuring the first wireless device 305-*a* for full-duplex communications). Comparatively, in cases where the self-interference measurement report 340 indicates that the first wireless device is not susceptible to self-interference when performing full-duplex communications (e.g., measurement report 340 indicates low levels of self-interference), the second wireless device 305-*b* may configure the first wireless device 305-*a* for full-duplex communications.

Subsequently, the first wireless device 305-*a* may communicate with the second wireless device 305-*b*, the third wireless device 305-*c*, or both, according to the configuration for full-duplex communications received. For example, the first wireless device 305-*b* may exchange transmit uplink signals 350 to the second wireless device 305-*b* and/or third wireless device 305-*c* and may receive downlink signals 355 from the second wireless device 305-*b* and/or third wireless device 305-*c* according to the configuration for full-duplex communications.

Techniques described herein may enable the first wireless device 305-*a* to perform self-interference measurements and transmit self-interference measurement reports 340 to the network (e.g., second wireless device 305-*b*). In particular, the techniques described herein may enable the first wireless device 305-*a* to measure and report self-interference which is attributable to full-duplex communications carried out by the first wireless device 305-*a*. By enabling the first wireless device 305-*a* to report self-interference for full-duplex communications, the network (e.g., second wireless device 305-*b*) may be configured to configure (or refrain from configuring) the first wireless device 305-*a* with configurations for full-duplex communications which improve a reliability and efficiency of wireless communications. In this regard, techniques described herein may enable the first wireless device 305-*a* to be configured (or not) for full-duplex communications in circumstances where the first wireless device 305-*a* may experience relatively little self-interference as a result of the full-duplex communications.

FIGS. 4A-4F illustrates an example of a wireless communications systems 400-*a*, 400-*b*, 400-*c*, 400-*d*, 400-*e*, and 400-*f* which support techniques for self-interference reporting in accordance with aspects of the present disclosure. In some examples, wireless communications systems 400-*a* through 400-*f* may implement, or be implemented by, aspects of wireless communications system 100, 200, 300, or any combination thereof. In particular, the wireless communications systems 400-*a* through 400-*f* illustrate examples of full-duplex communications scenarios which may implement the self-interference techniques described herein.

Figure 4B:
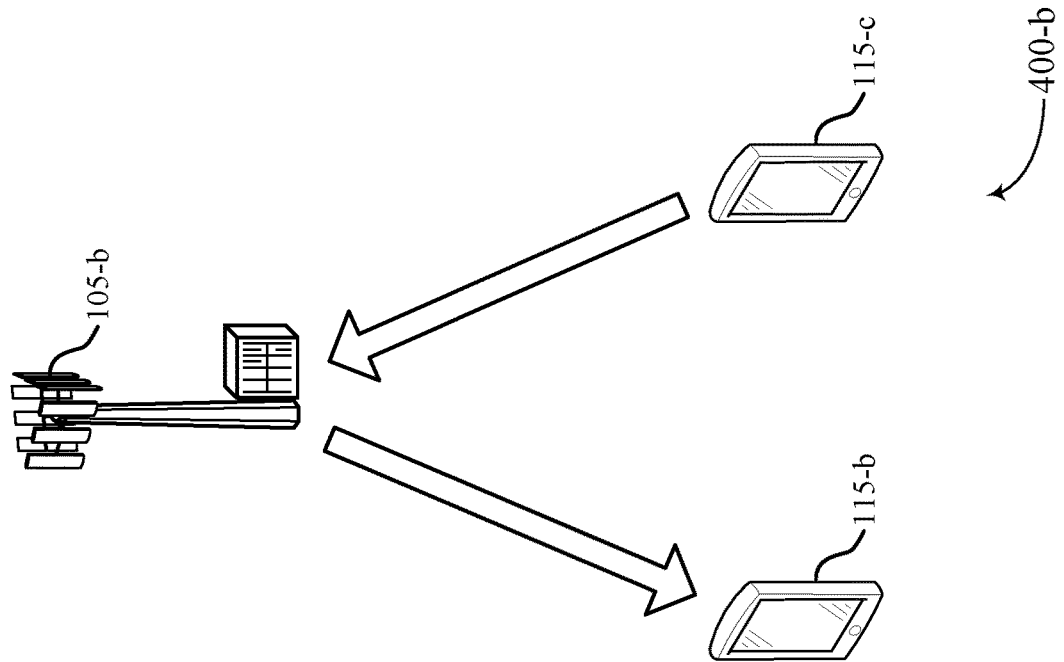
Figure 4A:
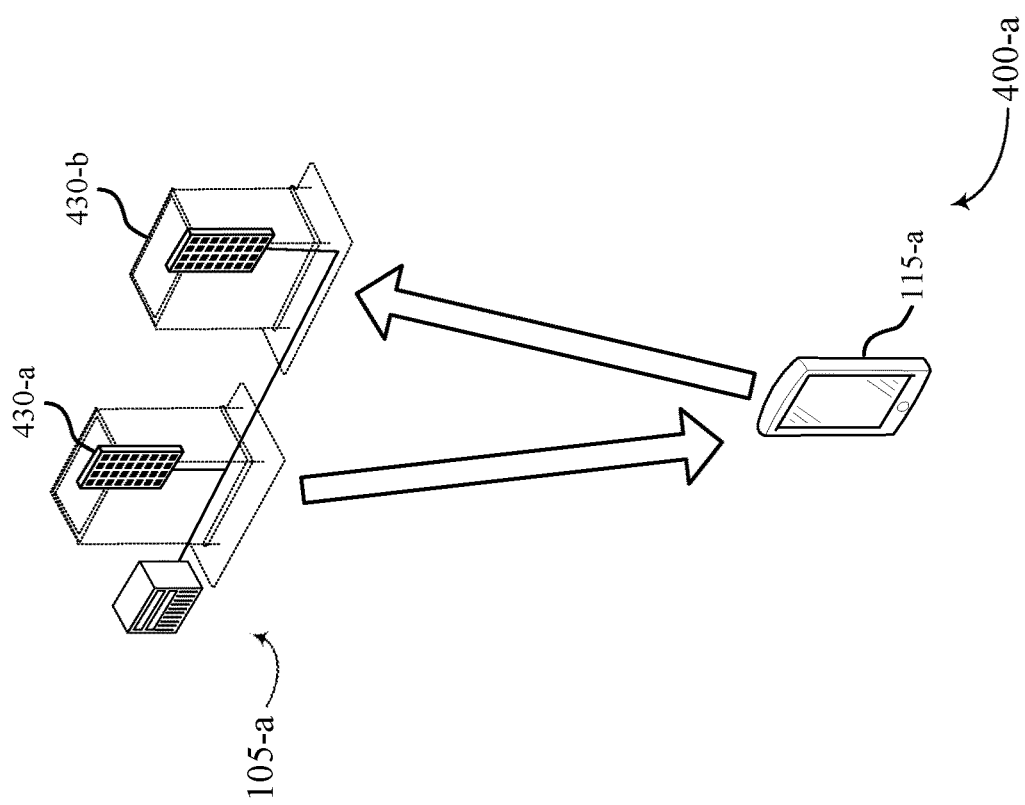

For example, the wireless communications system 400-*a* illustrated in FIG. 4A may include a UE 115-*a* and a base station 105-*a*. The UE 115-*a* may be configured to receive downlink transmissions from a first TRP 430-*a* of the base station 105-*a*, and may be configured to transmit uplink transmissions to a second TRP 430-*b* of the base station 105-*b*. In additional or alternative cases, the base station 105-*a* illustrated in FIG. 4A may also illustrate a DU of a wireless node of an IAB network including multiple TRPs 430, as described previously herein with respect to FIG. 2. Moreover, the UE 115-*a* illustrated in FIG. 4A may additionally or alternatively illustrate an MT node of an IAB network. In some cases, the UE 115-*a* may be configured to perform full-duplex communications by transmitting uplink transmissions to the second TRP 430-*b* and receiving downlink transmissions from the first TRP 430-*b*, where transmission of the uplink transmissions and reception of the downlink transmissions at least partially overlap in the time domain.

In some aspects, the self-interference techniques described in FIGS. 1-3 may additionally or alternatively be performed by the wireless devices of the wireless communications system 400-*a*. For example, the UE 115-*a* (or MT) of the wireless communications system 400-*a* may be configured to transmit reference signals according to a full-duplex mode of operation, perform self-interference measurements associated with the full-duplex communications, and determine a priority associated with transmission of measurement reports associated with self-interference. The UEs 115-*a* (or MT) may then transmit, to the base station 105-*a*, measurement reports indicative of self-interference according to the reporting configuration.

In another example, wireless communications system 400-*b* illustrates a base station 105-*b* configured to perform full-duplex communications with a first UE 115-*a* (or first MT node) and a second UE 115-*c* (or second MT node). In particular, the base station 105-*b* of wireless communications system 400-*b* may be configured to perform full-duplex communications by transmitting downlink transmissions to the first UE 115-*b*, and receiving uplink transmissions from the second UE 115-*c*.

Referring now to FIG. 4C, the wireless communications system 400-*c* may include a UE 115-*d* and a base station 105-*c*. In this example, the UE 115-*d* and the base station 105-*c* may be configured to perform full-duplex communications by exchanging downlink transmissions and uplink transmissions with the other respective device. In this regard, the UE 115-*d* may be configured to perform self-interference measurements described herein by transmitting SRSs to the base station 105-*c* via a first antenna panel, and receiving the transmitted SRSs via a second antenna panel within a set of resources for receiving downlink transmissions from the base station 105-*c*. The UE 115-*d* may then transmit, to the base station 105-*d*, a measurement report indicative of the measured self-interference in accordance with the reporting configuration.

In another example, referring now to FIG. 4D, the wireless communications system 400-*d* may include an IAB node 405-*a* and an IAB node 405-*b*. In this example, the IAB node 405-*a* may include a CU 410-*a* and a DU 415-*a*, and the IAB node 405-*b* may include an MT 420-*a* and a DU 415-*b*. In this example, the IAB nodes 405 may be configured to perform full-duplex communications by exchanging downlink transmissions and uplink transmissions with the other respective device. In this regard, the IAB node 405-*b* may be configured to perform self-interference measurements described herein by transmitting reference signals (e.g., CSI-RS, SSB) to the IAB node 405-*a* via a first antenna panel, and receiving the transmitted reference signals via a second antenna panel within a set of resources for receiving downlink transmissions from the IAB node 405-*a*. The IAB node 405-*b* may then transmit, to the IAB node 405-*a*, a measurement report indicative of the measured self-interference in accordance with the reporting configuration.

Figure 4F:
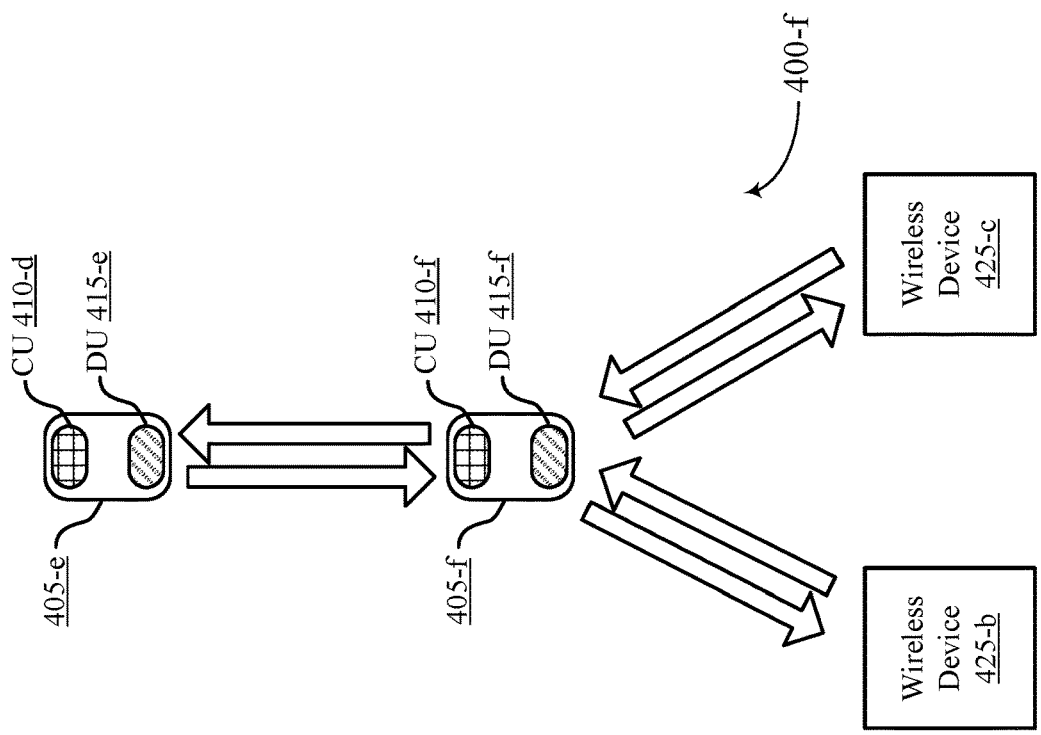
Figure 4E:
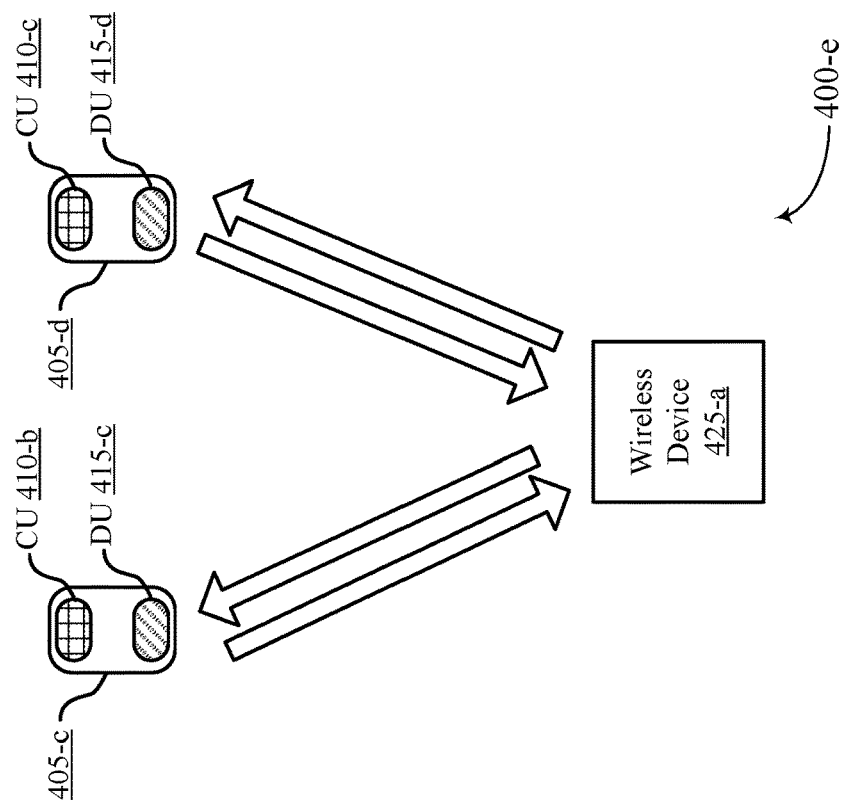

Referring now to FIG. 4E, the wireless communications system 400-*e* may include a wireless device 435-*a*, an IAB node 405-*c*, and an IAB node 405-*c*. The IAB node 405-*c* may include a CU 410-*b* and a DU 415-*c*, and the IAB node 405-*d* may include a CU 410-*c* and a DU 415-*d*. In some aspects, the wireless device 425-*a* may include a UE 115, a wireless node of an IAB network (e.g., another IAB node 405), and the like. In this example, the wireless device 435-*a* of the wireless communications system 400-*d* may be configured to perform full-duplex communications by exchanging downlink transmissions and uplink transmissions with the other respective devices. Moreover, in cases where the wireless device 425-*a* is in a dual-connectivity mode of operation, the wireless device 425-*a* may be configured to establish multiple wireless communications links with the IAB node 405-*c* and/or the IAB node 405-*c* within a common frequency band.

For example, the wireless device 425-*a* may be configured to perform full-duplex communications by transmitting uplink transmissions to the IAB node 405-*c* and receiving downlink transmissions from the IAB node 405-*d*. By way of another example, the wireless device 425-*a* may be configured to perform full-duplex communications by transmitting uplink transmissions to the IAB node 405-*d* and receiving downlink transmissions from the IAB node 405-*c*. In this regard, the UE 115-*d* may be configured to perform self-interference measurements, and transmit measurement reports indicative of measured self-interference to the IAB node 405-*c* and/or the IAB node 405-*d*, as described herein.

Referring now to FIG. 4F, the wireless communications system 400-*e* may include a wireless device 435-*b*, a wireless device 425-*c*, an TAB node 405-*e*, and an TAB node 405-*f*. The TAB node 405-*e* may include a CU 410-*d* and a DU 415-*e*, and the TAB node 405-*f* may include a CU 410-*f* and a DU 415-*f*. In some aspects, the TAB node 405-*e* may be considered a parent node to the TAB node 405-*f*. Similarly, the IAB node 405-*f* may be considered a parent node to the wireless devices 425-*b* and 425-*c*. In some aspects, each of the devices of the wireless communications system 400-*f* may be configured to perform full-duplex communications by exchanging downlink transmissions and uplink transmissions with the other respective devices. Moreover, the wireless devices of the wireless communications system 400-*f* may be configured to perform the self-interference reporting techniques described herein.

For example, the wireless devices 425-*b* and 425-*c* may be configured to perform full-duplex communications with the IAB node 405-*f*, perform self-interference measurements, and transmit measurement reports indicative of measured self-interference to the TAB node 405-*f*. By way of another example, the TAB node 405-*f* may be configured to perform full-duplex communications with any of the wireless device 425-*b*, 425-*c*, TAB node 405-*e*, or any combination thereof. In this example, the TAB node 405-*f* may be configured to perform self-interference measurements, and transmit measurement reports indicative of measured self-interference to the TAB node 405-*e*.

Figure 5:
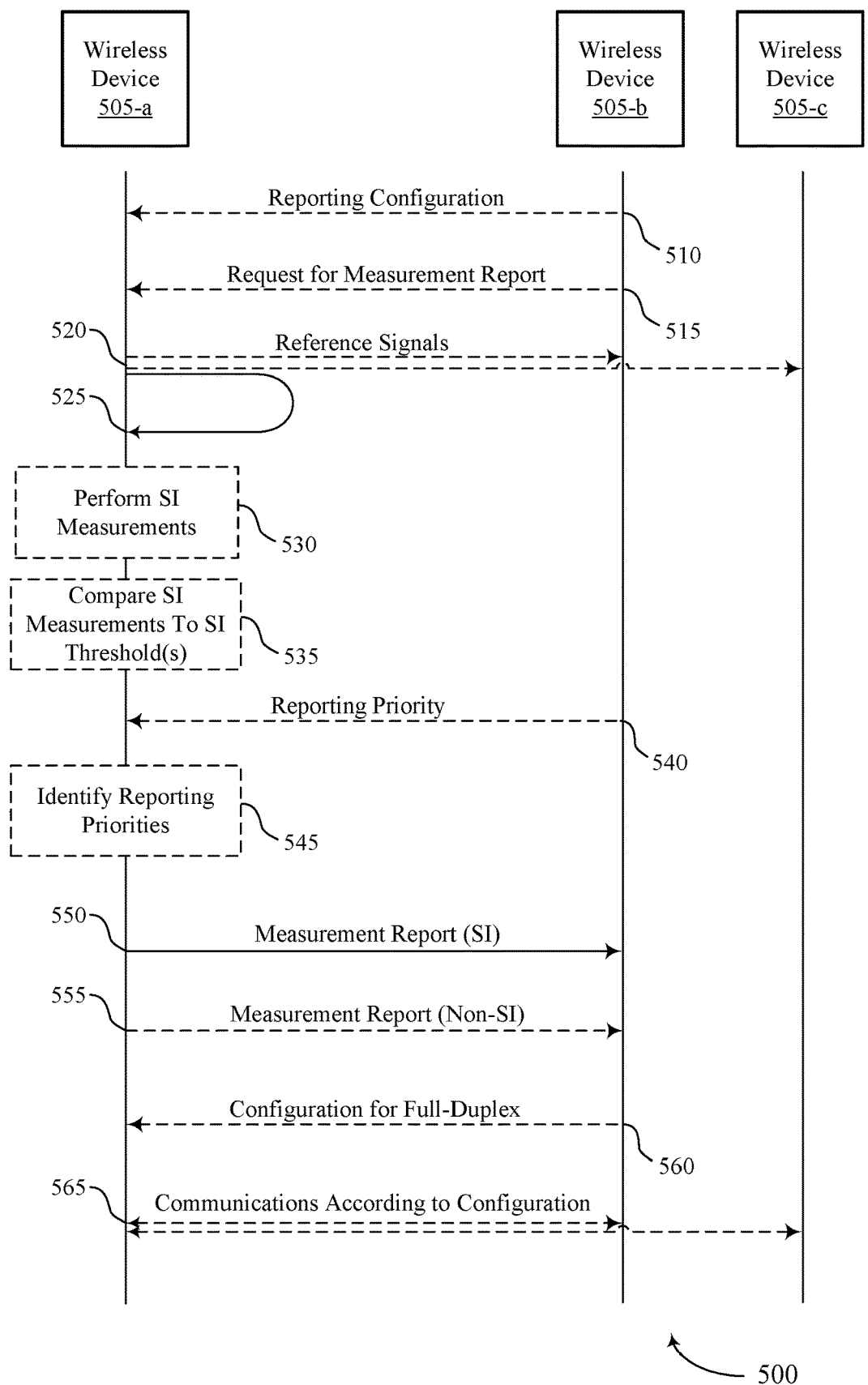
FIG. 5 illustrates an example of a process flow that supports techniques for self-interference reporting in accordance with aspects of the present disclosure.

FIG. 5 illustrates an example of a process flow 500 that supports techniques for self-interference reporting in accordance with aspects of the present disclosure. In some examples, process flow 500 may implement, or be implemented by, aspects of wireless communications systems 100, 200, 300, 400-*a*, 400-*b*, 400-*c*, 400-*d*, 400-*e*, 400-*f*, or any combination thereof. For example, the process flow 500 may illustrate a first wireless device 505-*a* transmitting reference signals, performing self-interference measurements, and transmitting a measurement report indicative of measured self-interference, as described with reference to FIGS. 1-4F.

In some cases, process flow 500 may include a first wireless device 505-*a*, a second wireless device 505-*b*, and a third wireless device 505-*c*, which may be examples of corresponding devices as described herein. In particular, the wireless devices 505 illustrated in FIG. 5 may include UEs 115, base stations 105, and/or wireless nodes of an IAB network. For example, in some cases, the first wireless device 505-*a* may include a UE 115, where the second wireless device 505-*b* and the third wireless device 505-*c* may include base stations 105. By way of another example, in other cases, the first wireless device 505-*a*, the second wireless device 505-*b*, and/or the third wireless device 505-*c* may include wireless nodes of an IAB network.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 510, the first wireless device 505-*a* may receive an indication of a reporting configuration associated with self-interference at the first wireless device 505-*a*. In some aspects, the reporting configuration may be indicated to the first wireless device 505-*a* via control signaling (e.g., RRC signaling). In additional or alternative cases, the first wireless device 505-*a* may be pre-configured with a reporting configuration for self-interference at the first wireless device 505-*a*.

In some aspects, the reporting configuration may include a set of parameters for measuring self-interference at the first wireless device 505-*a*, transmitting measurement reports associated with self-interference at the first wireless device 505-*a*, or both. Parameters associated with a reporting configuration may include, but are not limited to, indications associated with when the first wireless device 505-*a* is to transmit measurement reports (e.g., periodically, aperiodically, semi-persistently, event-triggered), measurement thresholds for self-interference, types of self-interference measurements which are to be performed (e.g., RSSI, RSRP, RSRQ, SINR, CQI), time intervals in which self-interference measurements are to be performed, frequency ranges for performing self-interference measurements, beam pair identifiers (e.g., Tx/Rx beam IDs) for performing self-interference measurements, parameters for determining a priority for transmission of self-interference measurement reports, resources (e.g., time/frequency/spatial resources) for transmitting measurement reports, or any combination thereof.

For example, the first wireless device 505-*a* may receive (e.g., from the second wireless device 505-*b*) an indication that measurement reports associated with self-interference at the first wireless device 505-*a* are to be reported (e.g., transmitted) periodically, aperiodically, semi-persistently, or any combination thereof. In the case of semi-persistent self-interference reporting, the first wireless device 505-*a* may be configured to transmit measurement reports for self-interference in response to MAC-CE messages, DCI messages, or other messages received from the second wireless device 505-*b*. By way of another example, the second wireless device 505-*b* may indicate other parameters associated with the reporting configuration to the first wireless device 505-*a* including, but not limited to, a time interval for performing self-interference measurements, measurement thresholds for the self-interference measurements, parameters associated with a priority for transmitting self-interference measurement reports, or any combination thereof.

At 515, the first wireless device 505-*a* may receive, from the second wireless device 505-*b*, a request for a measurement report associated with self-interference at the first wireless device 505-*a*. In some aspects, the request for the measurement report may be transmitted via a MAC-CE message, a DCI message, an RRC message, or any combination thereof. In some aspects, the first wireless device 505-*a* may receive the request at 515 based on receiving the indication of the reporting configuration and/or parameters of the reporting configuration at 510.

At 520, the first wireless device 505-*a* may transmit reference signals via a first antenna array of the first wireless device 505-*a*. The first wireless device 505-*a* may be configured to transmit the reference signals at 520 to the second wireless device 505-*b*, the third wireless device 505-*c*, or both. Moreover, the first wireless device 505-*a* may be configured to transmit the reference signals using one or more transmit beams. In some cases, the first wireless device 505-a may transmit the reference signals at 520 while operating in a full-duplex mode of operation.

The first wireless device 505-a may transmit the reference signals at 520 based on receiving the indication of the reporting configuration at 510, receiving the request for a measurement report at 515, or both. For example, in some cases, the first wireless device 505-a may be configured to transmit the reference signals at 520 using one or more candidate transmit beams indicated in the reporting configuration received at 510.

The reference signals transmitted at 520 may include, but are not limited to, SRSs, CSI-RSs, SSB signals, or any combination thereof. For example, in cases where the first wireless device 505-a includes a UE 115, the reference signals may include SRSs. By way of another example, in cases where the first wireless device 505-a includes a wireless node (e.g., node 215) of an IAB network, the reference signals may include CSI-RSs, SSB signals, or both.

At 525, the first wireless device 505-a may receive the reference signals transmitted at 520 via a second antenna panel of the first wireless device 505-a which is different from the first antenna panel. In this regard, the first wireless device 505-a may receive the reference signals at 525 based on transmitting the reference signals at 520. Additionally or alternatively, the first wireless device 505-a may receive the reference signals at 525 based on receiving the reporting configuration at 510, receiving the request for the measurement report at 515, or both.

As noted previously herein, the first wireless device 505-a may be configured to transmit the reference signals at 520 to the second wireless device 505-b, the third wireless device 505-c, or both. Similarly, the first wireless device 505-a may be configured to receive the reference signals at 525 within sets of resources which are used for receiving transmissions (e.g., downlink transmissions) from the second wireless device 505-b, the third wireless device 505-c, or both. In this regard, the first wireless device 505-a may be configured to transmit and receive the reference signals within sets of resources which are associated with full-duplex communications with the second wireless device 505-b, the third wireless device 505-c, or both.

For example, in some cases, the first wireless device 505-a may transmit the reference signals at 520 to a first TRP of the second wireless device 505-b, and may receive the reference signals at 525 within a set of resources for receiving signals from a second TRP of the second wireless device 505-b. By way of another example, in other cases, the first wireless device 505-a may transmit the reference signals at 520 to the second wireless device 505-b, and may receive the reference signals at 525 within a set of resources for receiving signals from the third wireless device 505-c. Conversely, in other cases, the first wireless device 505-a may transmit the reference signals at 520 to the third wireless device 505-c, and may receive the reference signals at 525 within a set of resources for receiving signals from the second wireless device 505-b.

In some aspects, the first wireless device 505-a may be configured to transmit the reference signals at 520 using one or more candidate transmit beams, and may be configured to receive the reference signals at 525 using one or more candidate receive beams. In some cases, the first wireless device 505-a may be configured to transmit and receive the reference signals using candidate transmit beams and/or candidate receive beams indicated in the reporting configuration received at 510. Pairs of transmit/receive beams (Tx/Rx beam pairs) may be indicated via beam pair identifiers (e.g., beam pair IDs).

At 530, the first wireless device 505-a may perform a set of measurements (e.g., self-interference measurements) on the reference signals received at the second antenna array of the first wireless device 505-a. In some aspects, the first wireless device 505-a may perform the set of measurements according to the reporting configuration for self-interference at the first wireless device 505-a which was received at 510. In additional or alternative aspects, the first wireless device 505-a may perform the measurements (e.g., self-interference measurements) based on receiving the request for a measurement report at 515, transmitting the reference signals at 520, receiving the reference signals at 525, or any combination thereof.

The measurements performed at 530 may include any measurement which may be used to measure self-inference including, but not limited to, RSSI measurements (e.g., SI-RSSI measurements), RSRP measurements (e.g., SI-RSRP measurements), RSRQ measurements (e.g., SI-RSRQ measurements), SINR measurements (e.g., SINR measurements, where interference in SINR includes self-interference), CQI measurements (e.g., CQI measurements, where interference in CQI includes self-interference), or any combination thereof. In some aspects, the first wireless device 505-a may be configured to associate measurements performed at 530 with corresponding candidate beam pairs which were used for transmission/reception of the reference signals on which the respective measurements were performed.

At 535, the first wireless device 505-a may compare the measurements performed at 530 with one or more measurement thresholds. In some aspects, the first wireless device 505-a may compare the measurements performed at 530 to one or more measurement thresholds based on receiving the reporting configuration at 510, receiving the request for a measurement report at 515, transmitting the reference signals at 520, receiving the reference signals at 525, performing the measurements at 530, or any combination thereof. For example, the first wireless device 505-a may compare the measurements performed at 530 to one or more measurement thresholds received from the second wireless device 505-b via the reporting configuration at 510.

In some aspects, the first wireless device 505-a may compare the measurements to one or more measurement thresholds to determine whether one or more of the performed measurements satisfy the respective measurement thresholds. Some measurements may be determined to satisfy a respective measurement threshold if the measurement is greater than or equal to the respective measurement threshold. For example, the first wireless device 505-a may be configured to determine that RSSI measurements, RSRP measurements, or both, satisfy respective measurement thresholds id. the RSSI measurements and/or RSRP measurements are greater than or equal to an RSSI threshold and an RSRP threshold, respectively (e.g., thresholds satisfied if RSSI≥Thresh$_{RSSI}$ and/or RSRP≥Thresh$_{RSRP}$). In this example, the first wireless device 505-a may be configured to identify that self-interference experienced at the first wireless device 505-a as a result of the reference signals is greater than or equal to some self-interference threshold based on the RSSI measurements and/or RSRP measurements satisfying the respective thresholds.

At 540, the first wireless device 505-a may receive, from the second wireless device 505-b, an indication of one or more parameters associated with a priority of transmission of measurement reports for self-interference at the first wireless device 505-a. Parameters associated with a priority of transmission of self-interference measurement reports may be indicated via RRC signaling, DCI messages, MAC-CE messages, or any combination thereof. In some aspects, parameters associated with a priority of transmission of self-interference measurement reports may be used to determine a relative priority of self-interference measurement reports as compared to other types of measurement reports (e.g., non-self-interference measurement reports) which may be transmitted by the first wireless device 505-a (e.g., CSI reports).

In some aspects, the one or more parameters associated with a priority of self-interference measurement reports may be transmitted via separate signaling as the parameters associated with the reporting configuration received at 510. Additionally or alternatively, the parameters associated with the priority of self-interference measurement reports may be transmitted via the same signaling (e.g., RRC signaling, SSB signaling, DCI messages) as the parameters associated with the reporting configuration received at 510.

The parameters associated with the priority meters associated with a priority of transmission of measurement reports for self-interference at the first wireless device 505-a may include any parameters which may be used to signal and/or determine a relative priority of messages between wireless devices (e.g., y values, k values, c values, s values). For example, the second wireless device 505-b may indicate, to the first wireless device 505-a, a k value (e.g., k=0) associated with a priority of L1 transmission of a self-interference measurement report including RSRP measurements performed on the reference signals received at 525.

At 545, the first wireless device 505-a may determine a priority associated with transmission of measurement reports associated with self-interference at the first wireless device 505-a (e.g., priority of self-interference measurement reports). Additionally or alternatively, the first wireless device 505-a may determine a priority associated with transmission of other measurement reports which are not associated with self-interference at the first wireless device 505-a (e.g., priority of non-self-interference measurement reports). In some aspects, the first wireless device 505-a may determine the priorities of measurement reports at 540 based on receiving the reporting configuration at 510, receiving the request for the measurement report at 515, transmitting the reference signals at 520, receiving the reference signals at 525, performing the measurements at 530, comparing the measurements to measurement thresholds at 535, receiving the parameters associated with priority at 540, or any combination thereof.

At 550, the first wireless device 505-a may transmit a measurement report including an indication of self-interference for full-duplex communications at the first wireless device 505-a. The measurement report may be transmitted via L1 signaling, L3 signaling, or both. In some aspects, the first wireless device 505-a may transmit the measurement report in accordance with the reporting configuration. Moreover, the first wireless device 505-a may transmit the measurement report in accordance with the determined priority for self-interference measurement reports. In this regard, the first wireless device 505-a may transmit the measurement report at 550 based on receiving the reporting configuration at 510, receiving the request for the measurement report at 515, transmitting the reference signals at 520, receiving the reference signals at 525, performing the measurements at 530, comparing the measurements to measurement thresholds at 535, receiving the parameters associated with priority at 540, identifying the priorities for measurement reports at 545, or any combination thereof.

For example, in cases where the reporting configuration indicates that the first wireless device 505-a is to transmit self-interference measurement reports periodically, aperiodically, and/or semi-persistently (e.g., responsive to MAC-CE messages, DCI messages), the first wireless device 505-a may transmit the measurement report at 550 in accordance with the reporting configuration. By way of another example, the first wireless device 505-a may transmit the measurement report at 550 responsive to the request received at 515.

By way of another example, the first wireless device 505-a may transmit the measurement report at 550 based on identifying that one or more measurements performed at 530 satisfy one or more measurement thresholds at 535 (e.g., event-triggered self-interference reporting). For instance, the first wireless device 505-a may transmit the measurement report at 550 based on identifying that determined RSSI measurements and/or RSRP measurements satisfy respective thresholds (e.g., based on identifying RSSI≥Thresh$_{RSSI}$ and/or RSRP Thresh$_{RSRP}$). In this example, the one or more thresholds used to perform event-triggered self-interference reporting may be pre-configured at the first wireless device 505-a, signaled to the first wireless device 505-a via the reporting configuration received at 510, or both.

The measurement report may include an indication of the measurements for the reference signals which were performed at 530. For example, the measurement report may include an indication of an RSSI for the reference signals, an indication of an RSRP for the reference signals, an indication of an SINR for the reference signals, or any combination thereof. In some aspects, the measurement report may include individual measurements performed at instances in time, statistics of measurements performed over some time interval (e.g., time interval indicated by the second wireless device 505-b), or both. For example, in some cases, the measurement report may include an indication of a maximum measurement (e.g., maximum RSSI measurement, maximum RSRP measurement, maximum SINR measurement) over a time interval, a minimum measurement (e.g., minimum RSSI measurement, minimum RSRP measurement, minimum SINR measurement) over the time interval, an average measurement (e.g., average RSSI measurement, average RSRP measurement, average SINR measurement) over the time interval, a percentage of measurements which satisfy a measurement threshold over the time interval, or any combination thereof.

For instance, in cases where the first wireless device 505-a performs RSSI measurements on received reference signals every tenth of a second over a one second time interval (e.g., ten total RSSI measurements), the measurement report may indicate a maximum RSSI measurement, a minimum RSSI measurement, an average RSSI measurement, a percentage of RSSI measurements which are greater than or equal to a threshold RSSI, or any combination thereof. In this example, the one second time interval may be pre-configured at the first wireless device 505-a, signaled to the first wireless device 505-a via the reporting configuration received at 510, or both. Moreover, in some cases, a time interval used for performing and/or reporting measurements may be shorter for L1 self-interference reporting as compared to L3 self-interference reporting.

In some aspects, the measurement report may include indications of measurements performed for each candidate beam pair for which reference signals were transmitted and received. In this regard, the measurement report may include measurements on a per-beam pair basis. Moreover, the measurement report may include indications of beam pairs associated with the measurements. For example, in cases where the first wireless device 505-*a* transmits and receives the reference signals at 520 and 525 via a single beam pair (e.g., single transmit beam, single receive beam), the measurement report may include a beam pair identifier associated with the beam pair. By way of another example, the first wireless device 505-*a* may transmit and receive the reference signals at 520 and 525 via a set of beam pairs, where each beam pair includes a transmit beam and a receive beam. In this example, the measurement report may include a set of beam pair identifiers associated with the set of beam pairs.

In cases where the first wireless device 505-*a* utilizes various combinations of transmit beams and receive beams to transmit and receive the reference signals, the measurement report may indicate measurements as a statistical measure across the respective candidate transmit beams and/or candidate receive beams. In other words, the measurement report may report measurements across a set of candidate transmit beams, a set of candidate receive beams, or both.

In some aspects, the measurement report may additionally or alternatively include identifiers (e.g., wireless device identifiers, TRP identifiers, cell identifiers) associated with wireless devices with which the reference signals were transmitted and received at 520 and 525. In other words, the measurement report may include an identifier associated with a wireless device to which the reference signals were transmitted at 520, as well as an identifier associated with a wireless device associated with resources in which the reference signals were received at 525.

For example, as noted previously herein, the first wireless device 505-*a* may transmit the reference signals at 520 via the first antenna array to a first TRP of the second wireless device 505-*b*, and may receive the reference signals at 525 via the second antenna array within a set of resources for receiving signals from a second TRP of the second wireless device 505-*b*. In this example, the measurement report may include an indication of the second wireless device 505-*b*, the first TRP (e.g., TRP associated with CMRs), the second TRP (e.g., TRP associated with IMRs), or any combination thereof. By way of another example, the first wireless device 505-*a* may transmit the reference signals at 520 to the second wireless device 505-*b*, and may receive the reference signals at 525 within a set of resources for receiving signals from the third wireless device 505-*c*. In this example, the measurement report may include an indication of the second wireless device 505-*b* (e.g., wireless device associated with CMRs), the third wireless device 505-*c* (e.g., wireless device associated with IMRs), or both.

In some cases, the second wireless device 505-*b* may be configured to adjust or refine candidate beam pairs which are measured for full-duplex communications based on the measurement report received at 550. In other words, the second wireless device 505-*b* may instruct the first wireless device 505-*b* to measure self-interference associated with additional or alternative candidate beam pairs (e.g., additional or alternative Tx/Rx beam pairs) than those candidate beam pairs which were measured at 530 and reported at 550.

For example, as noted previously herein, the first wireless device 505-*a* may perform measurements for a set of candidate beam pairs, and may indicate a set of candidate beam pair identifiers associated with the set of candidate beam pairs in the measurement report. In this example, the first wireless device 505-*a* may subsequently receive an indication of a subset of beam pair identifiers from the set of beam pair identifiers. The first wireless device 505-*a* may receive the indication of the subset of beam pair identifiers from the second wireless device 505-*b* based on (e.g., in response to) transmitting the measurement report at 550. In some cases, the subset of beam pair identifiers may indicate a subset of candidate beam pairs which exhibit the lowest self-interference of the set of candidate beam pairs. In other words, the second wireless device 505-*b* may refine the set of candidate beam pairs by removing a one or more candidate beam pairs which are associated with the highest levels of self-interference.

Continuing with the same example, the first wireless device 505-*a* may perform steps 520, 525, 530, 535, 550, or any combination thereof, using a subset of candidate beam pairs associated with the subset of beam pair identifiers. In this regard, the first wireless device 505-*a* may transmit additional reference signals via the first antenna array of the first wireless device via one or more transmit beams associated with the subset of beam pair identifiers (e.g., repeat steps 520 and 525 with the subset of candidate beam pairs). The first wireless device 505-*a* may then perform a second set of measurements on the additional reference signals received at the second antenna array via one or more receive beams associated with the subset of beam pair identifiers (e.g., repeat step 530 with the subset of candidate beam pairs). Subsequently, the first wireless device 505-*a* may transmit, to the second wireless device 505-*b*, a second measurement report including an indication of self-interference experienced at the first wireless device 505-*a* which is attributable to the additional reference signals (e.g., repeat step 550 for the subset of candidate beam pairs).

At 555, the first wireless device 505-*a* may transmit an additional measurement report (e.g., non-self-interference measurement report). In some aspects, the first wireless device 505-*b* may transmit the additional measurement report at 555 based on receiving the parameters associated with priority at 540, identifying the priorities of measurement reports at 545, transmitting the measurement report (e.g., self-interference measurement report) at 550, or any combination thereof. In particular, the first wireless device 505-*a* may transmit the measurement reports at 550 and the additional measurement report at 555 based on a comparison of priorities of the respective measurement reports. For example, in cases where the first wireless device 505-*a* determines that self-interference measurement reports are associated with a higher priority than non-self-interference measurement reports, the first wireless device 505-*a* may transmit the self-interference measurement report at 550 prior to transmitting the additional measurement report (non-self-interference measurement report) at 555.

At 560, the first wireless device 505-*a* may receive a configuration for full-duplex communications from the second wireless device 505-*b*. In some aspects, the configuration for full-duplex communications may include an indication of a set of resources (e.g., time resources, frequency resources, spatial resources) which is usable for performing full-duplex communications by the first wireless device 505-*a*. In some cases, the first wireless device 505-*a* may receive the configuration at 560 based on (e.g., in response to) transmitting the measurement report indicative of self-interference for full-duplex communications at 550.

In some aspects, the second wireless device 505-*b* may configure (or refrain from configuring) the first wireless device for full-duplex communications based on a relative level of self-interference experienced at the first wireless device 505-*a* as a result of full-duplex communications. For example, in cases where the measurement report transmitted at 550 indicates that the first wireless device is highly susceptible to self-interference when performing full-duplex communications (e.g., measurement report indicates high levels of self-interference), the second wireless device 505-b may refrain from transmitting a configuration for full-duplex communications at 560. Comparatively, in cases where the measurement report transmitted at 550 indicates that the first wireless device is not susceptible to self-interference when performing full-duplex communications (e.g., measurement report indicates low levels of self-interference), the second wireless device 505-b may configure the first wireless device 505-a for full-duplex communications at 560.

At 565, the first wireless device 505-a may communicate with the second wireless device 505-b, the third wireless device 505-c, or both, according to the configuration for full-duplex communications received at 560. For example, the first wireless device 505-b may exchange signals with the second wireless device 505-b and/or the third wireless device 505-c according to the configuration for full-duplex communications.

Techniques described herein may enable the first wireless device 505-a to perform self-interference measurements and transmit self-interference measurement reports to the network (e.g., second wireless device 505-b). In particular, the techniques described herein may enable the first wireless device 505-a to measure and report self-interference which is attributable to full-duplex communications carried out by the first wireless device 505-a. By enabling the first wireless device 505-a to report self-interference for full-duplex communications, the network (e.g., second wireless device 505-b) may be configured to configure (or refrain from configuring) the first wireless device 505-a with configurations for full-duplex communications which improve a reliability and efficiency of wireless communications. In this regard, techniques described herein may enable the first wireless device 505-a to be configured (or not) for full-duplex communications in circumstances where the first wireless device 505-a may experience relatively little self-interference as a result of the full-duplex communications.

Figure 6:
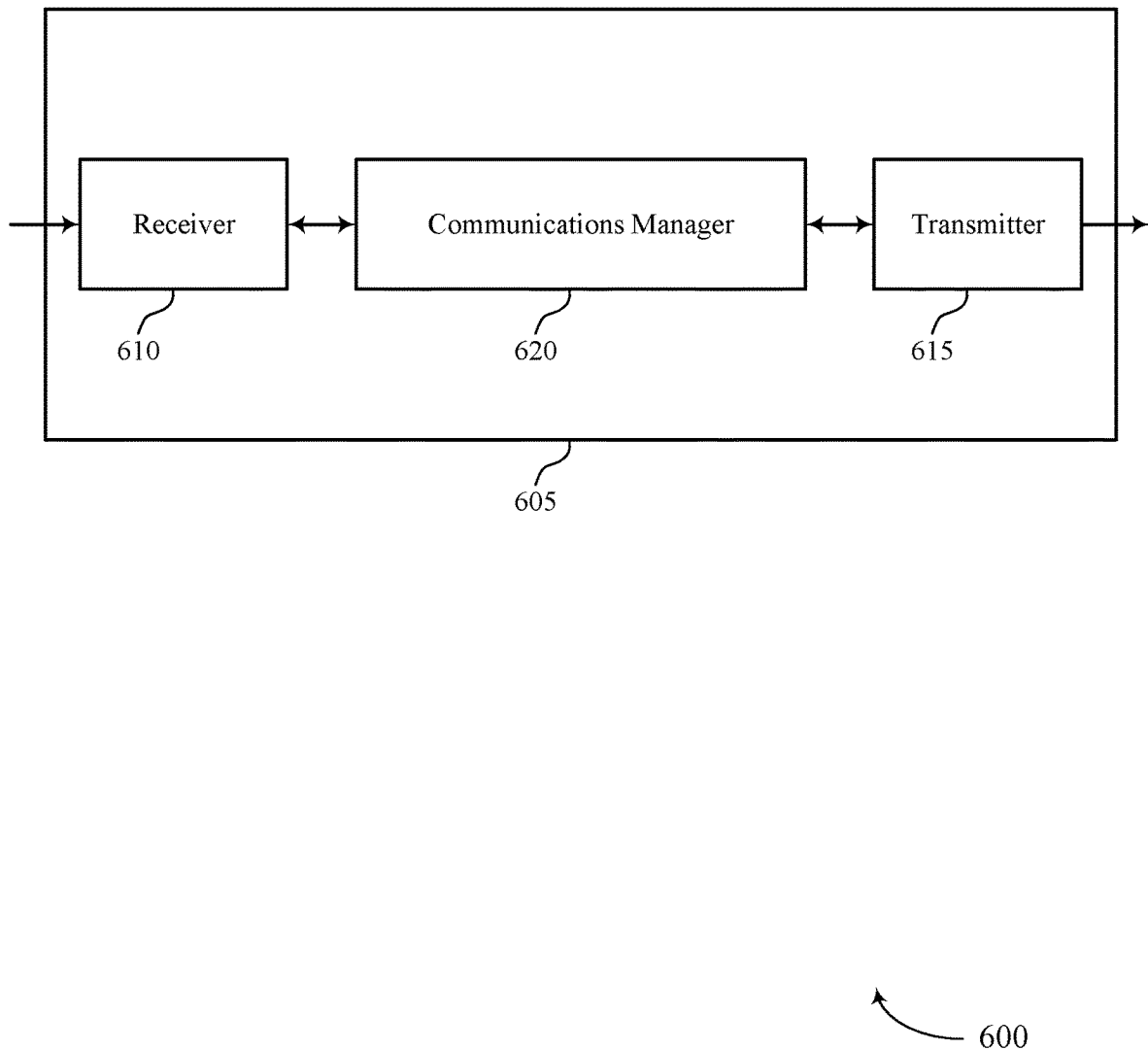
FIGS. 6 and 7 show block diagrams of devices that support techniques for self-interference reporting in accordance with aspects of the present disclosure.

FIG. 6 shows a block diagram 600 of a device 605 that supports techniques for self-interference reporting in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for self-interference reporting). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for self-interference reporting). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for self-interference reporting as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. For example, the communications manager 620 may be configured as or otherwise support a means for transmitting reference signals via a first antenna array of the first wireless device. The communications manager 620 may be configured as or otherwise support a means for performing, according to a reporting configuration for self-interference at the first wireless device, a set of measurements on the reference signals received at a second antenna array of the first wireless device. The communications manager 620 may be configured as or otherwise support a means for determining a priority associated with transmission of measurement reports associated with self-interference at the first wireless device. The communications manager 620 may be configured as or otherwise support a means for transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for self-interference measurement and reporting. In particular, the techniques described herein may enable wireless devices to measure and report self-interference which is attributable to full-duplex communications carried out by the respective wireless devices. By enabling wireless devices to report self-interference for full-duplex communications, the network may be configured to configure (or refrain from configuring) the respective wireless devices with configurations for full-duplex communications which improve a reliability and efficiency of wireless communications. In this regard, techniques described herein may enable wireless devices to be configured (or not) for full-duplex communications in circumstances where the respective wireless devices may experience relatively little self-interference as a result of the full-duplex communications. Thus, techniques described herein may lead to more efficient resource utilization and improved reliability and efficiency of wireless communications.

Figure 7:
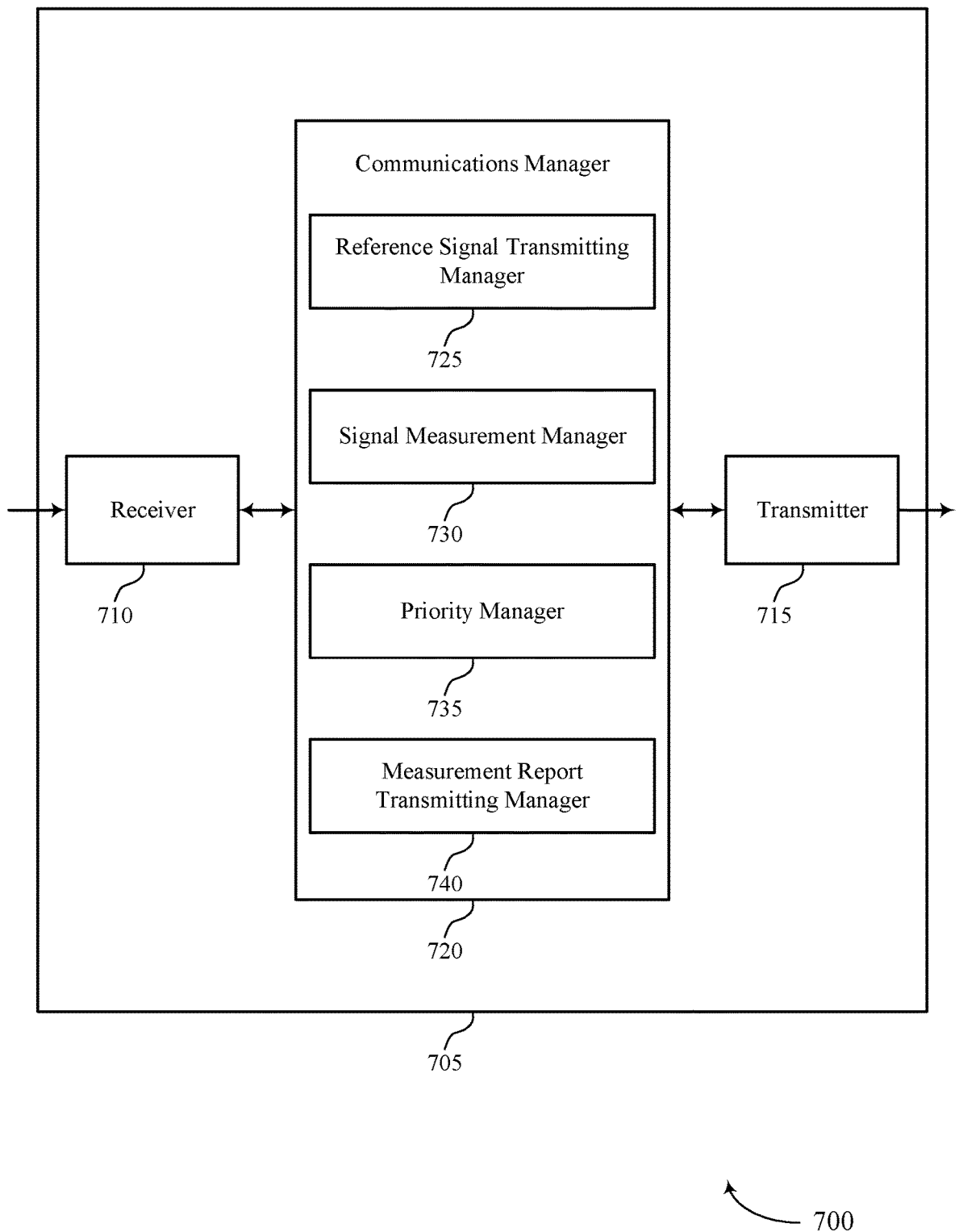

FIG. 7 shows a block diagram 700 of a device 705 that supports techniques for self-interference reporting in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for self-interference reporting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for self-interference reporting). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for self-interference reporting as described herein. For example, the communications manager 720 may include a reference signal transmitting manager 725, a signal measurement manager 730, a priority manager 735, a measurement report transmitting manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first wireless device in accordance with examples as disclosed herein. The reference signal transmitting manager 725 may be configured as or otherwise support a means for transmitting reference signals via a first antenna array of the first wireless device. The signal measurement manager 730 may be configured as or otherwise support a means for performing, according to a reporting configuration for self-interference at the first wireless device, a set of measurements on the reference signals received at a second antenna array of the first wireless device. The priority manager 735 may be configured as or otherwise support a means for determining a priority associated with transmission of measurement reports associated with self-interference at the first wireless device. The measurement report transmitting manager 740 may be configured as or otherwise support a means for transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

Figure 8:
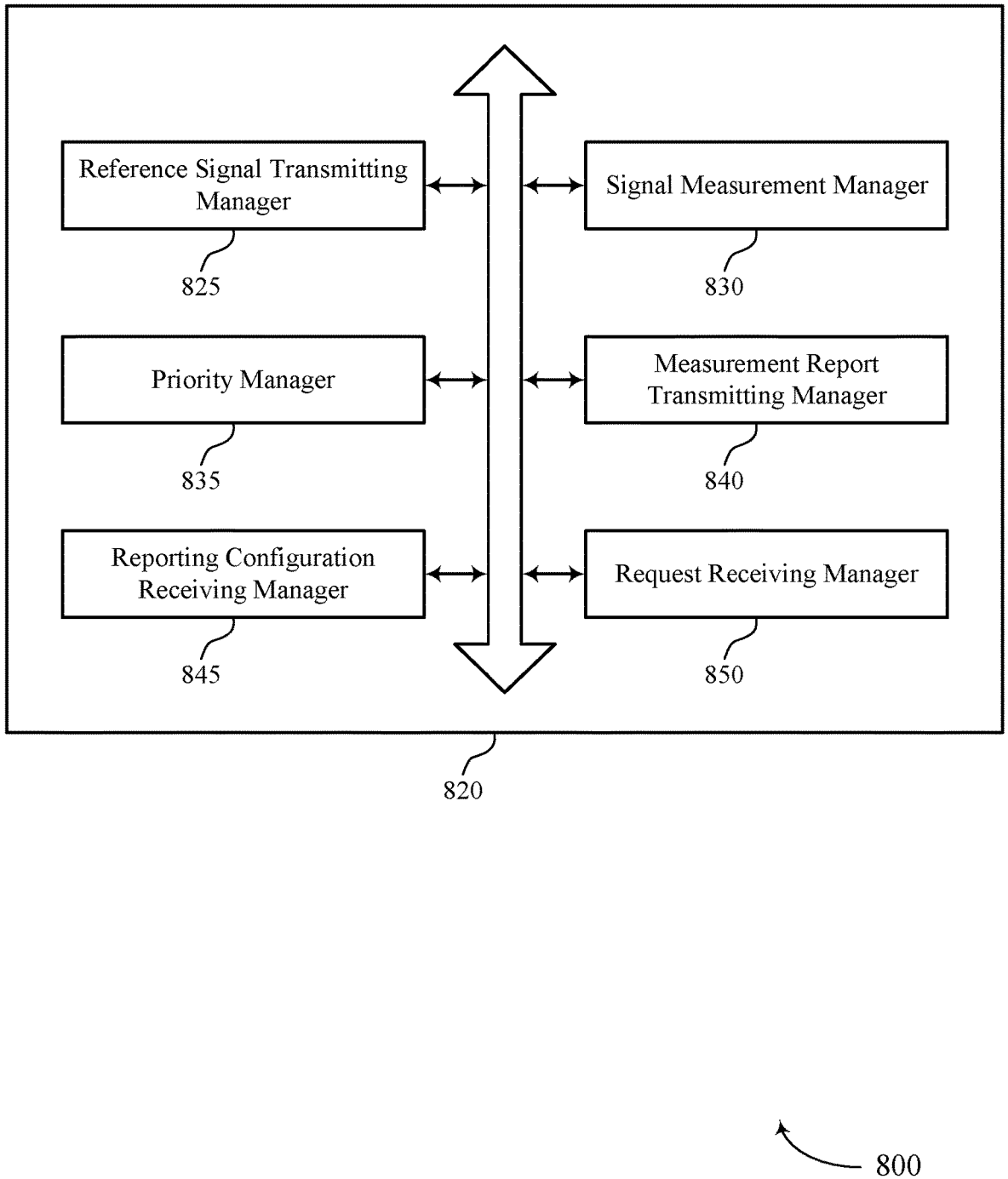
FIG. 8 shows a block diagram of a communications manager that supports techniques for self-interference reporting in accordance with aspects of the present disclosure.

FIG. 8 shows a block diagram 800 of a communications manager 820 that supports techniques for self-interference reporting in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for self-interference reporting as described herein. For example, the communications manager 820 may include a reference signal transmitting manager 825, a signal measurement manager 830, a priority manager 835, a measurement report transmitting manager 840, a reporting configuration receiving manager 845, a request receiving manager 850, or any combination thereof. Each of these components may communicate, directly or indirectly, with one another (e.g., via one or more buses).

The communications manager 820 may support wireless communication at a first wireless device in accordance with examples as disclosed herein. The reference signal transmitting manager 825 may be configured as or otherwise support a means for transmitting reference signals via a first antenna array of the first wireless device. The signal measurement manager 830 may be configured as or otherwise support a means for performing, according to a reporting configuration for self-interference at the first wireless device, a set of measurements on the reference signals received at a second antenna array of the first wireless device. The priority manager 835 may be configured as or otherwise support a means for determining a priority associated with transmission of measurement reports associated with self-interference at the first wireless device. The measurement report transmitting manager 840 may be configured as or otherwise support a means for transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

In some examples, the reporting configuration receiving manager 845 may be configured as or otherwise support a means for receiving, from the second wireless device, an indication of the reporting configuration, where performing the set of measurements, transmitting the measurement report, or both, is based on receiving the indication of the reporting configuration.

In some examples, the reporting configuration receiving manager 845 may be configured as or otherwise support a means for receiving, from the second wireless device, an indication to transmit measurement reports associated with self-interference at the first wireless device periodically, aperiodically, semi-persistently, or a combination thereof, where transmitting the measurement report is based on the indication to transmit the measurement reports.

In some examples, the request receiving manager 850 may be configured as or otherwise support a means for receiving, from the second wireless device, a request for the measurement report, where transmitting the measurement report is based on receiving the request.

In some examples, the request includes a MAC control element, a DCI message, a radio resource control message, or any combination thereof.

In some examples, the signal measurement manager 830 may be configured as or otherwise support a means for receiving, from the second wireless device, an indication of one or more measurement thresholds. In some examples, the signal measurement manager 830 may be configured as or otherwise support a means for identifying that one or more measurements of the set of measurements satisfy at least one measurement threshold of the one or more measurement thresholds, where transmitting the measurement report is based on the identifying.

In some examples, the measurement report transmitting manager 840 may be configured as or otherwise support a means for transmitting, via the measurement report, an indication of a RSSI for the reference signals, a RSRP for the reference signals, a SINR for the reference signals, or any combination thereof.

In some examples, the measurement report transmitting manager 840 may be configured as or otherwise support a means for transmitting, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

In some examples, the signal measurement manager 830 may be configured as or otherwise support a means for receiving, from the second wireless device, an indication of the time interval, where performing the set of measurements, transmitting the measurement report, or both, is based on the time interval, where the set of measurements are performed within the time interval.

In some examples, the reference signals are transmitted via the first antenna array on a transmit beam, and the measurement report transmitting manager 840 may be configured as or otherwise support a means for transmitting, via the measurement report, an identifier of a beam pair including the transmit beam and the receive beam.

In some examples, the reference signals are transmitted via the first antenna array via a set of one or more transmit beams, and the measurement report transmitting manager 840 may be configured as or otherwise support a means for transmitting, via the measurement report, a set of beam pair identifiers associated with one or more beam pairs, where each beam pair includes a transmit beam from the set of one or more transmit beams and a receive beam from the set of one or more receive beams.

In some examples, the signal measurement manager 830 may be configured as or otherwise support a means for receiving, from the second wireless device, a first indication of the set of one or more transmit beams, a second indication of the set of one or more receive beams, or both.

In some examples, the signal measurement manager 830 may be configured as or otherwise support a means for receiving, from the second wireless device based on transmitting the measurement report, an indication of a subset of beam pair identifiers from the set of beam pair identifiers. In some examples, the reference signal transmitting manager 825 may be configured as or otherwise support a means for transmitting additional reference signals via the first antenna array of the first wireless device via one or more transmit beams associated with the subset of beam pair identifiers. In some examples, the signal measurement manager 830 may be configured as or otherwise support a means for performing a second set of measurements on the additional reference signals received at the second antenna array via one or more receive beams associated with the subset of beam pair identifiers. In some examples, the measurement report transmitting manager 840 may be configured as or otherwise support a means for transmitting, to the second wireless device, a second measurement report including an indication of self-interference experienced at the first wireless device which is attributable to the additional reference signals.

In some examples, the reference signals are transmitted via the first antenna array via a single transmit beam, the reference signals are received via the second antenna array via a set of multiple receive beams, and the method further includes transmitting, via the measurement report, an indication of measurements associated with at least a subset of receive beams of the set of multiple receive beams. In some examples, the reference signals are transmitted via the first antenna array via a set of multiple transmit beams, the reference signals are received via the second antenna array via a single receive beam, and the method further includes transmitting via the measurement report, an indication of measurements associated with at least a subset of transmit beams of the set of multiple transmit beams. In some examples, the reference signals are transmitted via the first antenna array via a set of multiple transmit beams, the reference signals are received via the second antenna array via a set of multiple receive beams, and the method further includes transmitting via the measurement report, an indication of measurements associated with at least a subset of transmit beams of the set of multiple transmit beams, at least a subset of receive beams of the set of multiple receive beams, or both. In some examples, any combination thereof.

In some examples, the measurements indicated via the measurement include a set of multiple sets of measurements corresponding to a set of multiple measurement intervals, and the measurement report transmitting manager 840 may be configured as or otherwise support a means for transmitting, via the measurement report, an indication of the set of multiple sets of measurements over the set of multiple measurement intervals, where each set of measurements of the set of multiple sets of measurements, for each measurement interval of the set of multiple measurement intervals, includes one or more of a maximum measurement of the set of measurements over a time interval, a minimum measurement of the set of measurements over the time interval, an average measurement of the set of measurements over the time interval, a percentage of measurements of the set of measurements that satisfy a measurement threshold over the time interval, or any combination thereof.

In some examples, the measurement report transmitting manager 840 may be configured as or otherwise support a means for transmitting, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

In some examples, the measurement report transmitting manager 840 may be configured as or otherwise support a means for transmitting, via the measurement report, a set of beam pair identifiers associated with one or more transmit beams, one or more receive beams, or both, that are associated with measurements of the set of measurements that satisfy one or more measurement thresholds, where the set of beam pair identifiers are associated with a subset of the set of multiple transmit beams, a subset of the set of multiple receive beams, or both.

In some examples, the reference signals are transmitted via the first antenna array to a first TRP of the second wireless device, and the measurement report transmitting manager 840 may be configured as or otherwise support a means for transmitting, via the measurement report, an indication of the second wireless device, the first TRP associated with CMRs, the second TRP associated with IMSs, or any combination thereof.

In some examples, the reference signals are transmitted via the first antenna array to one of the second wireless device or a third wireless device, and the measurement report transmitting manager 840 may be configured as or otherwise support a means for transmitting, via the measurement report, an indication of the second wireless device associated with CMRs, the third wireless device associated with IMSs, or both.

In some examples, the priority manager 835 may be configured as or otherwise support a means for receiving, from the second wireless device, an indication of one or more parameters associated with the priority, where determining the priority is based on receiving the indication of the one or more parameters.

In some examples, the priority manager 835 may be configured as or otherwise support a means for determining an additional priority associated with transmission of an additional measurement report. In some examples, the measurement report transmitting manager 840 may be configured as or otherwise support a means for transmitting the additional measurement report according to the additional priority and based on a comparison between the priority and the additional priority.

In some examples, the first wireless device includes a UE, the second wireless device includes a base station, and the reference signals include SRSs. In some examples, the first wireless device includes a wireless node of an IAB network, the second wireless device includes a parent node or a CU of an IAB network and the reference signals include CSI-RS, SSB signals, or both.

Figure 9:
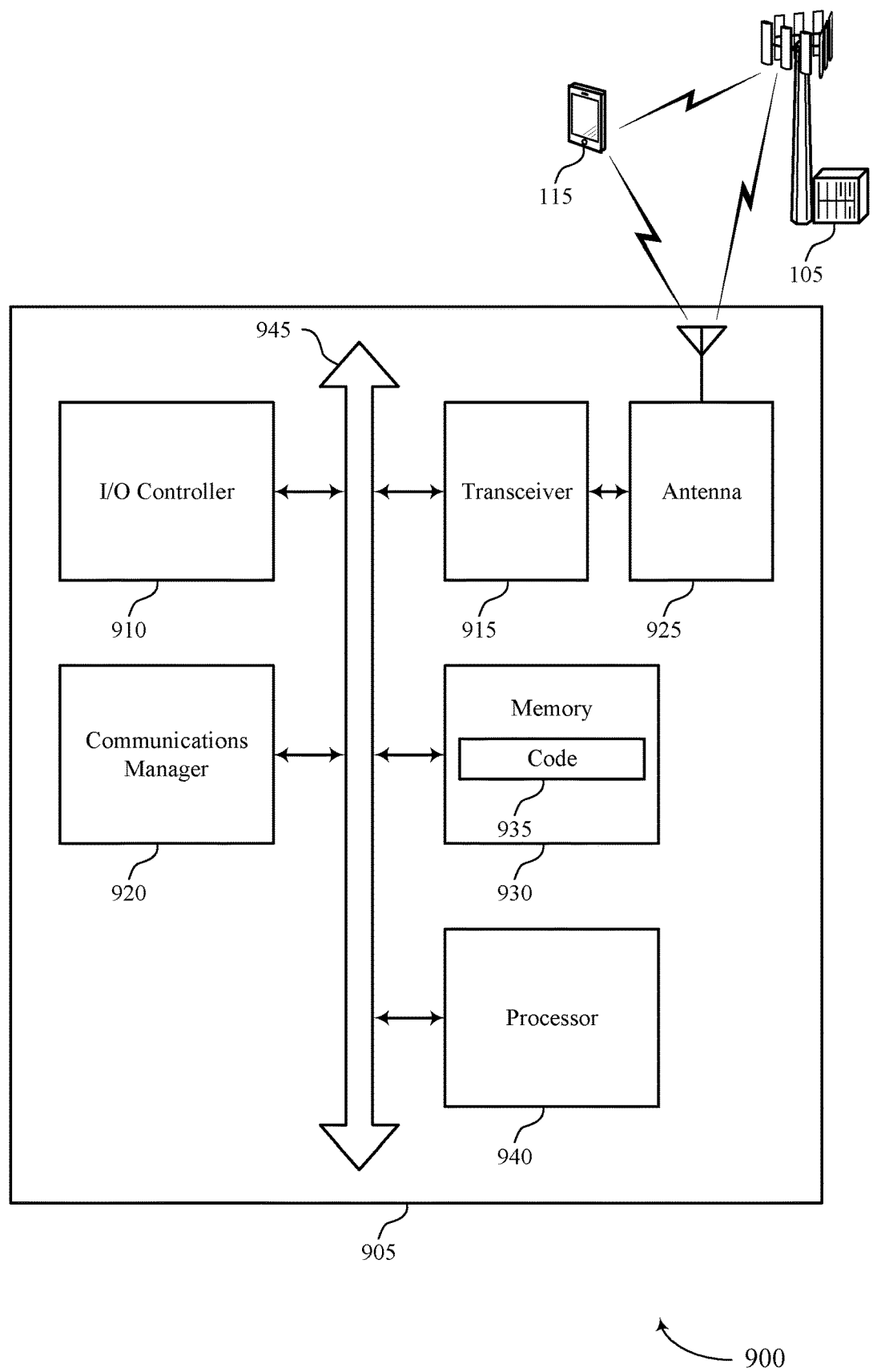
FIG. 9 shows a diagram of a system including a device that supports techniques for self-interference reporting in accordance with aspects of the present disclosure.

FIG. 9 shows a diagram of a system 900 including a device 905 that supports techniques for self-interference reporting in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for self-interference reporting). For example, the device 905 or a component of the device 905 may include a processor 940 and memory 930 coupled to the processor 940, the processor 940 and memory 930 configured to perform various functions described herein.

The communications manager 920 may support wireless communication at a first wireless device in accordance with examples as disclosed herein. For example, the communications manager 920 may be configured as or otherwise support a means for transmitting reference signals via a first antenna array of the first wireless device. The communications manager 920 may be configured as or otherwise support a means for performing, according to a reporting configuration for self-interference at the first wireless device, a set of measurements on the reference signals received at a second antenna array of the first wireless device. The communications manager 920 may be configured as or otherwise support a means for determining a priority associated with transmission of measurement reports associated with self-interference at the first wireless device. The communications manager 920 may be configured as or otherwise support a means for transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority.

By including or configuring the communications manager 920 in accordance with examples as described herein, the device 905 may support techniques for self-interference measurement and reporting. In particular, the techniques described herein may enable wireless devices to measure and report self-interference which is attributable to full-duplex communications carried out by the respective wireless devices. By enabling wireless devices to report self-interference for full-duplex communications, the network may be configured to configure (or refrain from configuring) the respective wireless devices with configurations for full-duplex communications which improve a reliability and efficiency of wireless communications. In this regard, techniques described herein may enable wireless devices to be configured (or not) for full-duplex communications in circumstances where the respective wireless devices may experience relatively little self-interference as a result of the full-duplex communications. Thus, techniques described herein may lead to more efficient resource utilization and improved reliability and efficiency of wireless communications.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for self-interference reporting as described herein, or the processor 940 and the memory 930 may be otherwise configured to perform or support such operations.

Figure 10:
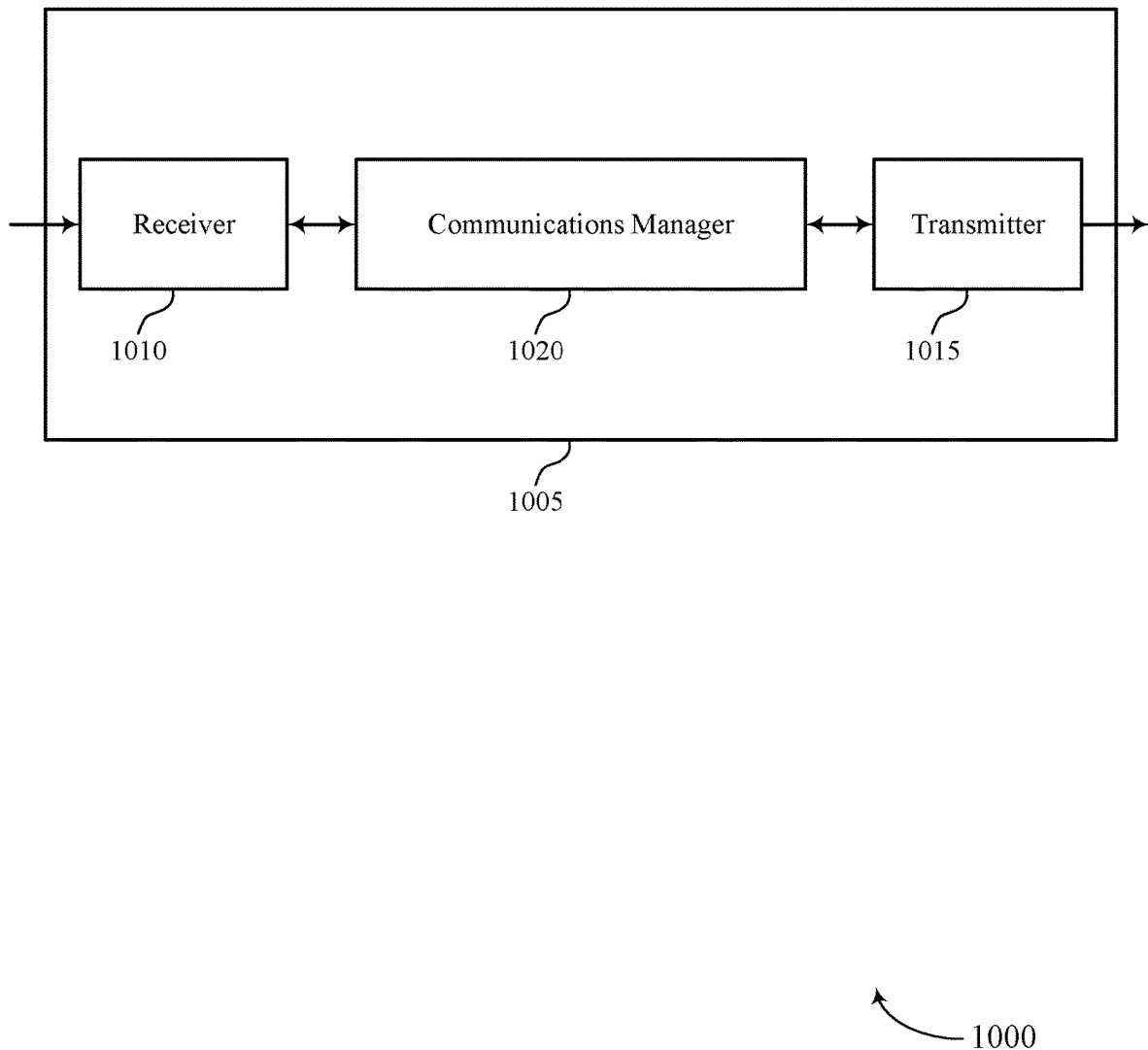
FIGS. 10 and 11 show block diagrams of devices that support techniques for self-interference reporting in accordance with aspects of the present disclosure.

FIG. 10 shows a block diagram 1000 of a device 1005 that supports techniques for self-interference reporting in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for self-interference reporting). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for self-interference reporting). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for self-interference reporting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a second wireless device in accordance with examples as disclosed herein. For example, the communications manager 1020 may be configured as or otherwise support a means for receiving reference signals via a first antenna array of a first wireless device. The communications manager 1020 may be configured as or otherwise support a means for determining a priority associated with transmission of measurement reports associated with self-interference at the first wireless device. The communications manager 1020 may be configured as or otherwise support a means for receiving, from the first wireless device and according to a reporting configuration for self-interference at the first wireless device, a measurement report including an indication of self-interference for full-duplex communications at the first wireless device, where the measurement report is received in accordance with the determined priority.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for self-interference measurement and reporting. In particular, the techniques described herein may enable wireless devices to measure and report self-interference which is attributable to full-duplex communications carried out by the respective wireless devices. By enabling wireless devices to report self-interference for full-duplex communications, the network may be configured to configure (or refrain from configuring) the respective wireless devices with configurations for full-duplex communications which improve a reliability and efficiency of wireless communications. In this regard, techniques described herein may enable wireless devices to be configured (or not) for full-duplex communications in circumstances where the respective wireless devices may experience relatively little self-interference as a result of the full-duplex communications. Thus, techniques described herein may lead to more efficient resource utilization and improved reliability and efficiency of wireless communications.

Figure 11:
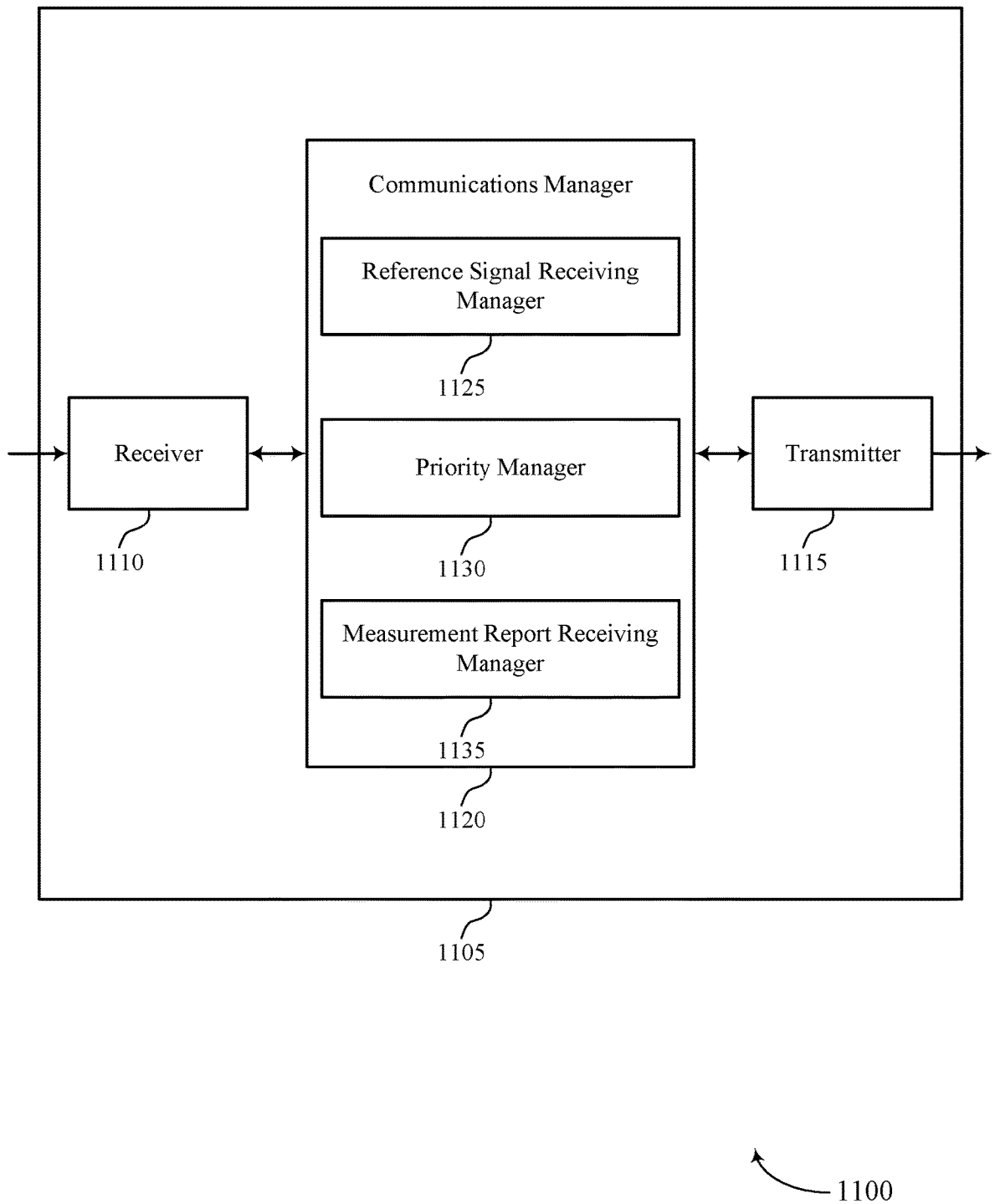

FIG. 11 shows a block diagram 1100 of a device 1105 that supports techniques for self-interference reporting in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for self-interference reporting). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for self-interference reporting). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for self-interference reporting as described herein. For example, the communications manager 1120 may include a reference signal receiving manager 1125, a priority manager 1130, a measurement report receiving manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a second wireless device in accordance with examples as disclosed herein. The reference signal receiving manager 1125 may be configured as or otherwise support a means for receiving reference signals via a first antenna array of a first wireless device. The priority manager 1130 may be configured as or otherwise support a means for determining a priority associated with transmission of measurement reports associated with self-interference at the first wireless device. The measurement report receiving manager 1135 may be configured as or otherwise support a means for receiving, from the first wireless device and according to a reporting configuration for self-interference at the first wireless device, a measurement report including an indication of self-interference for full-duplex communications at the first wireless device, where the measurement report is received in accordance with the determined priority.

Figure 12:
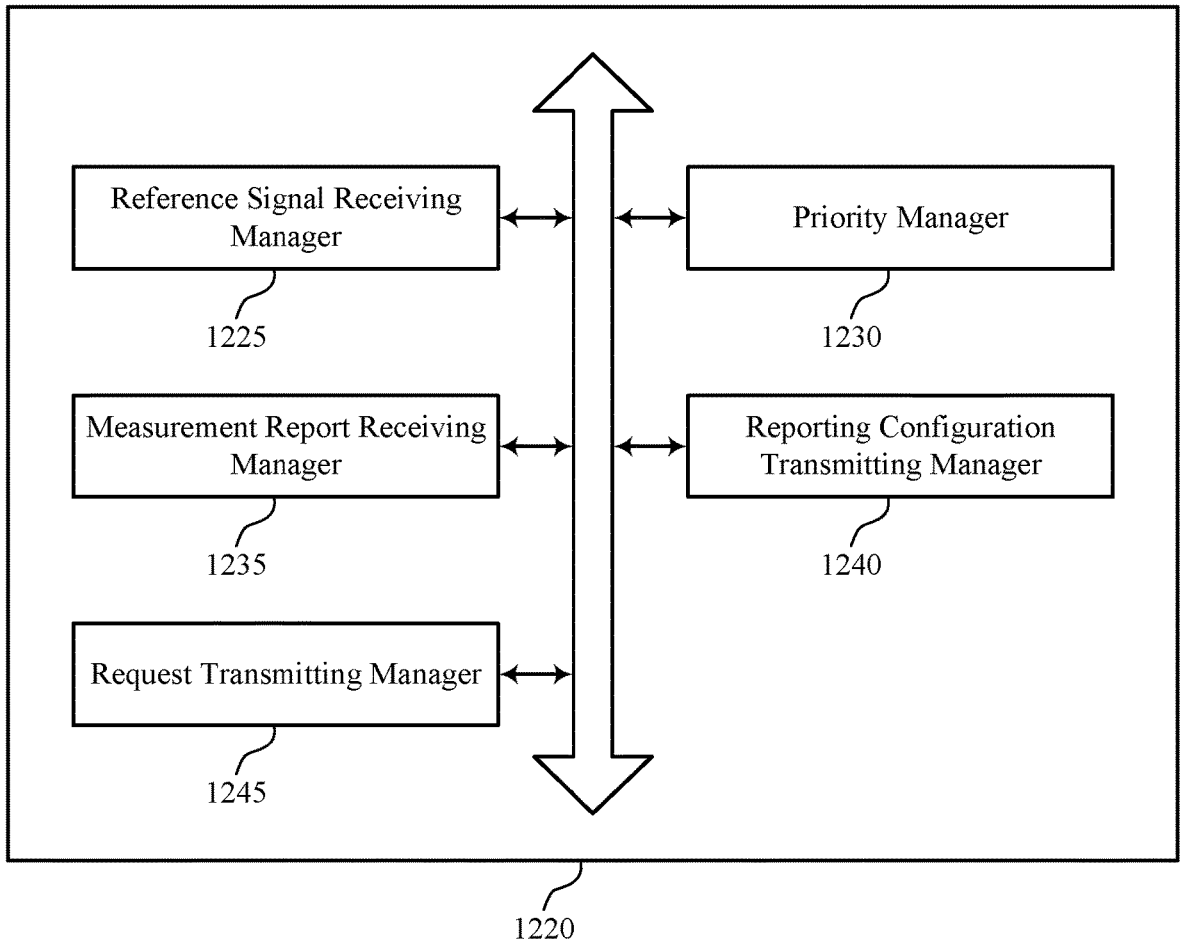
FIG. 12 shows a block diagram of a communications manager that supports techniques for self-interference reporting in accordance with aspects of the present disclosure.

FIG. 12 shows a block diagram 1200 of a communications manager 1220 that supports techniques for self-interference reporting in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for self-interference reporting as described herein. For example, the communications manager 1220 may include a reference signal receiving manager 1225, a priority manager 1230, a measurement report receiving manager 1235, a reporting configuration transmitting manager 1240, a request transmitting manager 1245, or any combination thereof. Each of these components may communicate, directly or indirectly, with one another (e.g., via one or more buses).

The communications manager 1220 may support wireless communication at a second wireless device in accordance with examples as disclosed herein. The reference signal receiving manager 1225 may be configured as or otherwise support a means for receiving reference signals via a first antenna array of a first wireless device. The priority manager 1230 may be configured as or otherwise support a means for determining a priority associated with transmission of measurement reports associated with self-interference at the first wireless device. The measurement report receiving manager 1235 may be configured as or otherwise support a means for receiving, from the first wireless device and according to a reporting configuration for self-interference at the first wireless device, a measurement report including an indication of self-interference for full-duplex communications at the first wireless device, where the measurement report is received in accordance with the determined priority.

In some examples, the reporting configuration transmitting manager 1240 may be configured as or otherwise support a means for transmitting, to the first wireless device, an indication of the reporting configuration, where receiving the measurement report is based on transmitting the indication of the reporting configuration.

In some examples, the reporting configuration transmitting manager 1240 may be configured as or otherwise support a means for transmitting, to the first wireless device, an indication to transmit measurement reports associated with self-interference at the first wireless device periodically, aperiodically, semi-persistently, or a combination thereof, where receiving the measurement report is based on the indication to transmit the measurement reports.

In some examples, the request transmitting manager 1245 may be configured as or otherwise support a means for transmitting, to the first wireless device, a request for the measurement report, where receiving the measurement report is based on transmitting the request.

In some examples, the request includes a MAC control element, a DCI message, a radio resource control message, or any combination thereof.

In some examples, the reporting configuration transmitting manager 1240 may be configured as or otherwise support a means for transmitting, to the first wireless device, an indication of one or more measurement thresholds associated with self-interference measurements at the first wireless device, where the measurement report is based on the one or more measurement thresholds.

In some examples, the measurement report receiving manager 1235 may be configured as or otherwise support a means for receiving, via the measurement report, an indication of a RSSI for the reference signals, a RSRP for the reference signals, a SINR for the reference signals, or any combination thereof.

In some examples, the measurement report receiving manager 1235 may be configured as or otherwise support a means for receiving, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

In some examples, the reporting configuration transmitting manager 1240 may be configured as or otherwise support a means for transmitting, to the first wireless device, an indication of the time interval, where receiving the measurement report is based on the time interval, where the set of measurements are performed within the time interval.

In some examples, the measurement report receiving manager 1235 may be configured as or otherwise support a means for receiving, via the measurement report, an identifier of a beam pair associated with the measurement report.

In some examples, the measurement report receiving manager 1235 may be configured as or otherwise support a means for receiving, via the measurement report, a set of beam pair identifiers associated with one or more beam pairs, where each beam pair includes a transmit beam from a set of one or more transmit beams and a receive beam from a set of one or more receive beams.

In some examples, the reporting configuration transmitting manager 1240 may be configured as or otherwise support a means for transmitting, to the first wireless device, a first indication of the set of one or more transmit beams, a second indication of the set of one or more receive beams, or both.

In some examples, the priority manager 1230 may be configured as or otherwise support a means for transmitting, to the first wireless device based on determining the priority, an indication of one or more parameters associated with the priority.

In some examples, the priority manager 1230 may be configured as or otherwise support a means for determining an additional priority associated with transmission of an additional measurement report. In some examples, the measurement report receiving manager 1235 may be configured as or otherwise support a means for receiving the additional measurement report according to the additional priority and based on a comparison between the priority and the additional priority.

In some examples, the first wireless device includes a UE, the second wireless device includes a base station and the reference signals include SRSs. In some examples, the first wireless device includes a wireless node of an IAB network, the second wireless device includes a parent node or a CU and the reference signals include CSI-RS, SSB signals, or both.

Figure 13:
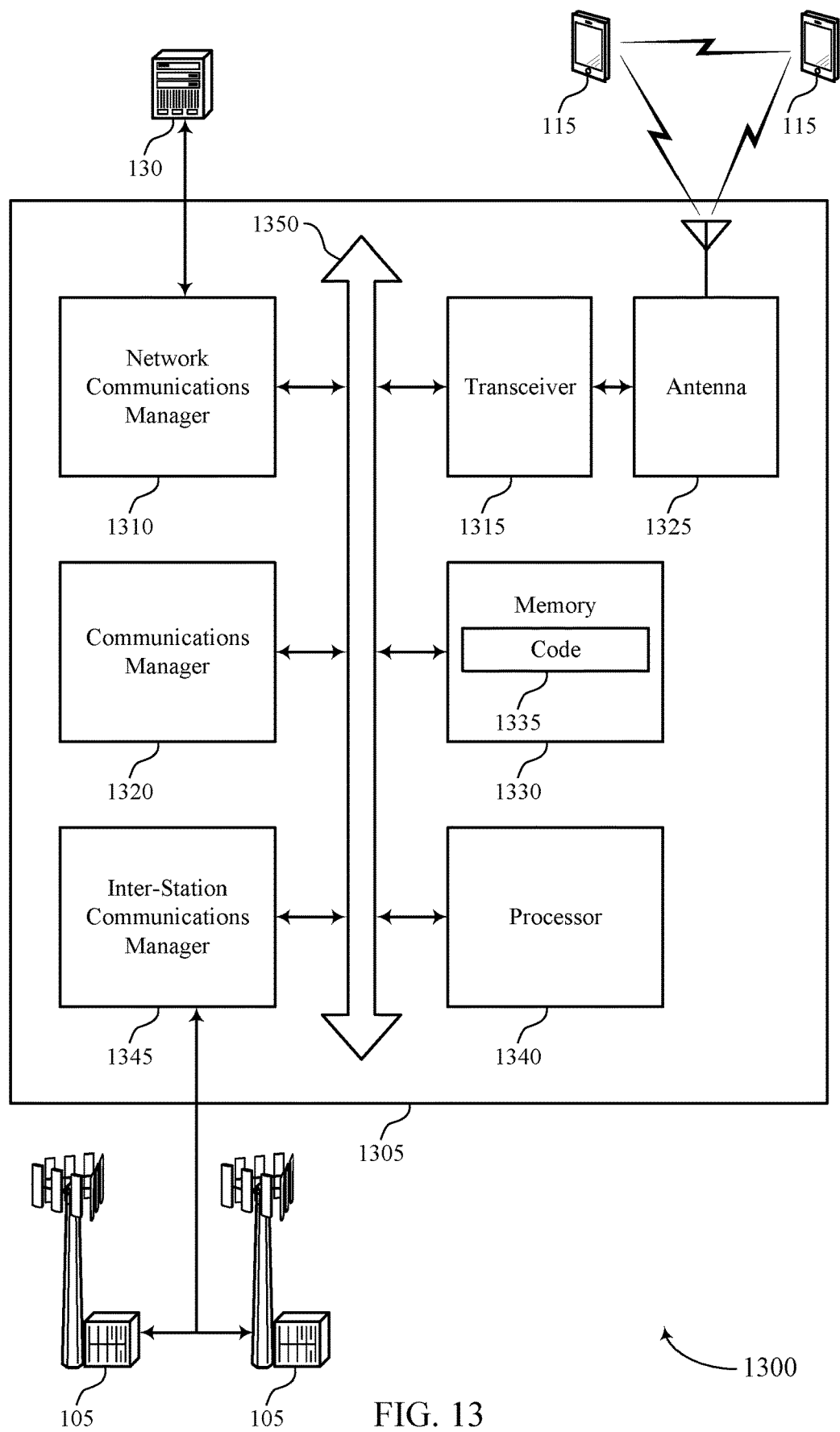
FIG. 13 shows a diagram of a system including a device that supports techniques for self-interference reporting in accordance with aspects of the present disclosure.

FIG. 13 shows a diagram of a system 1300 including a device 1305 that supports techniques for self-interference reporting in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for self-interference reporting). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a second wireless device in accordance with examples as disclosed herein. For example, the communications manager 1320 may be configured as or otherwise support a means for receiving reference signals via a first antenna array of a first wireless device. The communications manager 1320 may be configured as or otherwise support a means for determining a priority associated with transmission of measurement reports associated with self-interference at the first wireless device. The communications manager 1320 may be configured as or otherwise support a means for receiving, from the first wireless device and according to a reporting configuration for self-interference at the first wireless device, a measurement report including an indication of self-interference for full-duplex communications at the first wireless device, where the measurement report is received in accordance with the determined priority.

By including or configuring the communications manager 1320 in accordance with examples as described herein, the device 1305 may support techniques for self-interference measurement and self-reporting. In particular, the techniques described herein may enable wireless devices to measure and report self-interference which is attributable to full-duplex communications carried out by the respective wireless devices. By enabling wireless devices to report self-interference for full-duplex communications, the network may be configured to configure (or refrain from configuring) the respective wireless devices with configurations for full-duplex communications which improve a reliability and efficiency of wireless communications. In this regard, techniques described herein may enable wireless devices to be configured (or not) for full-duplex communications in circumstances where the respective wireless devices may experience relatively little self-interference as a result of the full-duplex communications. Thus, techniques described herein may lead to more efficient resource utilization and improved reliability and efficiency of wireless communications.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for self-interference reporting as described herein, or the processor 1340 and the memory 1330 may be otherwise configured to perform or support such operations.

Figure 14:
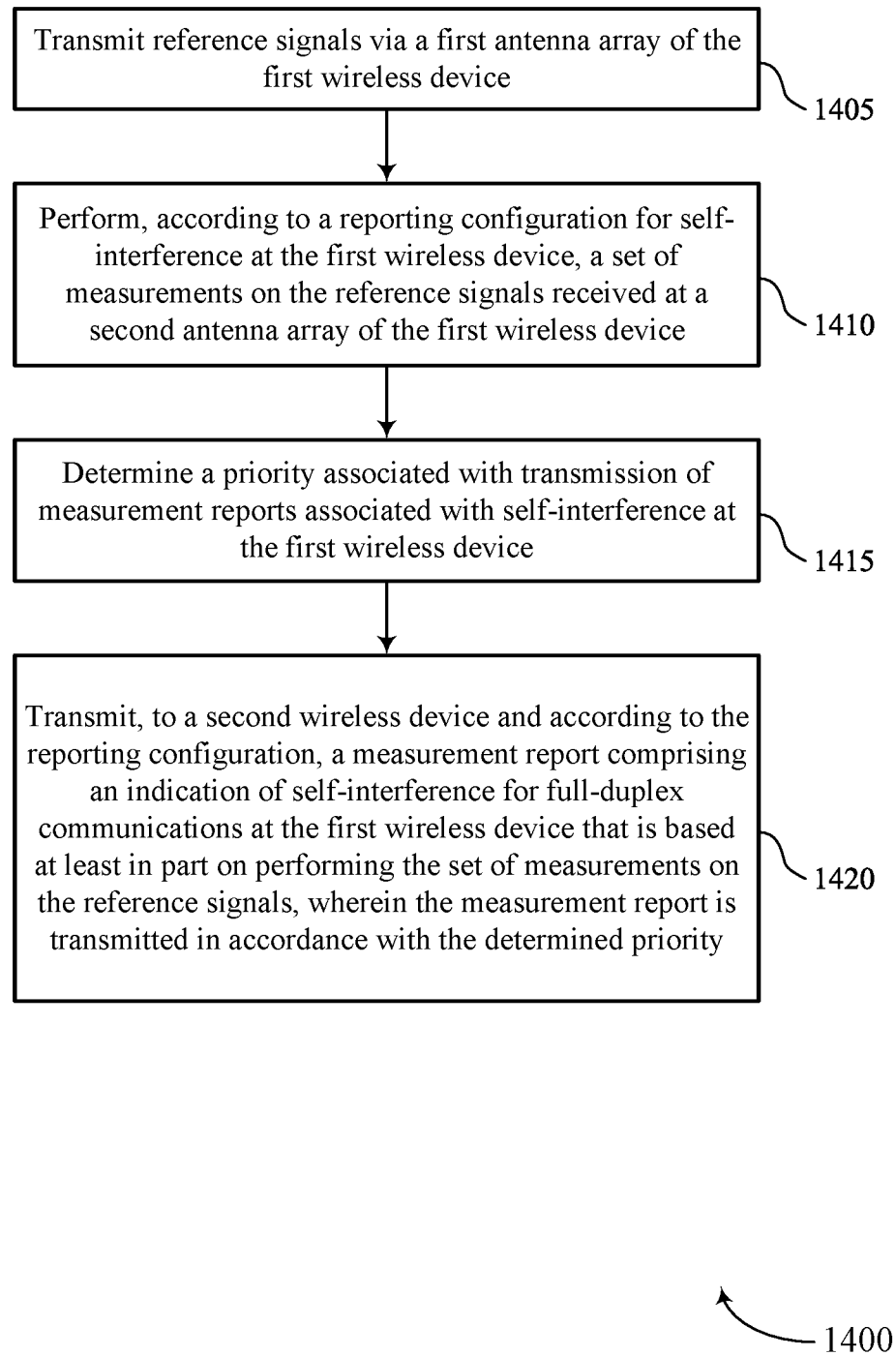
FIGS. 14 through 17 show flowcharts illustrating methods that support techniques for self-interference reporting in accordance with aspects of the present disclosure.

FIG. 14 shows a flowchart illustrating a method 1400 that supports techniques for self-interference reporting in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting reference signals via a first antenna array of the first wireless device. The operations of 1405 may be performed in accordance with examples as disclosed herein. In some examples, aspects of the operations of 1405 may be performed by a reference signal transmitting manager 825 as described with reference to FIG. 8.

At 1410, the method may include performing, according to a reporting configuration for self-interference at the first wireless device, a set of measurements on the reference signals received at a second antenna array of the first wireless device. The operations of 1410 may be performed in accordance with examples as disclosed herein. In some examples, aspects of the operations of 1410 may be performed by a signal measurement manager 830 as described with reference to FIG. 8.

At 1415, the method may include determining a priority associated with transmission of measurement reports associated with self-interference at the first wireless device. The operations of 1415 may be performed in accordance with examples as disclosed herein. In some examples, aspects of the operations of 1415 may be performed by a priority manager 835 as described with reference to FIG. 8.

At 1420, the method may include transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority. The operations of 1420 may be performed in accordance with examples as disclosed herein. In some examples, aspects of the operations of 1420 may be performed by a measurement report transmitting manager 840 as described with reference to FIG. 8.

Figure 15:
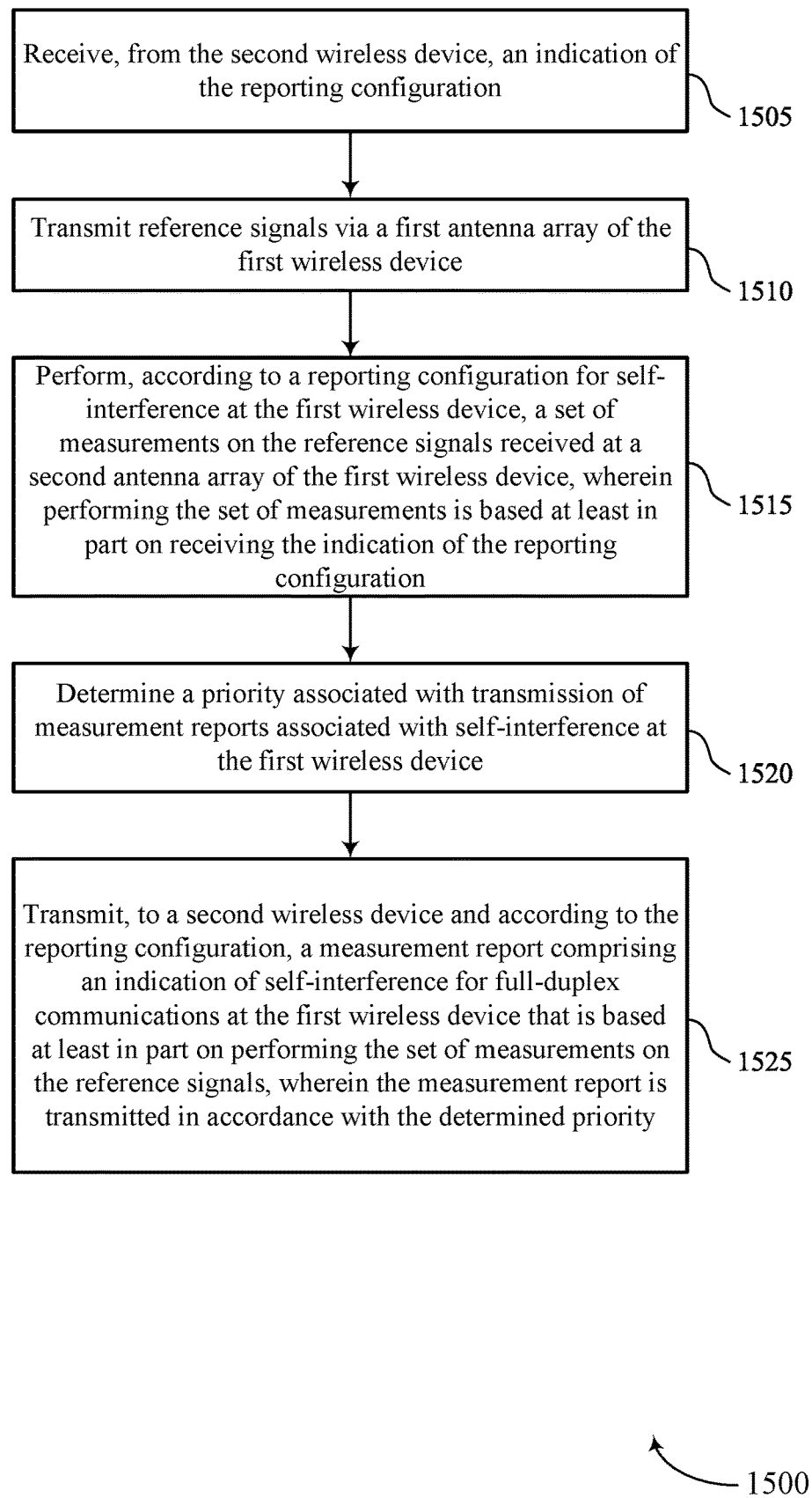

FIG. 15 shows a flowchart illustrating a method 1500 that supports techniques for self-interference reporting in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from the second wireless device, an indication of the reporting configuration, where performing the set of measurements, transmitting the measurement report, or both, is based on receiving the indication of the reporting configuration. The operations of 1505 may be performed in accordance with examples as disclosed herein. In some examples, aspects of the operations of 1505 may be performed by a reporting configuration receiving manager 845 as described with reference to FIG. 8.

At 1510, the method may include transmitting reference signals via a first antenna array of the first wireless device. The operations of 1510 may be performed in accordance with examples as disclosed herein. In some examples, aspects of the operations of 1510 may be performed by a reference signal transmitting manager 825 as described with reference to FIG. 8.

At 1515, the method may include performing, according to a reporting configuration for self-interference at the first wireless device, a set of measurements on the reference signals received at a second antenna array of the first wireless device. The operations of 1515 may be performed in accordance with examples as disclosed herein. In some examples, aspects of the operations of 1515 may be performed by a signal measurement manager 830 as described with reference to FIG. 8.

At 1520, the method may include determining a priority associated with transmission of measurement reports associated with self-interference at the first wireless device. The operations of 1520 may be performed in accordance with examples as disclosed herein. In some examples, aspects of the operations of 1520 may be performed by a priority manager 835 as described with reference to FIG. 8.

At 1525, the method may include transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority. The operations of 1525 may be performed in accordance with examples as disclosed herein. In some examples, aspects of the operations of 1525 may be performed by a measurement report transmitting manager 840 as described with reference to FIG. 8.

Figure 16:
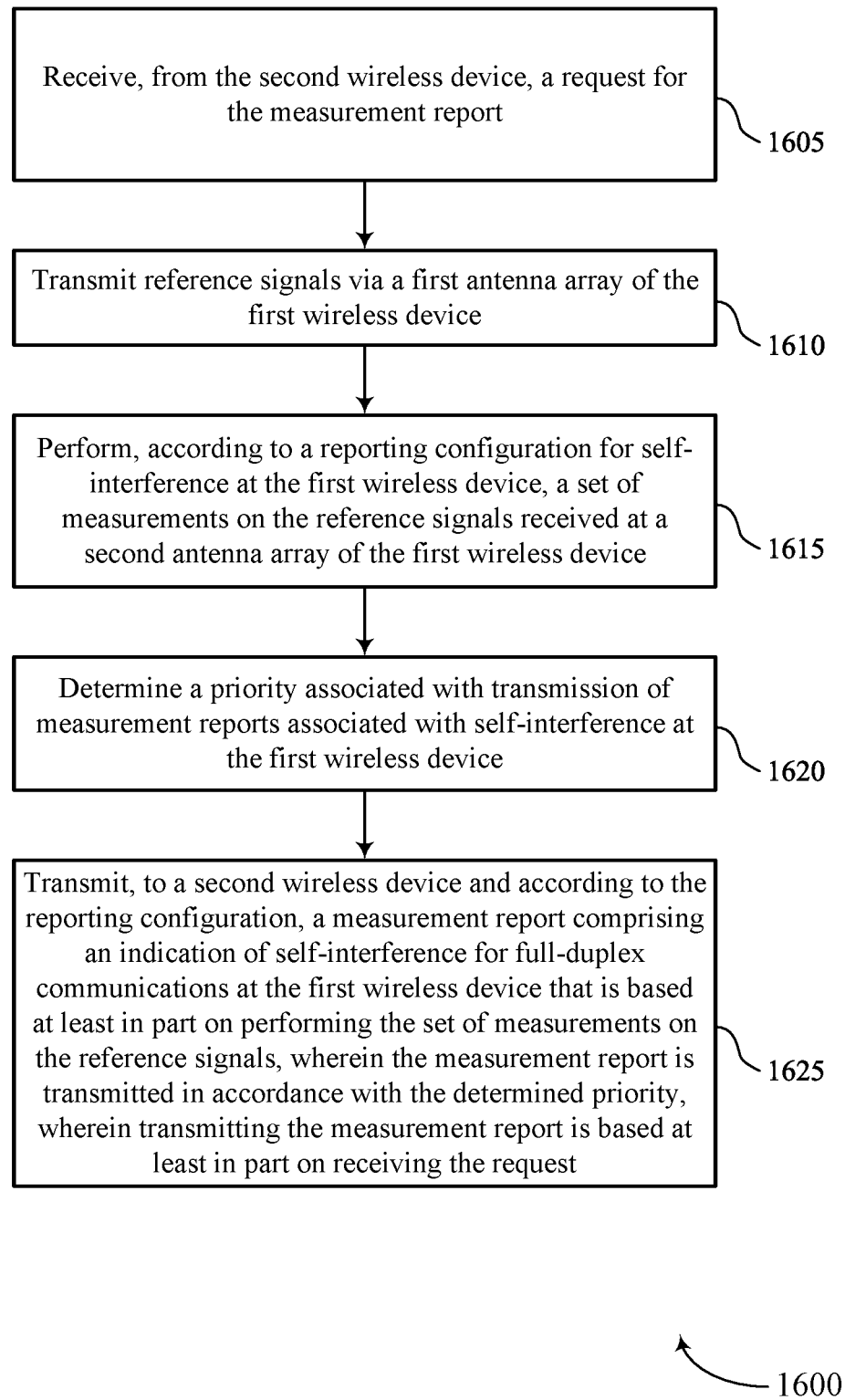

FIG. 16 shows a flowchart illustrating a method 1600 that supports techniques for self-interference reporting in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from the second wireless device, a request for the measurement report. The operations of 1605 may be performed in accordance with examples as disclosed herein. In some examples, aspects of the operations of 1605 may be performed by a request receiving manager 850 as described with reference to FIG. 8.

At 1610, the method may include transmitting reference signals via a first antenna array of the first wireless device. The operations of 1610 may be performed in accordance with examples as disclosed herein. In some examples, aspects of the operations of 1610 may be performed by a reference signal transmitting manager 825 as described with reference to FIG. 8.

At 1615, the method may include performing, according to a reporting configuration for self-interference at the first wireless device, a set of measurements on the reference signals received at a second antenna array of the first wireless device. The operations of 1615 may be performed in accordance with examples as disclosed herein. In some examples, aspects of the operations of 1615 may be performed by a signal measurement manager 830 as described with reference to FIG. 8.

At 1620, the method may include determining a priority associated with transmission of measurement reports associated with self-interference at the first wireless device. The operations of 1620 may be performed in accordance with examples as disclosed herein. In some examples, aspects of the operations of 1620 may be performed by a priority manager 835 as described with reference to FIG. 8.

At 1625, the method may include transmitting, to a second wireless device and according to the reporting configuration, a measurement report including an indication of self-interference for full-duplex communications at the first wireless device that is based on performing the set of measurements on the reference signals, where the measurement report is transmitted in accordance with the determined priority, where transmitting the measurement report is based on receiving the request. The operations of 1625 may be performed in accordance with examples as disclosed herein. In some examples, aspects of the operations of 1625 may be performed by a measurement report transmitting manager 840 as described with reference to FIG. 8.

Figure 17:
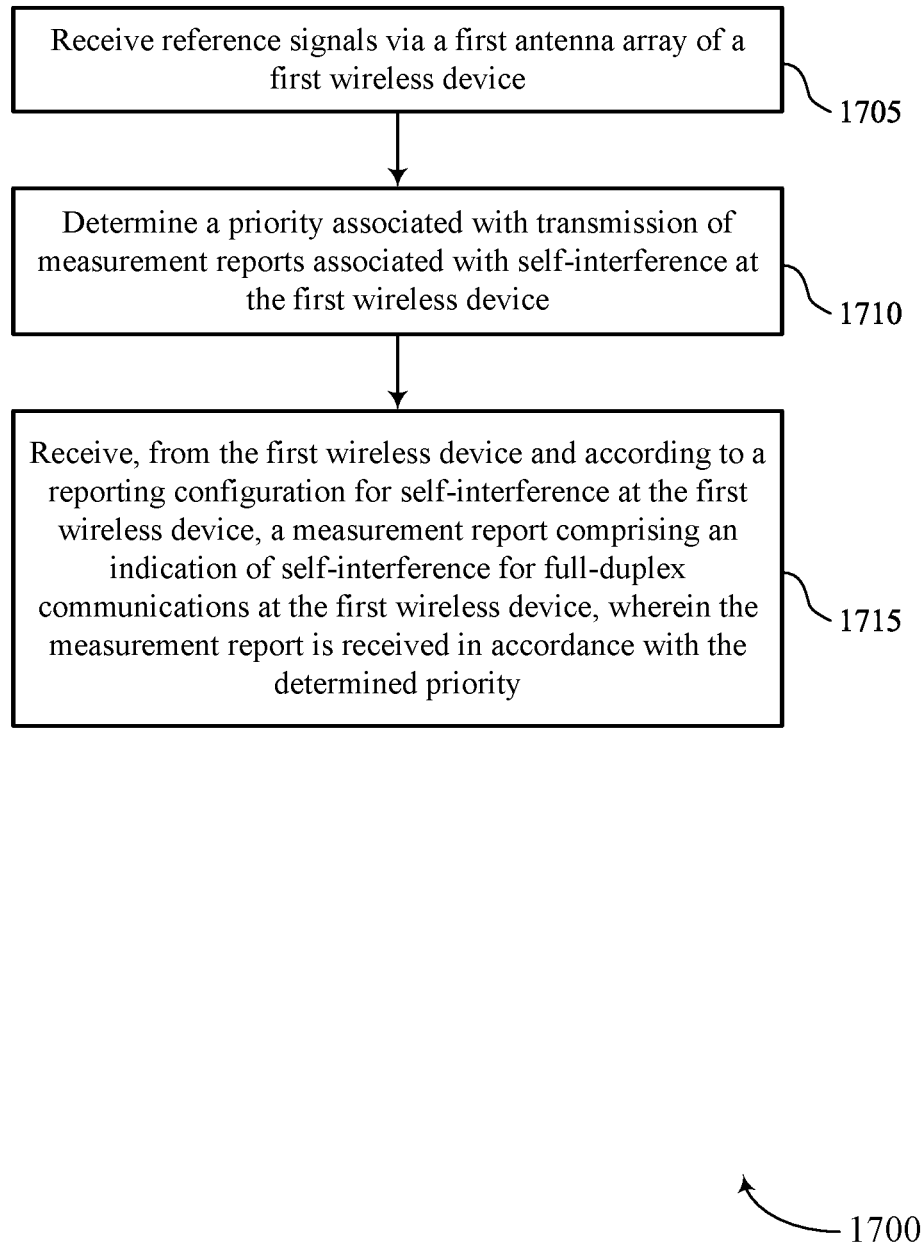

FIG. 17 shows a flowchart illustrating a method 1700 that supports techniques for self-interference reporting in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving reference signals via a first antenna array of a first wireless device. The operations of 1705 may be performed in accordance with examples as disclosed herein. In some examples, aspects of the operations of 1705 may be performed by a reference signal receiving manager 1225 as described with reference to FIG. 12.

At 1710, the method may include determining a priority associated with transmission of measurement reports associated with self-interference at the first wireless device. The operations of 1710 may be performed in accordance with examples as disclosed herein. In some examples, aspects of the operations of 1710 may be performed by a priority manager 1230 as described with reference to FIG. 12.

At 1715, the method may include receiving, from the first wireless device and according to a reporting configuration for self-interference at the first wireless device, a measurement report including an indication of self-interference for full-duplex communications at the first wireless device, where the measurement report is received in accordance with the determined priority. The operations of 1715 may be performed in accordance with examples as disclosed herein. In some examples, aspects of the operations of 1715 may be performed by a measurement report receiving manager 1235 as described with reference to FIG. 12.

The following provides an overview of aspects of the present disclosure:

Aspect 1: A method for wireless communication at a first wireless device, comprising: transmitting reference signals via a first antenna array of the first wireless device; performing, according to a reporting configuration for self-interference at the first wireless device, a set of measurements on the reference signals received at a second antenna array of the first wireless device; determining a priority associated with transmission of measurement reports associated with self-interference at the first wireless device; and transmitting, to a second wireless device and according to the reporting configuration, a measurement report comprising an indication of self-interference for full-duplex communications at the first wireless device that is based at least in part on performing the set of measurements on the reference signals, wherein the measurement report is transmitted in accordance with the determined priority.

Aspect 2: The method of aspect 1, further comprising: receiving, from the second wireless device, an indication of the reporting configuration, wherein performing the set of measurements, transmitting the measurement report, or both, is based at least in part on receiving the indication of the reporting configuration.

Aspect 3: The method of any of aspects 1 through 2, further comprising: receiving, from the second wireless device, an indication to transmit measurement reports associated with self-interference at the first wireless device periodically, aperiodically, semi-persistently, or a combination thereof, wherein transmitting the measurement report is based at least in part on the indication to transmit the measurement reports.

Aspect 4: The method of any of aspects 1 through 3, further comprising: receiving, from the second wireless device, a request for the measurement report, wherein transmitting the measurement report is based at least in part on receiving the request.

Aspect 5: The method of aspect 4, wherein the request comprises a MAC-CE, a DCI message, a RRC message, or any combination thereof.

Aspect 6: The method of any of aspects 1 through 5, further comprising: receiving, from the second wireless device, an indication of one or more measurement thresholds; and identifying that one or more measurements of the set of measurements satisfy at least one measurement threshold of the one or more measurement thresholds, wherein transmitting the measurement report is based at least in part on the identifying.

Aspect 7: The method of any of aspects 1 through 6, further comprising: transmitting, via the measurement report, an indication of a RSSI for the reference signals, a RSRP for the reference signals, a SINR for the reference signals, or any combination thereof.

Aspect 8: The method of any of aspects 1 through 7, further comprising: transmitting, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

Aspect 9: The method of aspect 8, further comprising: receiving, from the second wireless device, an indication of the time interval, wherein performing the set of measurements, transmitting the measurement report, or both, is based at least in part on the time interval, wherein the set of measurements are performed within the time interval.

Aspect 10: The method of any of aspects 1 through 9, wherein the reference signals are transmitted via the first antenna array on a transmit beam, and wherein the reference signals are received via the second antenna array on a receive beam different from the transmit beam, the method further comprising: transmitting, via the measurement report, an identifier of a beam pair comprising the transmit beam and the receive beam.

Aspect 11: The method of any of aspects 1 through 10, wherein the reference signals are transmitted via the first antenna array via a set of one or more transmit beams, and wherein the reference signals are received via the second antenna array via a set of one or more receive beams, the method further comprising: transmitting, via the measurement report, a set of beam pair identifiers associated with one or more beam pairs, wherein each beam pair comprises a transmit beam from the set of one or more transmit beams and a receive beam from the set of one or more receive beams.

Aspect 12: The method of aspect 11, further comprising: receiving, from the second wireless device, a first indication of the set of one or more transmit beams, a second indication of the set of one or more receive beams, or both.

Aspect 13: The method of any of aspects 11 through 12, further comprising: receiving, from the second wireless device based at least in part on transmitting the measurement report, an indication of a subset of beam pair identifiers from the set of beam pair identifiers; transmitting additional reference signals via the first antenna array of the first wireless device via one or more transmit beams associated with the subset of beam pair identifiers; performing a second set of measurements on the additional reference signals received at the second antenna array via one or more receive beams associated with the subset of beam pair identifiers; and transmitting, to the second wireless device, a second measurement report comprising an indication of self-interference experienced at the first wireless device which is attributable to the additional reference signals.

Aspect 14: The method of any of aspects 1 through 13, wherein the reference signals are transmitted via the first antenna array via a single transmit beam, the reference signals are received via the second antenna array via a plurality of receive beams, and the method further comprises transmitting, via the measurement report, an indication of measurements associated with at least a subset of receive beams of the plurality of receive beams; the reference signals are transmitted via the first antenna array via a plurality of transmit beams, the reference signals are received via the second antenna array via a single receive beam, and the method further comprises transmitting via the measurement report, an indication of measurements associated with at least a subset of transmit beams of the plurality of transmit beams; the reference signals are transmitted via the first antenna array via a plurality of transmit beams, the reference signals are received via the second antenna array via a plurality of receive beams, and the method further comprises transmitting via the measurement report, an indication of measurements associated with at least a subset of transmit beams of the plurality of transmit beams, at least a subset of receive beams of the plurality of receive beams, or both; or any combination thereof.

Aspect 15: The method of aspect 14, wherein the measurements indicated via the measurement comprise a plurality of sets of measurements corresponding to a plurality of measurement intervals, the method further comprising: transmitting, via the measurement report, an indication of the plurality of sets of measurements over the plurality of measurement windows, wherein each set of measurements of the plurality of sets of measurements, for each time of the plurality of times, comprises one or more of a maximum measurement of the set of measurements over a time interval, a minimum measurement of the set of measurements over the time interval, an average measurement of the set of measurements over the time interval, a percentage of measurements of the set of measurements that satisfy a measurement threshold over the time interval, or any combination thereof.

Aspect 16: The method of any of aspects 14 through 15, further comprising: transmitting, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

Aspect 17: The method of any of aspects 14 through 16, further comprising: transmitting, via the measurement report, a set of beam pair identifiers associated with one or more transmit beams, one or more receive beams, or both, that are associated with measurements of the set of measurements that satisfy one or more measurement thresholds, wherein the set of beam pair identifiers are associated with a subset of the plurality of transmit beams, a subset of the plurality of receive beams, or both.

Aspect 18: The method of any of aspects 1 through 17, wherein the reference signals are transmitted via the first antenna array to a first TRP of the second wireless device, and wherein the reference signals are received at the second antenna array within a set of resources for receiving signals from a second TRP of the second wireless device, wherein the method further comprises: transmitting, via the measurement report, an indication of the second wireless device, the first TRP associated with CMRs, the second TRP associated with IMRs, or any combination thereof.

Aspect 19: The method of any of aspects 1 through 18, wherein the reference signals are transmitted via the first antenna array to one of the second wireless device or a third wireless device, and wherein the reference signals are received at the second antenna array within a set of resources for receiving signals from an other one of the second wireless device or the third wireless device, wherein the method further comprises: transmitting, via the measurement report, an indication of the second wireless device associated with CMRs, the third wireless device associated with IMRs, or both.

Aspect 20: The method of any of aspects 1 through 19, further comprising: receiving, from the second wireless device, an indication of one or more parameters associated with the priority, wherein determining the priority is based at least in part on receiving the indication of the one or more parameters.

Aspect 21: The method of any of aspects 1 through 20, further comprising: determining an additional priority associated with transmission of an additional measurement report; and transmitting the additional measurement report according to the additional priority and based at least in part on a comparison between the priority and the additional priority.

Aspect 22: The method of any of aspects 1 through 21, wherein the first wireless device comprises a UE, the second wireless device comprises a base station, and the reference signals comprise SRSs, or the first wireless device comprises a wireless node of an IAB network, the second wireless device comprises a parent node or a central unit of an IAB network and the reference signals comprise CSI-RS, SSB signals, or both.

Aspect 23: A method for wireless communication at a second wireless device, comprising: receiving reference signals via a first antenna array of a first wireless device; determining a priority associated with transmission of measurement reports associated with self-interference at the first wireless device; and receiving, from the first wireless device and according to the reporting configuration, a measurement report comprising an indication of self-interference for full-duplex communications at the first wireless device, wherein the measurement report is received in accordance with the determined priority.

Aspect 24: The method of aspect 23, further comprising: transmitting, to the first wireless device, an indication of the reporting configuration, wherein receiving the measurement report is based at least in part on transmitting the indication of the reporting configuration.

Aspect 25: The method of any of aspects 23 through 24, further comprising: transmitting, to the first wireless device, an indication to transmit measurement reports associated with self-interference at the first wireless device periodically, aperiodically, semi-persistently, or a combination thereof, wherein receiving the measurement report is based at least in part on the indication to transmit the measurement reports.

Aspect 26: The method of any of aspects 23 through 25, further comprising: transmitting, to the first wireless device, a request for the measurement report, wherein receiving the measurement report is based at least in part on transmitting the request.

Aspect 27: The method of aspect 26, wherein the request comprises a MAC-CE, a DCI message, a RRC message, or any combination thereof.

Aspect 28: The method of any of aspects 23 through 27, further comprising: transmitting, to the first wireless device, an indication of one or more measurement thresholds associated with self-interference measurements at the first wireless device, wherein the measurement report is based at least in part on the one or more measurement thresholds.

Aspect 29: The method of any of aspects 23 through 28, further comprising: receiving, via the measurement report, an indication of a RSSI for the reference signals, a RSRP for the reference signals, a SINR for the reference signals, or any combination thereof.

Aspect 30: The method of any of aspects 23 through 29, further comprising: receiving, via the measurement report, an indication of a maximum measurement of the set of measurements over a time interval, a minimum measurement of the set of measurements over the time interval, an average measurement of the set of measurements over the time interval, a percentage of measurements of the set of measurements which satisfy a measurement threshold over the time interval, or any combination thereof.

Aspect 31: The method of aspect 30, further comprising: transmitting, to the first wireless device, an indication of the time interval, wherein receiving the measurement report is based at least in part on the time interval, wherein the set of measurements are performed within the time interval.

Aspect 32: The method of any of aspects 23 through 31, further comprising: receiving, via the measurement report, an identifier of a beam pair associated with the measurement report.

Aspect 33: The method of any of aspects 23 through 32, further comprising: receiving, via the measurement report, a set of beam pair identifiers associated with one or more beam pairs, wherein each beam pair comprises a transmit beam from a set of one or more transmit beams and a receive beam from a set of one or more receive beams.

Aspect 34: The method of aspect 33, further comprising: transmitting, to the first wireless device, a first indication of the set of one or more transmit beams, a second indication of the set of one or more receive beams, or both.

Aspect 35: The method of any of aspects 23 through 34, further comprising: transmitting, to the first wireless device based at least in part on determining the priority, an indication of one or more parameters associated with the priority.

Aspect 36: The method of any of aspects 23 through 35, further comprising: determining an additional priority associated with transmission of an additional measurement report; and receiving the additional measurement report according to the additional priority and based at least in part on a comparison between the priority and the additional priority.

Aspect 37: The method of any of aspects 23 through 36, wherein the first wireless device comprises a UE, the second wireless device comprises a base station and the reference signals comprise SRSs, or the first wireless device comprises a wireless node of an IAB network, the second wireless device comprises a parent node or a CU and the reference signals comprise CSI-RS, SSB signals, or both.

Aspect 38: An apparatus for wireless communication at a first wireless device, comprising a processor; memory coupled with the processor; and instructions stored in the memory and executable by the processor to cause the apparatus to perform a method of any of aspects 1 through 22.

Aspect 39: An apparatus for wireless communication at a first wireless device, comprising at least one means for performing a method of any of aspects 1 through 22.

Aspect 40: A non-transitory computer-readable medium storing code for wireless communication at a first wireless device, the code comprising instructions executable by a processor to perform a method of any of aspects 1 through 22.

Aspect 41: An apparatus for wireless communication at a second wireless device, comprising a processor; memory coupled with the processor; and instructions stored in the memory and executable by the processor to cause the apparatus to perform a method of any of aspects 23 through 37.

Aspect 42: An apparatus for wireless communication at a second wireless device, comprising at least one means for performing a method of any of aspects 23 through 37.

Aspect 43: A non-transitory computer-readable medium storing code for wireless communication at a second wireless device, the code comprising instructions executable by a processor to perform a method of any of aspects 23 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
    transmitting reference signals via a first antenna array of the first wireless device;
    performing, according to a reporting configuration for self-interference at the first wireless device, a set of measurements on the reference signals received at a second antenna array of the first wireless device;
    determining a priority associated with transmission of measurement reports associated with self-interference at the first wireless device; and
    transmitting, to a second wireless device and according to the reporting configuration, a measurement report comprising an indication of self-interference for full-duplex communications at the first wireless device that is based at least in part on performing the set of measurements on the reference signals, wherein the measurement report is transmitted in accordance with the determined priority.

2. The method of claim 1, further comprising:
    receiving, from the second wireless device, an indication of the reporting configuration, wherein performing the set of measurements, transmitting the measurement report, or both, is based at least in part on receiving the indication of the reporting configuration.

3. The method of claim 1, further comprising:
    receiving, from the second wireless device, an indication to transmit measurement reports associated with self-interference at the first wireless device periodically, aperiodically, semi-persistently, or a combination thereof, wherein transmitting the measurement report is based at least in part on the indication to transmit the measurement reports.

4. The method of claim 1, further comprising:
receiving, from the second wireless device, a request for the measurement report, wherein transmitting the measurement report is based at least in part on receiving the request.

5. The method of claim 4, wherein the request comprises a media access control (MAC) control element, a downlink control information message, a radio resource control message, or any combination thereof.

6. The method of claim 1, further comprising:
receiving, from the second wireless device, an indication of one or more measurement thresholds; and
identifying that one or more measurements of the set of measurements satisfy at least one measurement threshold of the one or more measurement thresholds, wherein transmitting the measurement report is based at least in part on the identifying.

7. The method of claim 1, further comprising:
transmitting, via the measurement report, an indication of a received signal strength indicator for the reference signals, a reference signal received power for the reference signals, a signal-to-interference-plus-noise ratio for the reference signals, or any combination thereof.

8. The method of claim 1, further comprising:
transmitting, via the measurement report, an indication of a maximum measurement of the set of measurements over a time interval, a minimum measurement of the set of measurements over the time interval, an average measurement of the set of measurements over the time interval, a percentage of measurements of the set of measurements that satisfy a measurement threshold over the time interval, or any combination thereof.

9. The method of claim 8, further comprising:
receiving, from the second wireless device, an indication of the time interval, wherein performing the set of measurements, transmitting the measurement report, or both, is based at least in part on the time interval, wherein the set of measurements are performed within the time interval.

10. The method of claim 1, wherein the reference signals are transmitted via the first antenna array on a transmit beam, and wherein the reference signals are received via the second antenna array on a receive beam different from the transmit beam, the method further comprising:
transmitting, via the measurement report, an identifier of a beam pair comprising the transmit beam and the receive beam.

11. The method of claim 1, wherein the reference signals are transmitted via the first antenna array via a set of one or more transmit beams, and wherein the reference signals are received via the second antenna array via a set of one or more receive beams, the method further comprising:
transmitting, via the measurement report, a set of beam pair identifiers associated with one or more beam pairs, wherein each beam pair comprises a transmit beam from the set of one or more transmit beams and a receive beam from the set of one or more receive beams.

12. The method of claim 11, further comprising:
receiving, from the second wireless device, a first indication of the set of one or more transmit beams, a second indication of the set of one or more receive beams, or both.

13. The method of claim 11, further comprising:
receiving, from the second wireless device based at least in part on transmitting the measurement report, an indication of a subset of beam pair identifiers from the set of beam pair identifiers;
transmitting additional reference signals via the first antenna array of the first wireless device via one or more transmit beams associated with the subset of beam pair identifiers;
performing a second set of measurements on the additional reference signals received at the second antenna array via one or more receive beams associated with the subset of beam pair identifiers; and
transmitting, to the second wireless device, a second measurement report comprising an indication of self-interference experienced at the first wireless device that is attributable to the additional reference signals.

14. The method of claim 1, wherein:
the reference signals are transmitted via the first antenna array via a single transmit beam, the reference signals are received via the second antenna array via a plurality of receive beams, and the method further comprises transmitting, via the measurement report, an indication of measurements associated with at least a subset of receive beams of the plurality of receive beams;
the reference signals are transmitted via the first antenna array via a plurality of transmit beams, the reference signals are received via the second antenna array via a single receive beam, and the method further comprises transmitting via the measurement report, an indication of measurements associated with at least a subset of transmit beams of the plurality of transmit beams;
the reference signals are transmitted via the first antenna array via a plurality of transmit beams, the reference signals are received via the second antenna array via a plurality of receive beams, and the method further comprises transmitting via the measurement report, an indication of measurements associated with at least a subset of transmit beams of the plurality of transmit beams, at least a subset of receive beams of the plurality of receive beams, or both; or
any combination thereof.

15. The method of claim 14, wherein the measurements indicated via the measurement comprise a plurality of sets of measurements corresponding to a plurality of measurement intervals, the method further comprising:
transmitting, via the measurement report, an indication of the plurality of sets of measurements over the plurality of measurement intervals, wherein each set of measurements of the plurality of sets of measurements, for each measurement interval of the plurality of measurement intervals, comprises one or more of a maximum measurement of the set of measurements over a time interval, a minimum measurement of the set of measurements over the time interval, an average measurement of the set of measurements over the time interval, a percentage of measurements of the set of measurements that satisfy a measurement threshold over the time interval, or any combination thereof.

16. The method of claim 14, further comprising:
transmitting, via the measurement report, an indication of a maximum measurement of the set of measurements over a time interval, a minimum measurement of the set of measurements over the time interval, an average measurement of the set of measurements over the time interval, a percentage of measurements of the set of measurements that satisfy a measurement threshold over the time interval, or any combination thereof.

17. The method of claim 14, further comprising:
transmitting, via the measurement report, a set of beam pair identifiers associated with one or more transmit beams, one or more receive beams, or both, that are associated with measurements of the set of measurements that satisfy one or more measurement thresholds, wherein the set of beam pair identifiers are associated with a subset of the plurality of transmit beams, a subset of the plurality of receive beams, or both.

18. The method of claim 1, wherein the reference signals are transmitted via the first antenna array to a first transmission-reception point of the second wireless device, and wherein the reference signals are received at the second antenna array within a set of resources for receiving signals from a second transmission-reception point of the second wireless device, wherein the method further comprises:
transmitting, via the measurement report, an indication of the second wireless device, the first transmission-reception point associated with channel measurement resources (CMRs), the second transmission-reception point associated with interference measurement resources (IMRs), or any combination thereof.

19. The method of claim 1, wherein the reference signals are transmitted via the first antenna array to one of the second wireless device or a third wireless device, and wherein the reference signals are received at the second antenna array within a set of resources for receiving signals from an other one of the second wireless device or the third wireless device, wherein the method further comprises:
transmitting, via the measurement report, an indication of the second wireless device associated with channel measurement resources (CMRs), the third wireless device associated with interference measurement resources (IMRs), or both.

20. The method of claim 1, further comprising:
receiving, from the second wireless device, an indication of one or more parameters associated with the priority, wherein determining the priority is based at least in part on receiving the indication of the one or more parameters.

21. The method of claim 1, further comprising:
determining an additional priority associated with transmission of an additional measurement report; and
transmitting the additional measurement report according to the additional priority and based at least in part on a comparison between the priority and the additional priority.

22. The method of claim 1,
wherein the first wireless device comprises a UE, the second wireless device comprises a base station, and the reference signals comprise sounding reference signals, or
wherein the first wireless device comprises a wireless node of an integrated access and backhaul network, the second wireless device comprises a parent node or a central unit of an integrated access and backhaul network, and the reference signals comprise channel state information reference signals, synchronization signal block signals, or both.

23. A method for wireless communication at a second wireless device, comprising:
receiving reference signals via a first antenna array of a first wireless device;
determining a priority associated with transmission of measurement reports associated with self-interference at the first wireless device; and
receiving, from the first wireless device and according to a reporting configuration for self-interference at the first wireless device, a measurement report comprising an indication of self-interference for full-duplex communications at the first wireless device, wherein the measurement report is received in accordance with the determined priority.

24. The method of claim 23, further comprising:
transmitting, to the first wireless device, an indication of the reporting configuration, wherein receiving the measurement report is based at least in part on transmitting the indication of the reporting configuration.

25. The method of claim 23, further comprising:
transmitting, to the first wireless device, an indication to transmit measurement reports associated with self-interference at the first wireless device periodically, aperiodically, semi-persistently, or a combination thereof, wherein receiving the measurement report is based at least in part on the indication to transmit the measurement reports.

26. The method of claim 23, further comprising:
transmitting, to the first wireless device, a request for the measurement report, wherein receiving the measurement report is based at least in part on transmitting the request.

27. The method of claim 26, wherein the request comprises a media access control (MAC) control element, a downlink control information message, a radio resource control message, or any combination thereof.

28. The method of claim 23, further comprising:
transmitting, to the first wireless device, an indication of one or more measurement thresholds associated with self-interference measurements at the first wireless device, wherein the measurement report is based at least in part on the one or more measurement thresholds.

29. An apparatus for wireless communication at a first wireless device, comprising:
a processor;
memory coupled with the processor; and
instructions stored in the memory and executable by the processor to cause the apparatus to:
transmit reference signals via a first antenna array of the first wireless device;
perform, according to a reporting configuration for self-interference at the first wireless device, a set of measurements on the reference signals received at a second antenna array of the first wireless device;
determine a priority associated with transmission of measurement reports associated with self-interference at the first wireless device; and
transmit, to a second wireless device and according to the reporting configuration, a measurement report comprising an indication of self-interference for full-duplex communications at the first wireless device that is based at least in part on performing the set of measurements on the reference signals, wherein the measurement report is transmitted in accordance with the determined priority.

30. An apparatus for wireless communication at a second wireless device, comprising:
a processor;
memory coupled with the processor; and instructions stored in the memory and executable by the processor to cause the apparatus to:

receive reference signals via a first antenna array of a first wireless device;

determine a priority associated with transmission of measurement reports associated with self-interference at the first wireless device; and receive, from the first wireless device and according to a reporting configuration for self-interference at the first wireless device, a measurement report comprising an indication of self-interference for full-duplex communications at the first wireless device, wherein the measurement report is received in accordance with the determined priority.

* * * * *